United States Patent
Kondou et al.

[11] Patent Number: 5,860,022
[45] Date of Patent: Jan. 12, 1999

[54] COMPUTER SYSTEM AND METHOD OF ISSUING INPUT/OUTPUT COMMANDS THEREFROM

[75] Inventors: Takeshi Kondou, Yokohama; Toshiaki Hirata, Kashiwa; Kazuo Matsunaga, Chigasaki; Osamu Takada, Sagamihara, all of Japan

[73] Assignee: Hitachi, Ltd., Tokyo, Japan

[21] Appl. No.: 505,144

[22] Filed: Jul. 21, 1995

[30] Foreign Application Priority Data

Jul. 26, 1994 [JP] Japan ................................. 6-193590
Aug. 11, 1994 [JP] Japan ................................. 6-189237

[51] Int. Cl.⁶ .................................................. G06K 13/00
[52] U.S. Cl. .......................................... 395/821; 395/287
[58] Field of Search ................................. 395/821, 825, 395/309, 842, 287

[56] References Cited

U.S. PATENT DOCUMENTS

| | | | |
|---|---|---|---|
| 3,675,209 | 7/1972 | Trost et al. | 395/825 |
| 4,104,731 | 8/1978 | Grudowski et al. | 395/824 |
| 4,183,090 | 1/1980 | Furukawa et al. | 395/400 |
| 4,630,196 | 12/1986 | Bednar, Jr. et al. | 395/200.01 |
| 4,858,108 | 8/1989 | Ogawa et al. | 395/826 |
| 4,901,232 | 2/1990 | Harrington et al. | 395/826 |
| 5,016,160 | 5/1991 | Lambeth et al. | 395/821 |
| 5,031,091 | 7/1991 | Wakatsuki et al. | 395/825 |
| 5,138,703 | 8/1992 | Igarashi | 395/281 |
| 5,218,695 | 6/1993 | Noveck et al. | 395/600 |
| 5,251,303 | 10/1993 | Fogg, Jr. et al. | 395/275 |
| 5,265,252 | 11/1993 | Rawson, III et al. | 395/700 |
| 5,379,381 | 1/1995 | Lamb | 395/826 |
| 5,444,854 | 8/1995 | Mathis et al. | 395/825 |
| 5,465,352 | 11/1995 | Nakazawa et al. | 395/600 |
| 5,507,032 | 4/1996 | Kimura | 395/826 |
| 5,513,368 | 4/1996 | Garcia, Jr. et al. | 395/842 |
| 5,530,897 | 6/1996 | Meritt | 395/829 |
| 5,561,825 | 10/1996 | Yamagami et al. | 395/878 |
| 5,640,596 | 6/1997 | Takamoto et al. | 395/841 |

OTHER PUBLICATIONS

H. Katzan, Jr., "Computer Organization and the System/370", Van Noatrand Reinhold Company, 1971, pp. 169–182.–Japanese Translation.

Primary Examiner—Ayaz R. Sheikh
Assistant Examiner—David A. Wiley
Attorney, Agent, or Firm—Fay, Sharpe, Beall, Fagan, Minnich & McKee

[57] ABSTRACT

Disclosed herein is a computer system which comprises a plurality of input/output devices, an adapter device coupled to the plurality of input/output devices and a main processing unit for supplying an input/output request to each of the plurality of input/output devices through the adapter device. A plurality of input/output commands are respectively issued to the plurality of input/output devices from the main processing unit as one input/output start command. The adapter device specifies to which input/output devices the plurality of input/output commands included in the one input/output start command correspond. Further, the adapter device supplies input/output commands to the specified input/output devices respectively.

26 Claims, 39 Drawing Sheets

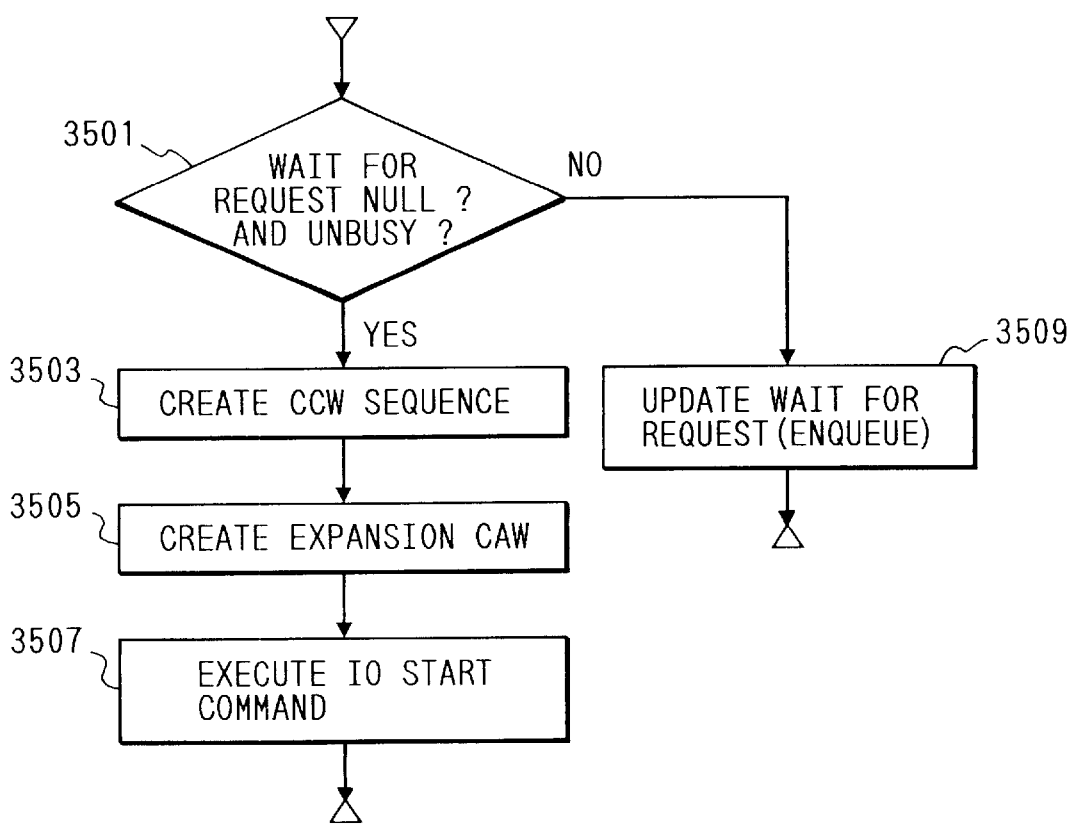

FIG. 12

| OS KERNEL PROGRAM | KERNEL CONTROL TABLE | SYSTEM BUFFER |
|---|---|---|
| CONSOLE CONTROL PROGRAM | CONSOLE CONTROL TABLE | CONSOLE BUFFER |
| FILE MANAGEMENT PROGRAM | FILE MANAGEMENT TABLE | FILE BUFFER |
| COMMUNICATION MANAGEMENT PROGRAM | COMMUNICATION MANAGEMENT TABLE | COMMUNICATION DATA BUFFER |
| APPLICATION PROGRAM 1 | TABLE FOR APPLICATION | DATA AREA FOR APPLICATION |
| ⋮ | ⋮ | ⋮ |

FIRST-OUT READ COMMAND MANAGEMENT TABLE 400

| TOTAL NUMBER OF DEVICES | MAXIMUM NUMBER OF ISSUED READ |
|---|---|
| DEVICE ID (0×00) | NUMBER OF ISSUED READ |
| DEVICE ID (0×01) | NUMBER OF ISSUED READ |
| ⋮ | |
| DEVICE ID (0×FF) | NUMBER OF ISSUED READ |

FIG. 36
| BOUNDARY OF TRANSFER SOURCE / BOUNDARY OF TRANSFER DESTINATION | 0B | 1B | 2B | 3B |
|---|---|---|---|---|
| 0B | (4)*l +a | (1)*n | (2)*m +b | (1)*n |
| 1B | (1)*n | (1)+(2)+ (4)*l +a | (1)*n | (1)+ (2)*m +b |
| 2B | (2)*m +b | (1)*n | (2)+ (4)*l +a | (1)*n |
| 3B | (1)*n | (1)+ (2)*m +b | (1)*n | (1)+ (4)*l +a |
(1) : BYTE MOVE    a : COMBINATION WITH EITHER OF (1) AND (2)
(2) : WORD MOVE    b : (1) OR NULL
(4) : LONG WORD MOVE    l, m, n : INTEGER (REPETITIVE NUMBER OF TIMES)
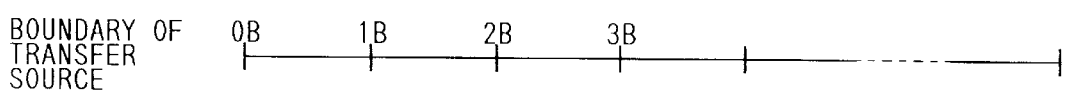
BOUNDARY OF TRANSFER SOURCE   0B   1B   2B   3B
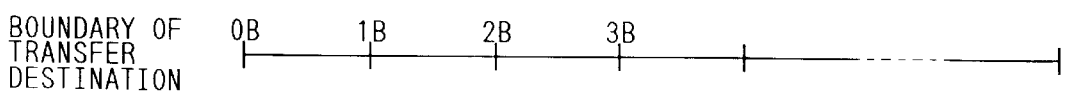
BOUNDARY OF TRANSFER DESTINATION   0B   1B   2B   3B ed to a computer system and a method of issuing input/output commands therefrom, and more specifically to a computer system capable of giving a plurality of input/output commands to a plurality of input/output devices respectively as one input/output start command and to a method of issuing the input/output commands therefrom.

COMPUTER SYSTEM AND METHOD OF ISSUING INPUT/OUTPUT COMMANDS THEREFROM

BACKGROUND OF THE INVENTION

1. Field of the Invention

The present invention relates to a computer system and a method of issuing input/output commands therefrom, and more specifically to a computer system capable of giving a plurality of input/output commands to a plurality of input/output devices respectively as one input/output start command and to a method of issuing the input/output commands therefrom.

2. Description of the Related Art

A method of controlling input/output devices employed in a conventional computer system will be described below. A main CPU (Central Processing Unit) sends an input/output command to one of input/output devices upon executing an input/output operation. Correspondingly, the input/output device starts processing. After the input/output command has been sent to its corresponding input/output device, the main CPU can execute other processes until the transfer of input/output data is completed. When the processing is completed, the input/output device notifies the completion of processing to the main CPU in response to an interruption.

The above method can take a load off the main CPU. In an actual computer, an input/output adapter (called "input/output channel" depending on the computer) is interposed between a main CPU and each input/output device. Further, a plurality of input/output devices are electrically connected to the input/output adapter.

FIG. 39 illustrates a channel interface described in a technical literature "Computer Organization and the System/370" by Harry Katzan Jr., Van Noatrand Reinhold Company, 1971. An input/output architecture associated with input/output devices using an input/output channel will be described with reference to the same drawing.

The main CPU issues an input/output start command 20 to start an input/output operation. The input/output start command 20 includes a command code, a channel address and a device address. The channel address and the device address are of addresses for designating or specifying both an input/output device for performing the input/output operation and an input/output channel.

A CAW (Channel Address Word) 21 is located in a specific address on a main memory and stores an address for the first CCW (Channel Command Word) 22, which is located on the main memory. The CCW 22 provides information about an input/output operation to be executed for an input/output channel. Each CCW 22 comprises a command code, a data address, a count and a flag. The flag includes a cd flag and a cc flag.

The command code of the CCW 22 designates or specifies an operation to be executed such as input/output or the like. The data address specifies a leading or head address of each data 23 that is an object for the input/output operation. The count specifies the number of bytes used for the input/output operation.

The cd flag specifies a data chain. The data chain shows that the same input/output operation is executed with respect to a data region or area different from others in a CCW to be continued next. The cc flag specifies a command chain. The command chain shows that a separate input/output operation in the CCW to be continued next is executed. When all the bits of the flag are 0, the corresponding CCW 22 represents the last CCW.

A CSW (Channel Status Word) 24 is recorded after reception of an input/output interruption or an input/output start command. The CSW 24 shows a state (busy or the like) of an input/output device or an input/output channel.

A procedure of executing input/output operations through the above input/output interface will be described below. The main CPU is firstly activated as follows:

① Create a required CCW 22. It may be prepared in advance or may be created when a program is being executed. There is a case in which a series of a plurality of CCWs 22 called "channel program" are used as shown in FIG. 39.

② Set the CAW 21 (set an address for the leading CCW 22).

③ Load the channel address and the device address.

④ Prohibit the input/output interruption.

⑤ Issue the input/output start command 20.

After the main CPU has issued the input/output start command 20 as described above, the input/output channel of the computer system is activated as follows:

① The channel takes out a CAW 21 and checks whether it is proper.

② The channel takes out a CCW 22 and checks whether it is proper.

③ Execute an input/output operation with respect to a designated or specified device.

④ Allows a CSW 24 to record completion information about the input/output operation.

⑤ The channel triggers an input/output interruption.

In the aforementioned input/output interface, a plurality of times of input/output operations with respect to a single input/output device can be continuously carried out by issuing an input/output start command (corresponding to a set of a series of CCWs 22 shown in FIG. 39). Now, consider where the input/output operations with respect to the plurality of input/output devices are continuously executed through the conventional input/output interface referred to above.

FIG. 40 is a view for describing the procedure of input/output operations at an input/output interface to a plurality of input/output devices via an input/output adapter (input/output channel). FIG. 40 particularly shows a case where an input/output command 1 relative to a device 1 and an input/output command 2 relative to another device 2 are continuously issued.

First of all, a CPU issues an input/output command 1 and the input/output adapter performs input/output processes along with the device 1 in response to the input/output command 1. While the input/output adapter is performing the input/output processes along with the device 1, the CPU can execute other processes. When the input/output processes along with the device 1 are completed, the input/output adapter issues an interrupt and the CPU performs interrupt processing 1. As a result, an input/output operation is completed. Subsequently, the CPU issues an input/output command 2 and hence input/output processes along with the device 2 are executed in the same manner as described above.

Thus, since the input/output operation of the conventional input/output device is one of such a type that an input/output command to a single input/output device is issued, other processes are executed and the completion of operation of the corresponding input/output device is notified by an interrupt, the input/output command must be issued again when the input/output operation is continuously made to an input/output device different from the above input/output device. In other words, it is necessary to issue the input/output command at each input/output device.

SUMMARY OF THE INVENTION

A study of application of a conventional system to a computer suitable for multiline connection type communication servers which is of an example to which the present invention is applied, presents the following problems.

With improvements in performance of a CPU, an access to a memory has been recently speeded up. Particularly as compared with the case where an access to a memory such as a cache memory has been speeded up by virtue of technology, an input/output device has not yet been speeded up so far. Therefore, the difference in speed between the CPU and the input/output device becomes greater. It is also necessary to connect a number of input/output devices in order to correspond to a multiline. When such input/output devices are directly connected to a bus of the CPU, the performance of the CPU cannot be effectively utilized due to the speed difference. In order to avoid this, the bus is hierarchized. In other words, a method of separating a main bus and an I/O bus from each other and connecting the two to each other by a bus adapter to thereby solve such a problem is considered. However, the distance between the CPU and each input/output device is made greater as a result of adoption of this method. Therefore, an input/output command or an end interrupt operation taken between the CPU and each input/output device, for reporting and confirming an initial setup and an end status incident to the initiation of DMA transfer is next executed through the bus adapter. As a result, performance capabilities of the CPU, I/O and bus are used up or reduced. Particularly, this becomes a serious problem confronting a multiline connection type communication server.

Now consider the causes that develop the aforementioned problems. According to this consideration, these causes have been found as follows. Namely, an input/output command sequence (corresponding to a channel program in the conventional example) to each input/output device cannot be collectively issued in plural form through one input/output operation (corresponding to the issuance of the input/output command or the input/output start command 20 in the conventional example) as shown in FIG. 39. Further, an input/output adapter does not have the function of collectively executing the input/output command sequences.

A first object of the present invention is to provide a contrivance (including a format of input/output interface information) capable of executing a plurality of input/output commands issued to a plurality of devices on one input/output command basis and a mechanism (processing logic) for controlling an input/output adapter or an input/output channel device capable of accepting the contrivance.

A second object of the present invention is to provide not only a contrivance for issuing a command group but also an arrangement for issuing a command group equivalent to a quantity corresponding to the status or acceptance capability of an input/output adapter device, in other words, to provide an input/output interface capable of easily determining at which quantity of the command group the input/output adapter device can accept the command group without becoming busy.

A further object of the present invention is to provide a method of efficiently issuing a command group composed of read commands for providing instructions for an input/output operation upon transfer of data through the aforementioned input/output adapter device.

A still further object of the present invention is to provide a method of issuing an efficient command group associated with a communication protocol process, particularly, window control and a packet dividing process upon transfer of data through the aforementioned input/output adapter device.

The present invention provides a computer system comprising a plurality of input/output devices, an adapter device coupled to the plurality of input/output devices, and a main processing unit for issuing an input/output request to each of the plurality of input/output devices through the adapter device. In the computer system, a plurality of input/output commands are issued to the plurality of input/output devices respectively from the main processing unit as one input/output start command, the adapter device specifies to which input/output devices the plurality of input/output commands included in the one input/output start command correspond, and the plurality of input/output commands are supplied to the specified input/output devices respectively.

In the main processing unit, a wait request management table stores therein and manages an input/output request issued to each of the plurality of input/output devices when the input/output request cannot be immediately processed. If it is able to process the input/output request, then a plurality of command sequences each comprised of input/output commands arranged in a row to be supplied to each input/output device are created every input/output devices based on the input/output request stored in the wait request management table. Further, the plurality of command sequences are issued to the adapter device as one input/output start command.

A process of collectively issuing the plurality of input/output requests stored in the wait request management table on the one input/output start command basis may be executed at an opportunity that the input/output requests can be processed as described above. As an alternative, however, the process may be carried out at an opportunity that the processing for the input/output commands is finished and each input/output device makes an end interruption to the main processing unit.

The plurality of command sequences are managed by a table having a structure wherein a block including, for example, address information for specifying a leading position of each command sequence and identifier information for specifying a single input/output device corresponding to an object for executing each command in the command sequence is set as a basic unit and the block is continuously provided in plural form. Flag information indicative of whether the adapter device has captured a corresponding command sequence from the main processing unit, may be provided.

The main processing unit generally comprises an application executing portion for issuing an input/output request to each input/output device and a driver for creating an input/output command based on the input/output request and issuing it to the adapter device. Particularly, before the driver accepts the data input request from the application executing portion, the driver may supply the plurality of input commands to the plurality of input/output devices as one input/output start command on a first out basis.

Described specifically, a first storing means for storing therein a first prescribed number indicative of the maximum number of input commands respectively issued to the input/output devices, a second storing means for storing therein a second prescribed number for prescribing an opportunity for reissuing an input command sequence and a third storing means for recording therein the number of uncompleted input commands issued to the individual input/output devices are provided. After initialization of the driver, an input command sequence obtained by linking input commands to each other by the first prescribed number is created at each input/output device so as to be issued to the adapter device. The number of the input commands issued to the individual input/output devices is recorded in the third storing means. The number of the uncompleted input commands stored in the third storing means is hereafter decremented by 1 each time an input command completion report is received from each input/output device. If the number of the uncompleted input commands issued to the individual input/output devices reaches the second prescribed number owing to this processing, then the difference between the number of the uncompleted input commands stored in the third storing means and the first prescribed number stored in the first storing means is calculated and an input command sequence obtained by linking input commands to each other by the number corresponding to the difference is reissued to the adapter device.

When each input/output device serves as a line control device, a protocol processor divides data on a data transfer request issued from the application executing portion and adds communication protocol control information to the heads of the divided individual output data to thereby create a plurality of divided packets. When, at this time, the number of the plurality of divided packets is not greater than a continuous transfer number corresponding to the number of packets continuously transferable without confirming a delivery issued from the opposite party at the present time, the driver creates a plurality of input/output commands based on the plurality of divided packets. Further, the driver issues the plurality of created input/output commands as one input/output start command to thereby transfer the output data about the plurality of divided packets on one input/output operation basis.

Further, when it is desired to divide data into a plurality of packets and transmit them under the protocol processing referred to above, a header (communication protocol control information) is added to the head of each of the divided output data. At this time, the header and each output data logically constitute a single linked packet. However, they actually exist in another area and are often managed by another data management information block. Since, in this case, commands are created for every data management information block, commands for transferring the headers and commands for transferring the output data are linked to one another by data chains, i.e., they become a plurality of commands. In the present invention, the header and the output data are physically set to a continuous area and repacked so that the area is pointed by a single data management information block, after which they are delivered to the driver. Thus, the driver can execute the plurality of commands as a single command.

Whether or not repacking is made is judged based on the size of an overhead. Namely, the adapter device compares an overhead necessary to process a command for transferring the communication protocol control information with an overhead necessary to copy the output data onto an area continuously linked to the communication protocol control information. Consequently, when the latter overhead is smaller than the former overhead, a repacking process is executed. In other words, a corresponding data length for equalizing a time interval necessary for the adapter device to execute a process for tracing chains (data chains) between commands and a time interval necessary for the main processing unit to copy data having a given length to each other is prepared as a data length decision reference value. Upon transmission of input/output data in which headers and user data created by the protocol processing are coupled to one another by chains, output data lengths are checked before creation of a corresponding command. If each output data length is found to be shorter than the reference value, then the corresponding user data is copied onto an area subsequent to each header. Namely, the header and the user data are recreated into one continuous input/output data.

The main processing unit issues the plurality of input/output commands to the plurality of input/output devices respectively as one input/output start command. Further, the adapter device specifies to which input/output devices the plurality of input/output commands included in the one input/output start command correspond. Furthermore, the adapter device gives the input/output commands to the specified input/output devices respectively. Therefore, the input/output operations of the plurality of input/output devices are executed through one input/output start command.

The plurality of command sequences collectively delivered to the adapter device are managed by the table having the structure in which the block including the address information and the identifier information for specifying each input/output device is continuously provided in plural form. If the flag information indicative of whether the adapter device has brought the corresponding command sequence from the main processing unit, is provided, then the transfer of each command sequence between the main processing unit and the adapter device can be smoothly performed, thereby making it possible to collectively request the command group to the maximum according to the acceptance capability of the adapter device.

By supplying the plurality of input commands corresponding to the plurality of input/output devices to the adapter device as one input/output start command on the first-out basis, the overheads for the input operations can be reduced.

When it is desired to divide the data into the plurality of packets and transmit them under the protocol processing, the respective series of command sequences each composed of the output commands for transferring the packets corresponding to the number of packets transmittable at a time, are created. When the corresponding command sequence is executed based on the input/output operation of the driver, the plurality of divided packets can be transferred to the corresponding input/output device through one input/output start command.

In the present invention, if necessary, the aforementioned repacking process is executed so that the adapter device is able to execute a process of transferring data as data continuous from the position where each header is pointed, without a process of tracing data chains. As a result, the overhead for the execution of the input/output process including the process of the input/output adapter can be optimized.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will hereinafter be described with reference to the accompanying drawings wherein:

FIG. 8 is a flow chart for describing the operation of a required driver employed in the embodiment 1;

FIG. 12 is a conceptual view showing information stored in a storage unit of the communication server employed in the embodiment 2;

FIG. 36 is a conceptual view showing a method of copying data on a memory, which is employed in the embodiment 6;

DETAILED DESCRIPTION OF THE PREFERRED EMBODIMENTS

Preferred embodiments of the present invention will hereinafter be described with reference to the accompanying drawings. Six embodiments 1 through 6 will be described below. Before their description, however, a basic procedure of an input/output interface according to the present invention will be described with reference to FIG. 1.

Figure 1:
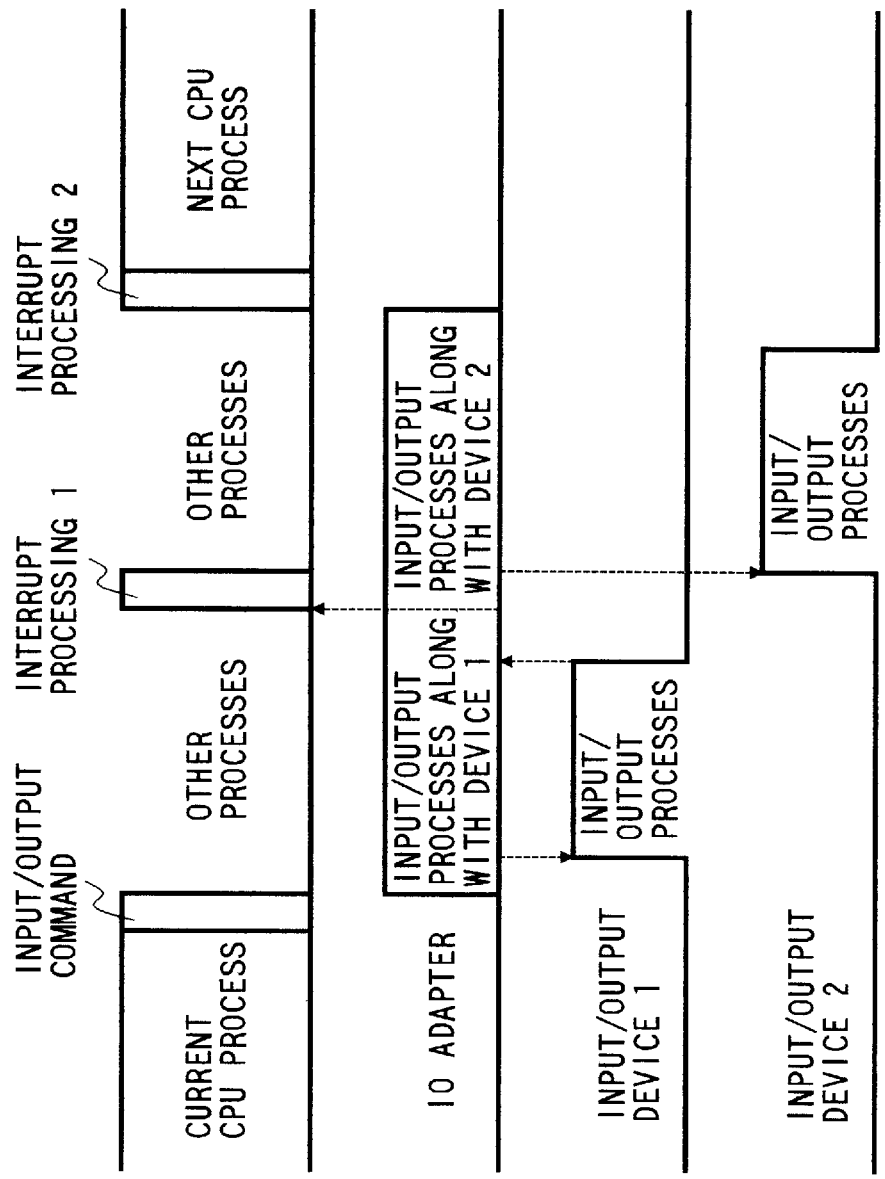
FIG. 1 is a timing chart for describing the principle of the present invention.

Referring to FIG. 1, a CPU issues a single input/output command to two input/output devices 1 and 2 so as to start up input/output operations with respect to the two input/output devices 1 and 2. When the CPU simply issues the one input/output command, an input/output (hereinafter called "IO") adapter continuously performs input/output processes along with the device 1 and input/output processes along with the device 2. When the input/output processes along with the device 1 are completed, the IO adapter interrupts the CPU so that the CPU performs interrupt processing 1. After the interrupt processing 1 has been executed, the CPU does not need to issue an input/output start command to the device 2 and is able to perform other processes. When the input/output processes along with the device 2 are finished, the IO adapter interrupts the CPU so that the CPU executes interrupt processing 2.

[Embodiment 1]

The present embodiment shows one wherein an input/output adapter device is of an input/output channel device.

Figure 2:
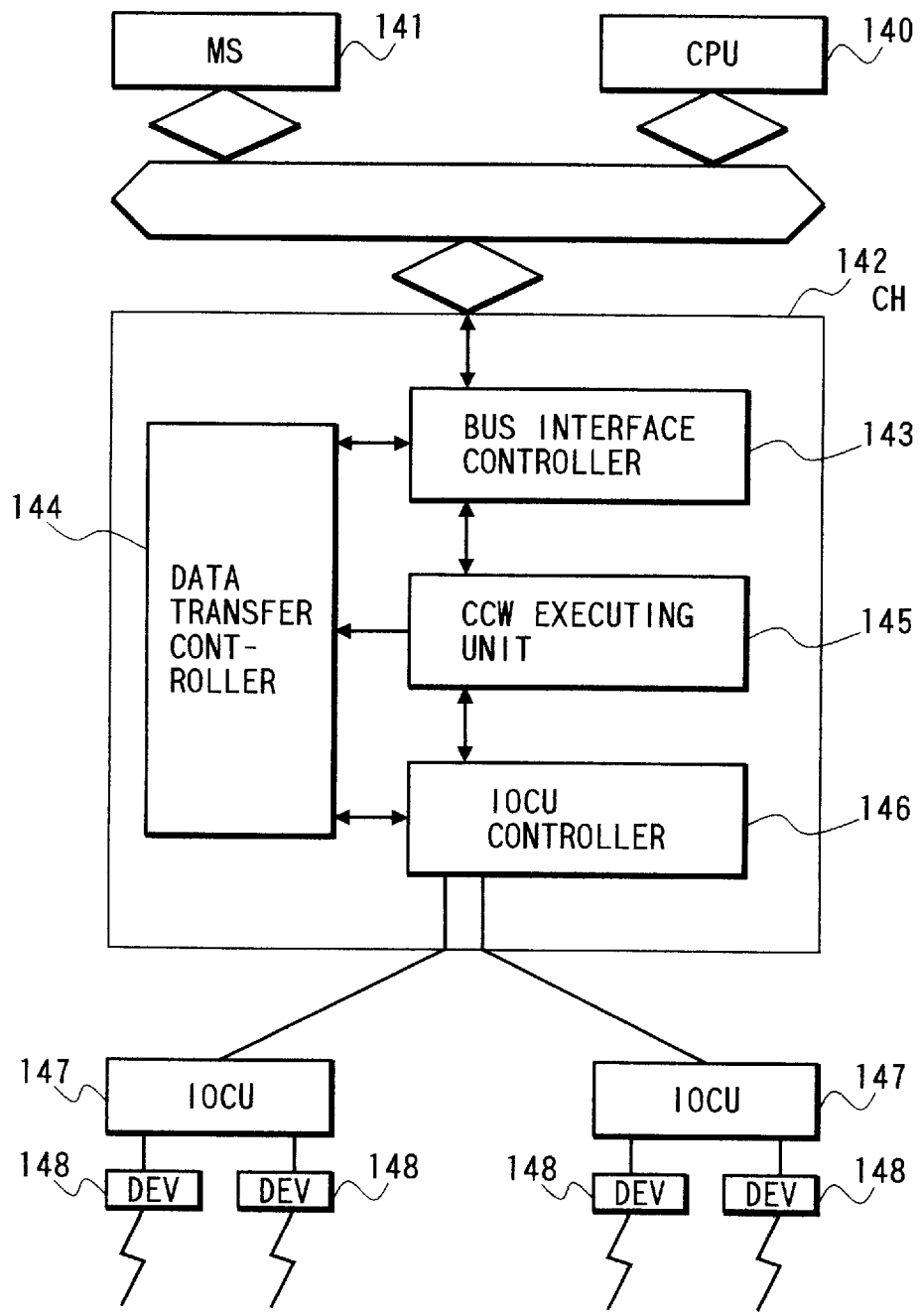
FIG. 2 is a block diagram showing a configuration of a computer according to an embodiment 1.

FIG. 2 is a view for describing, as a dominant part, a functional structure of a computer system using an input/output channel device, to which the present invention is applied, particularly, a function of an input/output channel (hereinafter abbreviated as "CH") 142. A CPU 140 is of a CISC type central processing unit. An MS 141 is of a main memory. The CH 142 is mutually connected to the CPU 140 and the MS 141 through a bus. An IOCU 147 is of an input/output control device and is electrically connected to the CH 142. Further, a plurality of IOCUs 147 are electrically connected to a single CH 142. Similarly, a plurality of input/output devices (hereinafter abbreviated as "DEV")

148 are electrically connected to a single IOCU 147. The IOCU 147 controls a corresponding DEV 148 connected thereto. The CH 142 comprises a bus interface controller 143, a data transfer controller 144, a CCW executing unit 145 and an IOCU controller 146. The bus interface controller 143 serves as a block for controlling reception of an input/output start command, a notification of an interruption to the CPU, an access to the MS 141, etc. The CCW executing unit 145 serves as a block for analyzing a CCW and controlling a data transfer such as transmission, reception or the like. The IOCU controller 146 serves as a block for controlling a path to the IOCU 147 in accordance with instructions issued from the CCW executing unit 145. The data transfer controller 144 serves as a functional block for transferring data on the MS 141 to the IOCU 147 in accordance with the instructions issued from the CCW executing unit 145 or storing data generated from the IOCU 147 in the MS 141.

Figure 3:
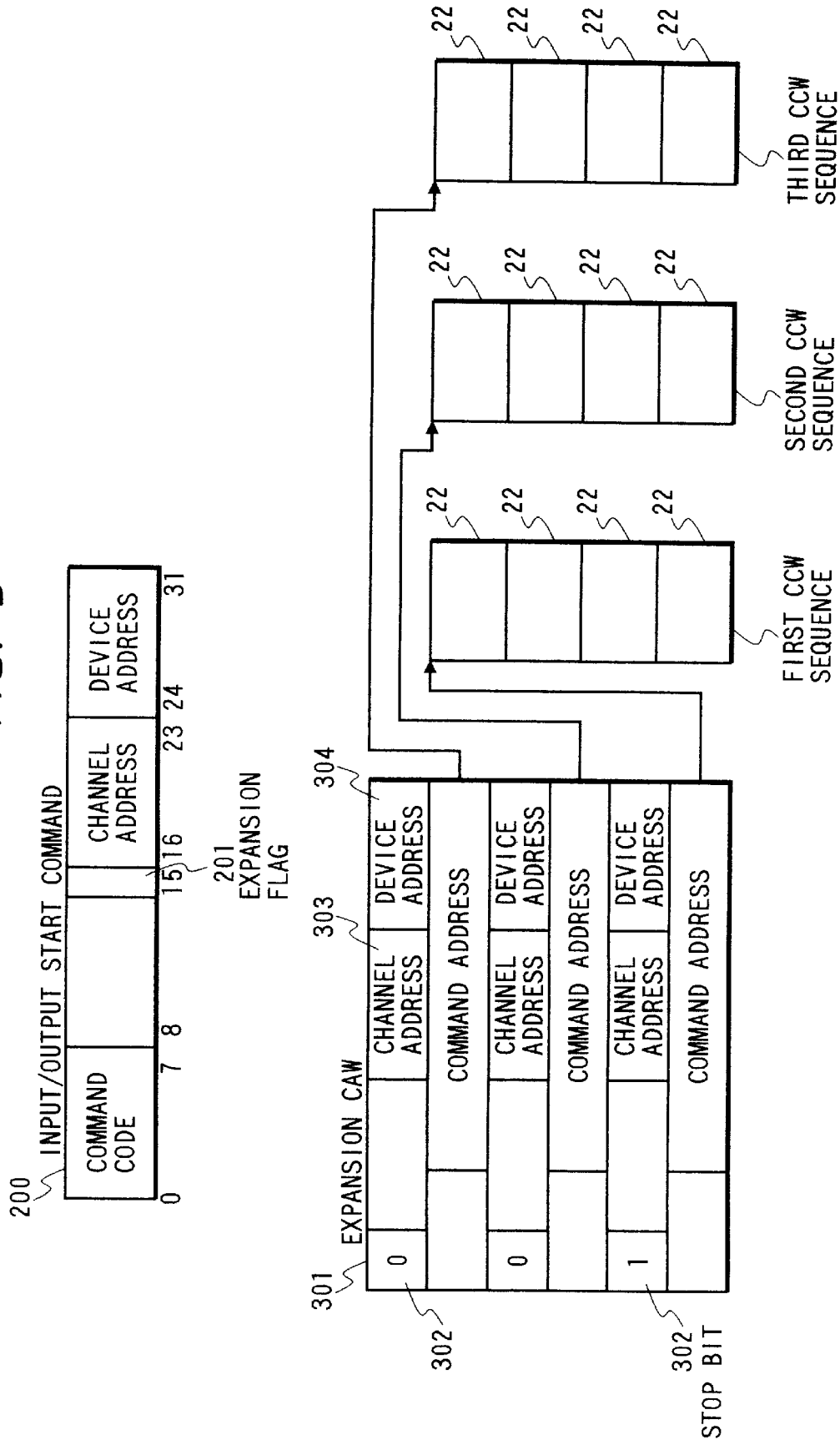
FIG. 3 is a conceptual view illustrating interface information employed in the embodiment 1.

FIG. 3 is a view for describing an interface protocol between the CH 142 and the CPU 140 shown in FIG. 2 and particularly illustrates, in detail, interface representation of portions different from conventional ones.

Figure 39:
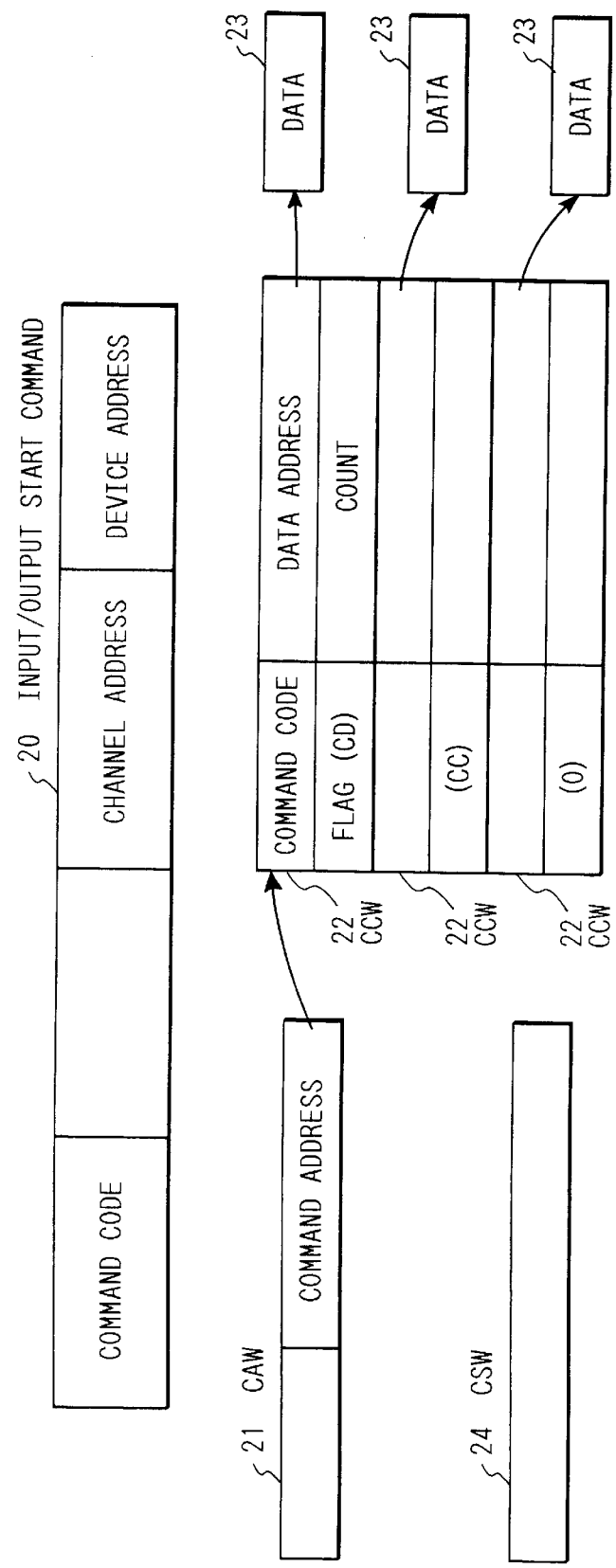
FIG. 39 is a conceptual view illustrating a conventional channel interface.
Figure 40:
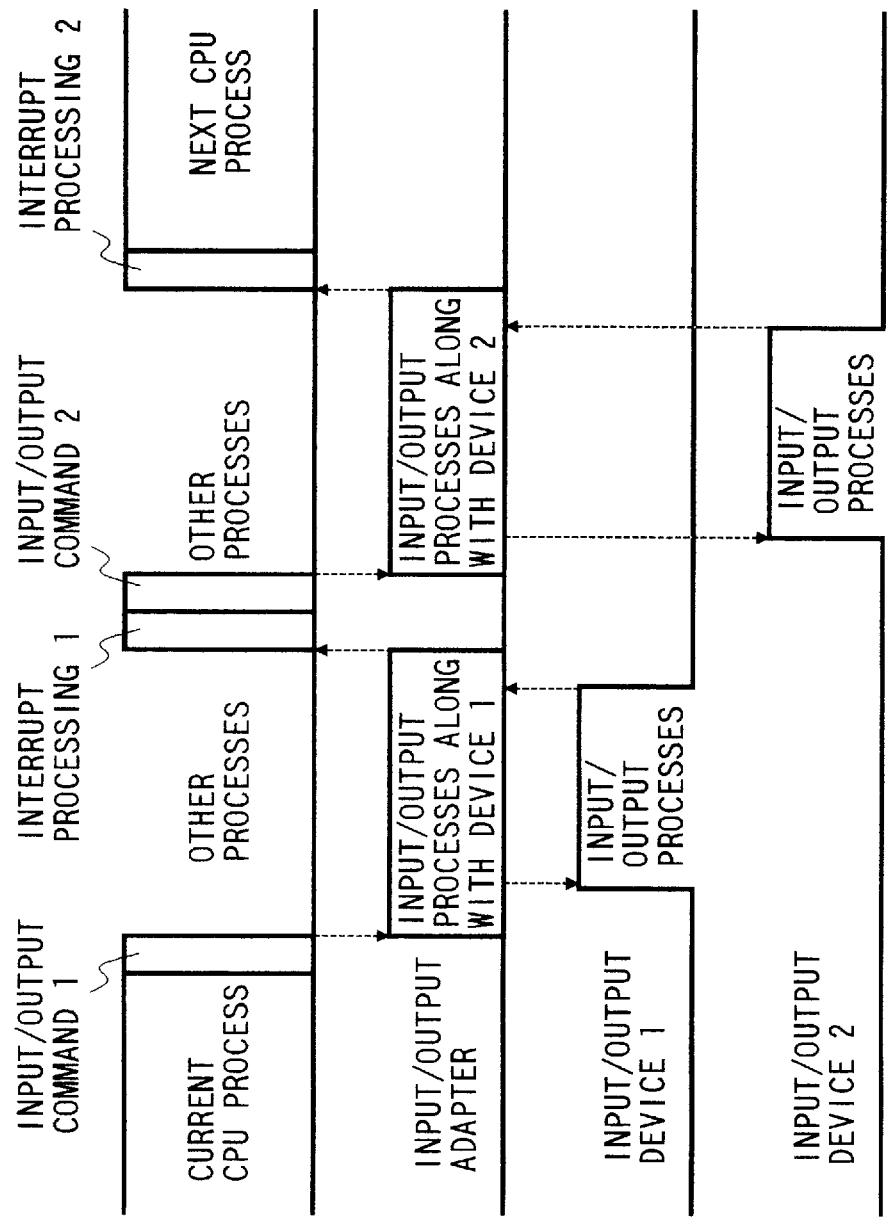
FIG. 40 is a timing chart for describing conventional input/output operations of a plurality of devices.

Referring to FIG. 3, an input/output start command 200 is one obtained by adding an expansion flag 201 to a conventional input/output start command 20 shown in FIG. 39. When a plurality of IO commands are issued to a plurality of devices, the CPU 140 turns ON the expansion flag 201 and issues the present input/output start command 200 to the CH (corresponding to a CH to which a DEV 148 that desires to perform an IO is connected) 142 at a corresponding channel address. At this time, device address information included in the input/output start command 200 does not make sense. An expansion CAW 301 is one obtained by arranging a block (hereinafter called "command block") obtained by adding a stop bit 302, a channel address 303 and a device address 304 to a conventional CAW (CAW 21 shown in FIG. 39) comprised of a command address, in plural form (by the number of devices for providing commands) on a continual basis from a predetermined fixed address on the MS 141. A command address in each command block represents a head address of each CCW sequence in a manner similar to the conventional example. The channel address 303 and the device address 304 represent address information for identifying a target device for executing each CCW sequence. Each of CCWs 22 constituting each CCW sequence is identical to each of conventional CCWs 22 shown in FIG. 39. The stop bit 302 included in each command block is of information indicative of whether the corresponding command block is of a final command block in the expansion CAW 301. A stop bit included in the final command block is assumed as ON (1), whereas each of stop bits included in other command blocks is considered as OFF (0).

The CPU 140 sets up the above-described interface information and executes the expanded input/output start command 200. The CH 142, which is under the input/output start command 200, starts to carry out an input/output operation according to its setup.

Figure 4:
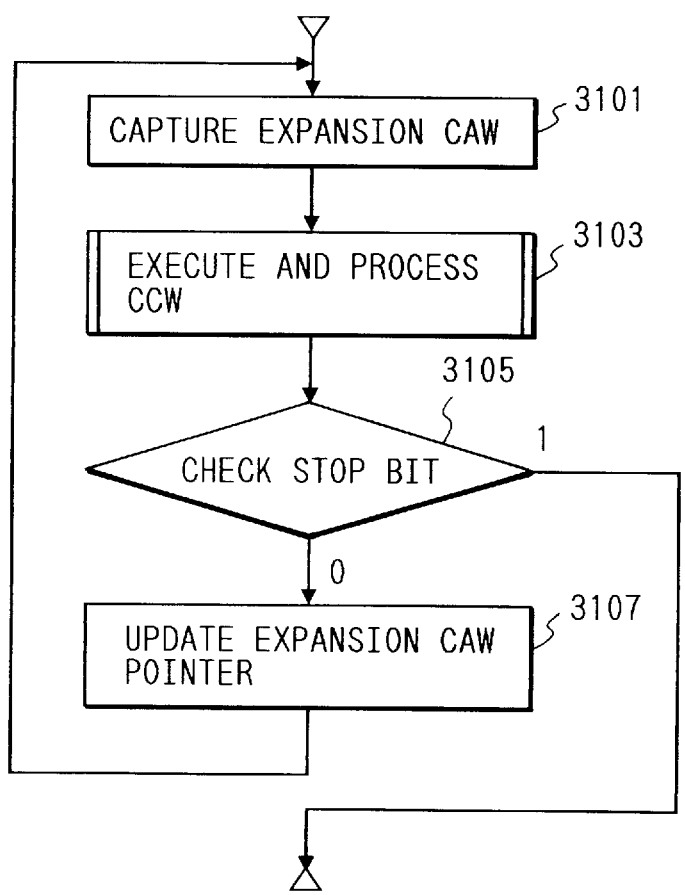
FIG. 4 is a flow chart for describing a main operation of a channel employed in the embodiment 1.

FIG. 4 is a flow chart for describing a main processing logic of the CH 142. The CH 142, which receives the expanded input/output start command 200, is activated so as to firstly capture or take the leading command block of the expansion CAW 301 starting from a predetermined address in a register provided thereinside (Step 3101). Next, the CH 142 executes processes of a CCW sequence specified by a command address in the captured command block (Step 3103). The CH 142 then checks a stop bit 302 of the captured command block (Step 3105). If the stop bit 302 is judged as ON, i.e., the value of the stop bit 302 is 1, then the processes are finished. If the stop bit 302 is judged as OFF, then the CH 142 updates a pointer that designates a command block of the expansion CAW 301 to be captured (Step 3107) and executes the processes from Step 3101 again. Namely, the processes of the CCW sequence are repeated until the stop bit of the expansion CAW 301 reaches 1.

Figure 5:
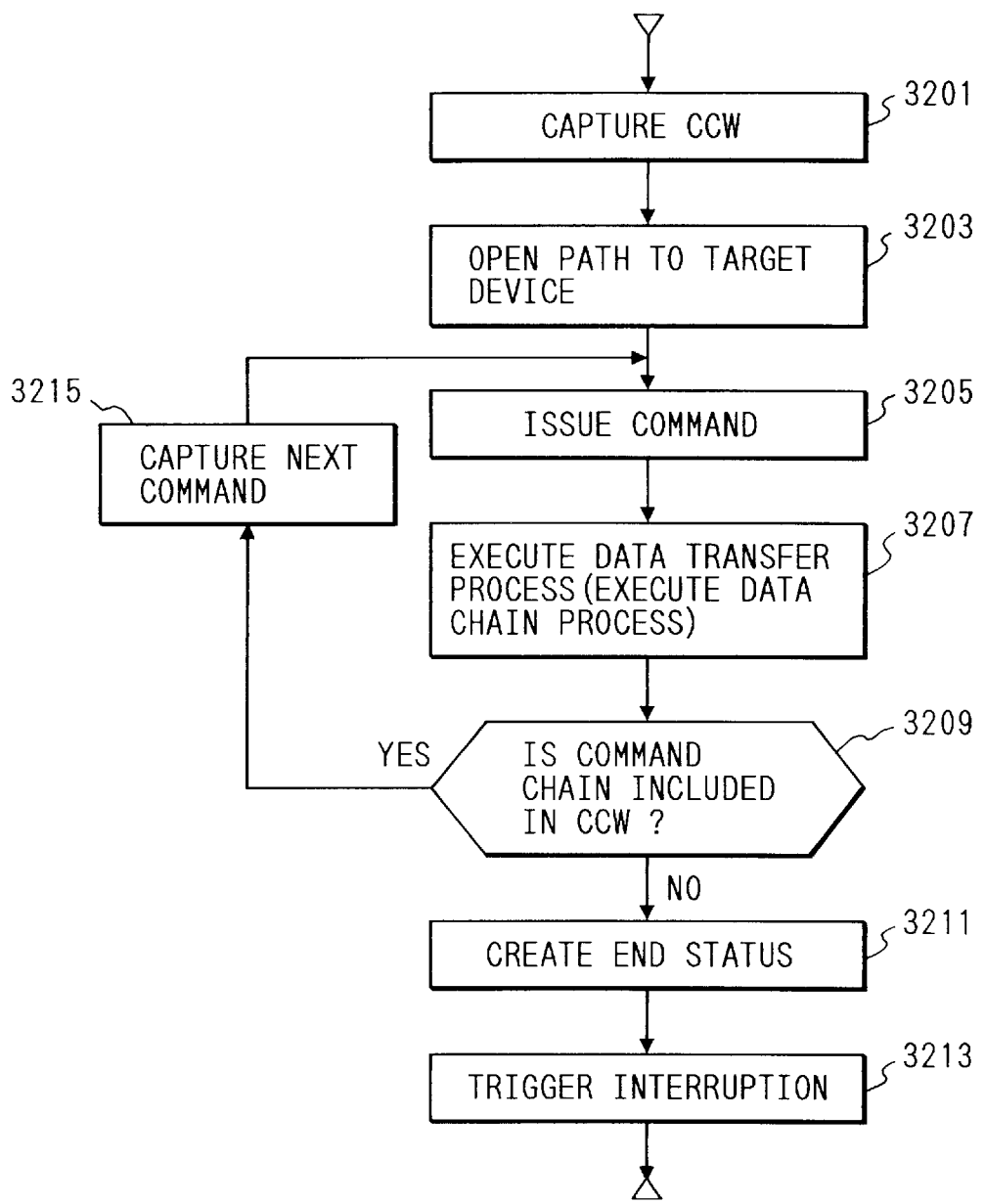
FIG. 5 is a flow chart for describing a CCW execution process executed in the embodiment 1.

FIG. 5 is a flow chart for describing the processes of the CCW sequence at Step 3103 referred to above. Although the present processes are logic similar to the conventional one, they will be described below.

First of all, the CH 142 takes in the head CCW of the CCW sequence specified by the command address of the captured command block (Step 3201). Next, the CH 142 selects a target device DEV 148 identified by a device address of the captured command block so as to open a path (Step 3203). Thereafter, the CH 142 issues a command to the target device DEV 148 and waits for a response (Step 3205). Further, the CH 142 performs a data transfer process using the data transfer controller 144. Incidentally, the data transfer controller 144 also executes a data chain process (Step 3207). Next, the CH 142 checks a command chain flag. If the command chain flag is judged ON, then the CH 142 proceeds to Step 3215. If the answer is NO, then it proceeds to Step 3211 (Step 3209). Step 3215 described above means a process for capturing the next CCW. Thereafter, the routine procedure is repeated from Step 3205 again. Step 3211 referred to above means a process for creating an end status. Finally, the CH 142 triggers an interrupt to the CPU 140 (Step 3213).

A description will next be made of a process for issuing input/output commands to a plurality of devices on the CPU 140 side in a batch. In the present embodiment, a description will be made of, as an example, a case where the CPU 140 issues each input/output command for data communications.

Figure 6:
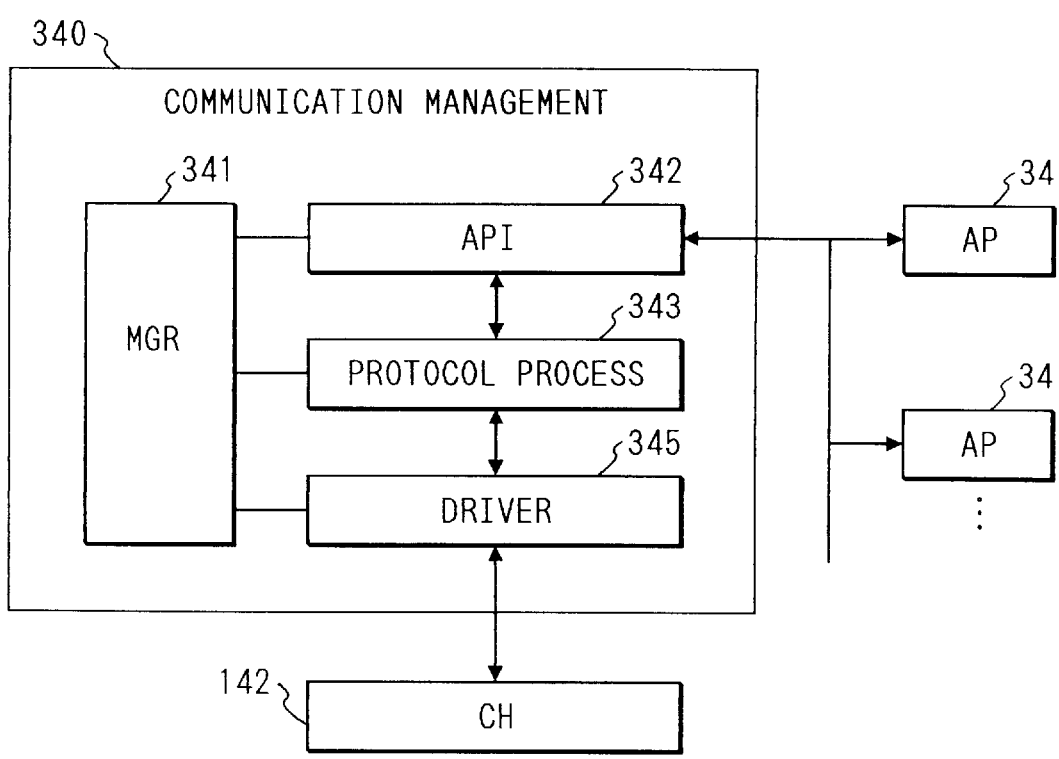
FIG. 6 is a block diagram showing a communication management mechanism employed in the embodiment 1.

FIG. 6 is a view showing a relationship between a detailed configuration of a processing program executed by the CPU 140 for data communications and its corresponding CH 142. A communication management 340 furnishes communications services (transmission and reception of data) to a plurality of application programs (AP) 34. The communication management 340 comprises a manager (MGR) 341 for managing computer resources such as a buffer, a timer, etc., an application interface (API) 342 for performing a process for receiving or accepting a communication request issued from each AP 34, a protocol process 343 for processing or working and controlling communication data in accordance with a communication protocol, and a driver 345 for controlling the interface with the corresponding CH 142.

The AP 34 issues various input/output requests regarding data communications to the communication management 340. In the communication management 340, the API 342 receives an input/output request from the AP 34 under the control of the MGR 341. Further, the protocol process 343 works and controls communication data and issues the input/output request to the driver 345. The driver 345 sets various information described in FIG. 3 according to the received input/output request and issues an input/output start command 200 to the CH 142.

Figure 7A:
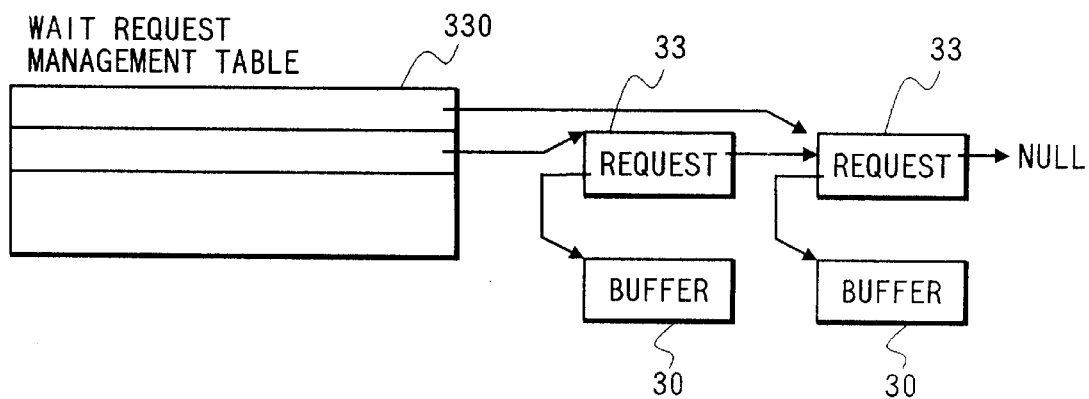
FIG. 7A is a block diagram for describing a wait request management table employed in the embodiment 1.
Figure 7B:
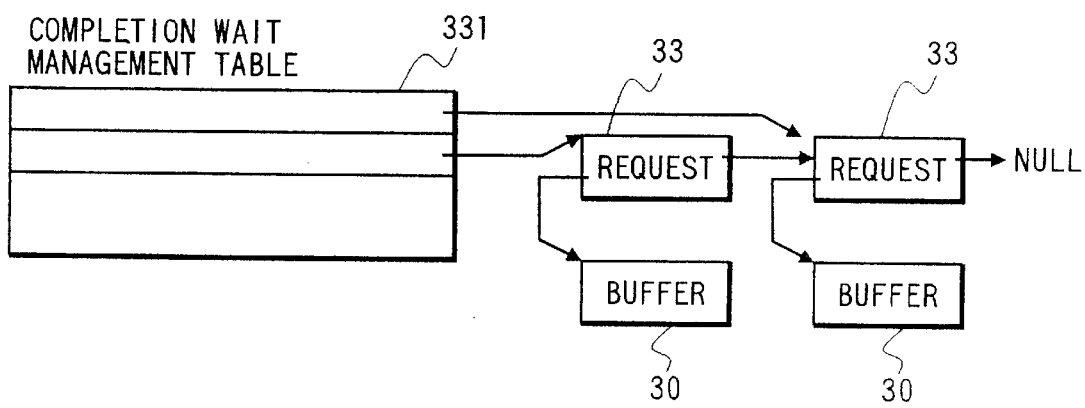
FIG. 7B is a block diagram for describing a completion wait management table employed in the embodiment 1.

FIGS. 7A and 7B respectively illustrate management information tables to which the driver 345 refers when the driver 345 issues an input/output start command.

A wait request management table 330 shown in FIG. 7A is of a table for holding therein requests 33 issued from the high-order protocol process 343 when the driver 345 cannot immediately process the requests 33 (when the CH 142 is busy, for example). The requests 33 issued therefrom include an address for the next request, the type of request (transmission/reception) and addresses for buffers 30 for storing therein data (PDU) used by the protocol process 343. The wait request management table 330 holds therein a head address of a series of requests 33, a final address thereof and the number of the series of requests 33, etc. to manage these requests 33.

A completion wait management table 331 shown in FIG. 7B is of a table for managing a command end response that does not yet come back from the CH 142 to which a command has been already issued. Incidentally, the present table 331 is identical in configuration and control system to the wait request management table 330.

FIG. 8 is a flow chart for describing a processing logic of the driver 345 after having received the requests 33 from the high-order protocol process 343.

First of all, the driver 345 checks the wait request management table 330 to make a decision as to whether a wait for request is null and the state of the CH 142 is unbusy (Step 3501). If it is judged that the wait for request is null and the CH 142 is not busy, then the driver 345 proceeds to Step 3503. If it is judged that the wait for request exists or the CH 142 is busy, then it proceeds to Step 3509 where the wait request management table 330 is updated so as to enqueue a corresponding request 33 that has been newly accepted (Step 3509). Thereafter, the processing is finished. If the decision at Step 3501 is true, then a CCW sequence is created in accordance with the corresponding request 33 (Step 3503). Next, the head address or the like in the CCW sequence created at the previous Step is set to create an expansion CAW 301 (Step 3505). Thereafter, the driver 345 loads a channel address for specifying a CH 142 to be started and issues an input/output start command 200 (Step 3507).

Thus, the description of the series of processes for issuing the command in accordance with the request from the high-order protocol process 343 is completed.

Figure 9:
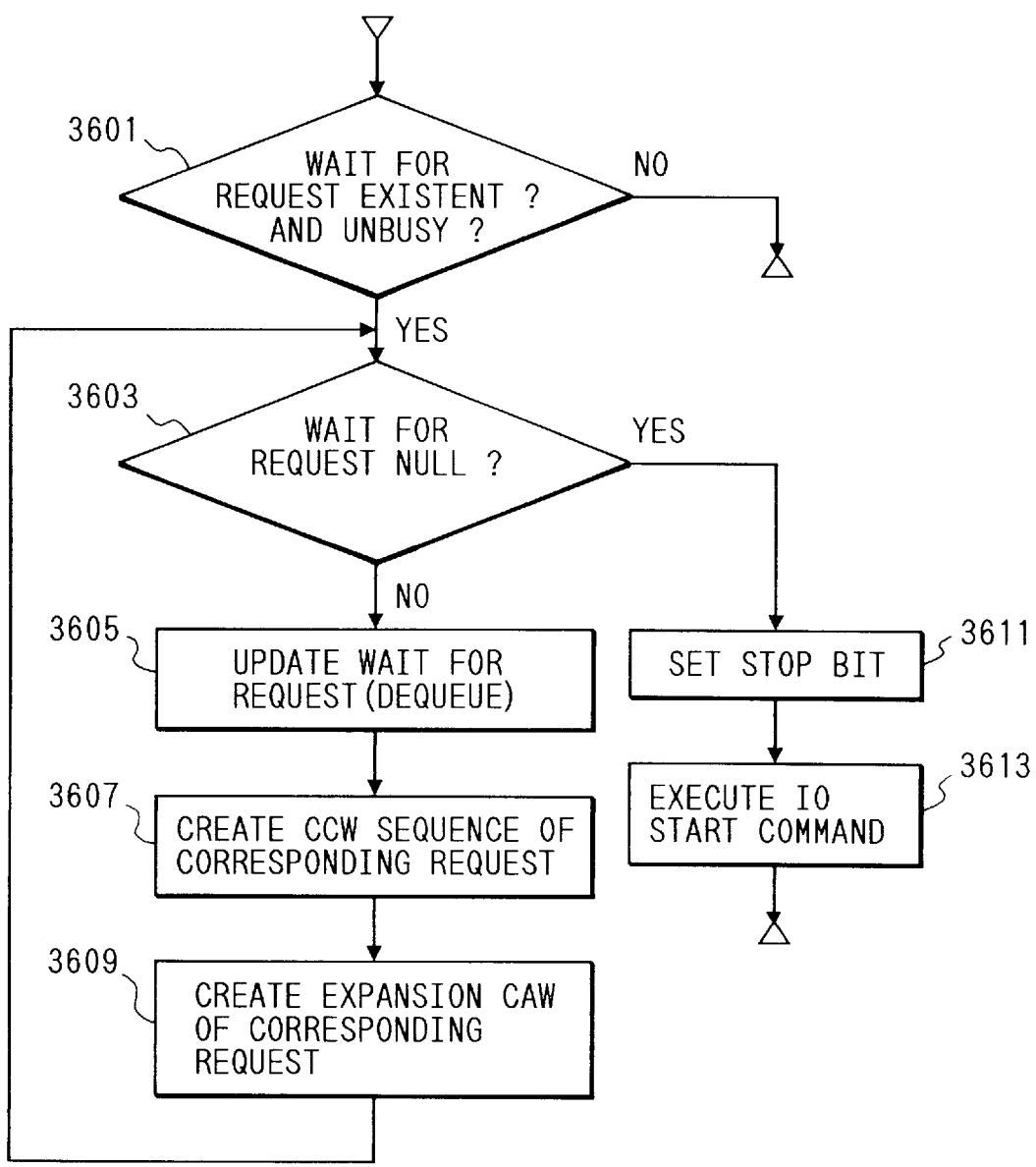
FIG. 9 is a flow chart for describing a command issuing operation executed in the embodiment 1 after an input/output interruption has been accepted.

FIG. 9 is a flow chart for describing a command reissuance processing logic of the driver 345 after having received a request for end interrupt from the CH 142. When the end interrupt caused by the CH 142 is received, the driver 345 executes an end interrupting process. However, the driver 345 executes a command reissuing process shown in FIG. 9 after execution of the end interrupting process.

The driver 345 firstly checks the wait request management table 330 to make a decision as to whether a wait for request exists and the state of a CH 142 is unbusy (Step 3601). If it is judged that the wait for request is present and the CH 142 is not busy, then the driver 345 proceeds to Step 3603. If it is judged that the wait for request is null or the CH 142 is busy, then the processing is finished. It is checked at Step 3603 whether the wait for request exists in the wait request management table 330 (Step 3603). If the wait for request is judged as present, then the wait for request is dequeued from the wait request management table 330 (Step 3605). Thereafter, a CCW sequence is created in accordance with the dequeued request 33 (Step 3607). Further, an expansion CAW 301 is created by setting the head address or the like in the CCW sequence created at the previous step (Step 3609). Next, the processes are repeated again from Step 3603.

Thus, Steps 3603 through 3609 are repeatedly executed for all waits for request of the wait request management table 330 to create the CCW sequences and the expansion CAW 301 illustrated in FIG. 3.

If it is judged at Step 3603 that the wait for request is null, then stop bits of the expansion CAW 301 are set (Step 3611). Described specifically, the stop bit of the final command block in the expansion CAW 301 is set as ON (1) and each of the stop bits of the command blocks preceding the final command block is set as OFF (0). Next, the driver 345 loads a channel address for specifying a CH 142 to be started up and executes an input/output start command 200 (Step 3613).

When the wait for request is dequeued from the wait request management table 330 at Step 3605, the dequeued wait for request is added to the completion wait management table 331. When the corresponding input/output processing is completed and an interrupt is caused by the CH 142, the completion of input/output processing is confirmed upon an end interrupting process thereof and the corresponding wait for request is deleted from the completion wait management table 331.

[Embodiment 2]

Figure 10:
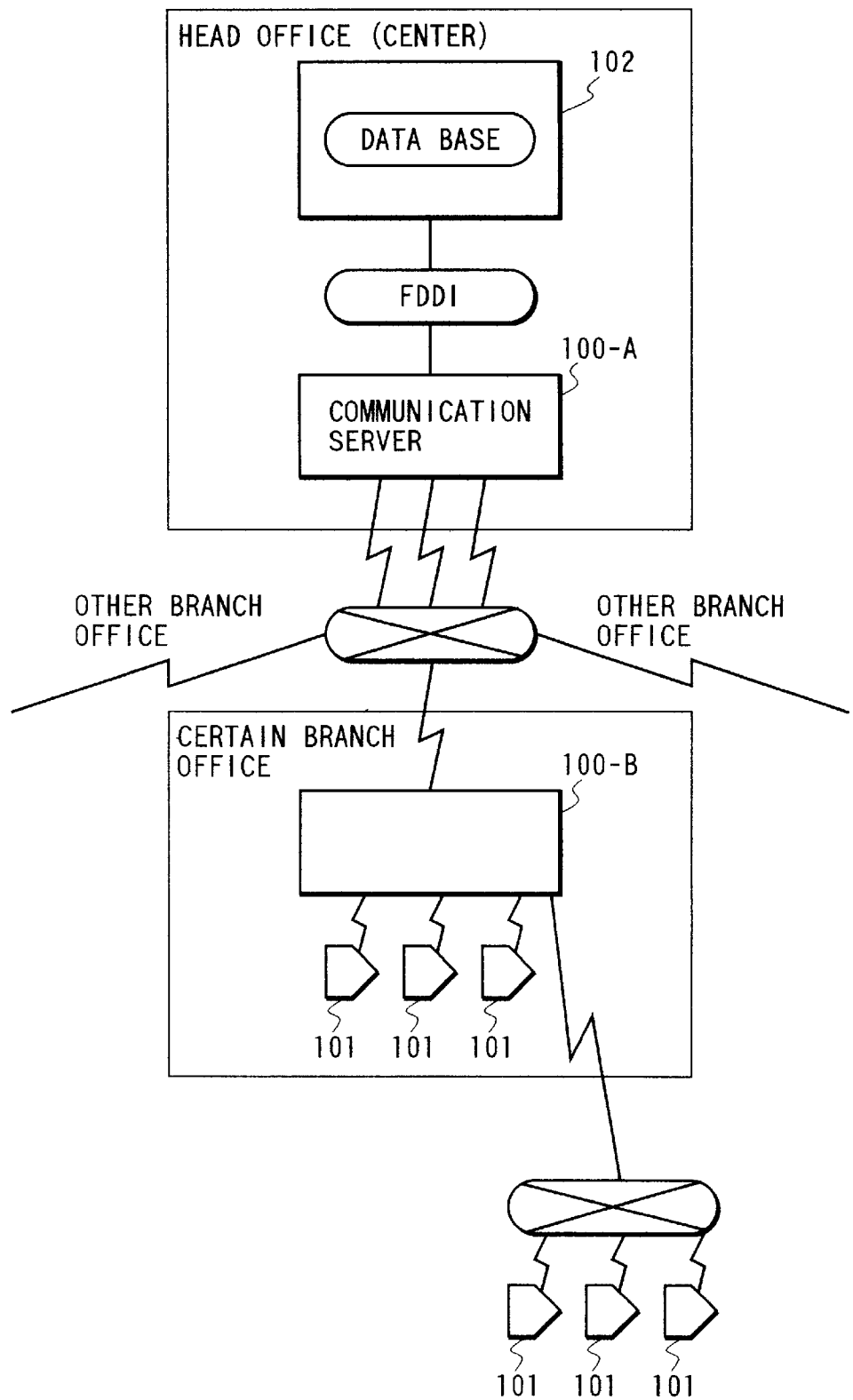
FIG. 10 is a block diagram showing a large-scale on-line processing system to which an embodiment 2 is applied.

An embodiment 2 shows a case in which the present invention is applied to communication servers 100-A and 100-B of a large-scale on-line processing system shown in FIG. 10. The embodiment 2 will hereinafter be described with reference to FIGS. 10 through 23.

Referring to FIG. 10, a head office has a host computer 102 and controls a large-scale data base. The host computer 102 and the communication server 100-A both provided in the head office are electrically connected to one another by an FDDI that is of a high-speed LAN. The communication server 100-A in the head office and a plurality of communication servers in branch offices are electrically connected to one another by high-speed lines or circuits. A system configuration of one branch office is typically shown in FIG. 10. A plurality of in-shop terminals 101 are electrically connected to the communication server 100-B in the branch office through telephone lines. A number of terminals 101, which are provided at a distant location, are electrically connected to the communication server 100-B through a public network.

Figure 11:
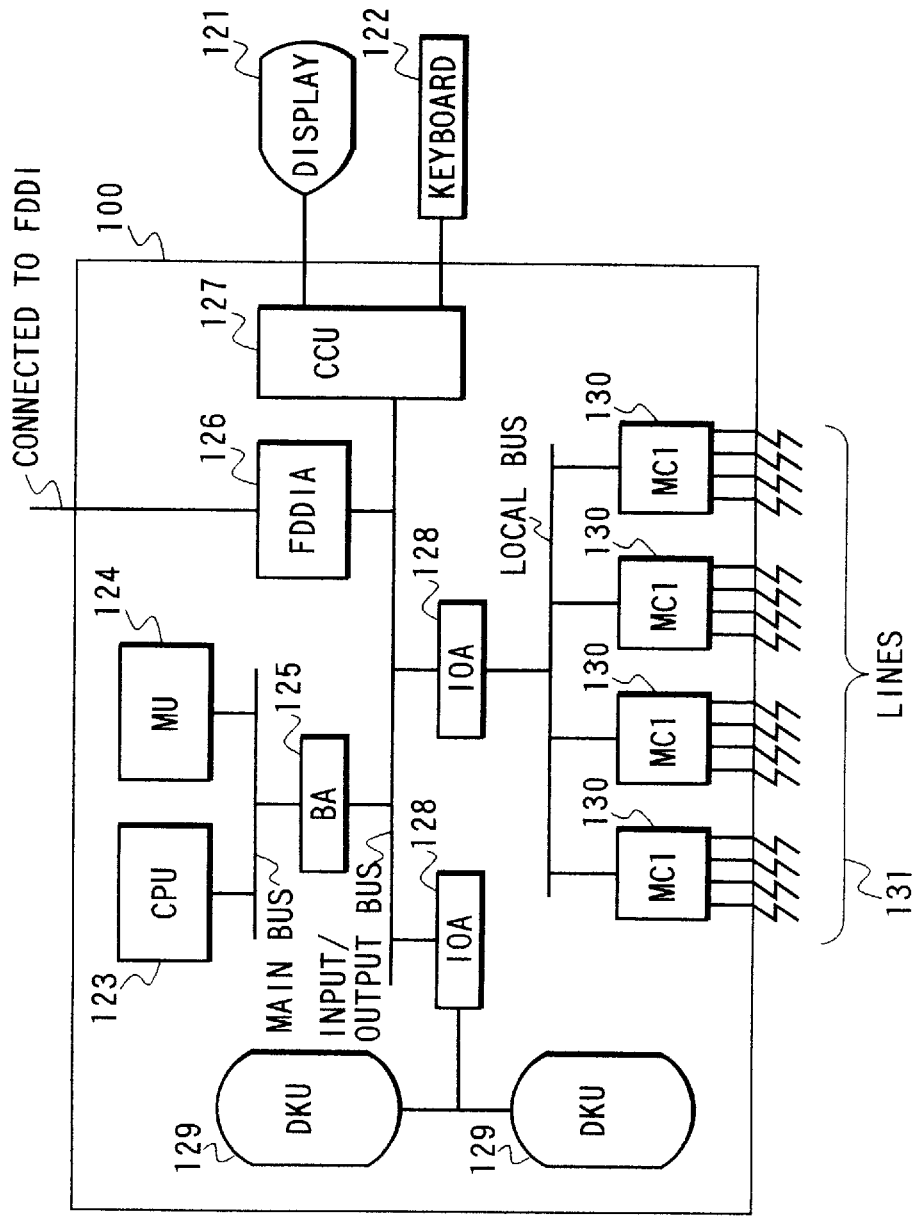
FIG. 11 is a block diagram showing a configuration of a communication server employed in the embodiment 2.

Hardware configurations of the communication servers 100-A and 100-B shown in FIG. 10 are both shown in FIG. 11. Messages are displayed on a display 121 for a user. On the other hand, the user inputs an operation command via a keyboard 122. A CPU 123 performs software processes such as an on-line processing program etc. The software programs, various control tables and buffers are stored in an MU (Memory Unit) 124. The CPU 123 and the MU 124 are electrically coupled to each other via a main bus.

An input/output bus is electrically connected to the main bus with a BA (Bus Adapter) 125 interposed therebetween. The reason the main bus is separated from the input/output bus, is that when the CPU is directly connected to a low-speed input/output device, the bus must coincide in response speed with the low-speed input/output device, thus causing deterioration of the performance of the CPU.

Further, the communication server includes input/output control devices such as DKUs (Disk Units) 129, MCIs (Multi Circuit control devices) 130, etc. These input/output control devices and the input/output bus are electrically connected to one another by IOAs (Input/Output Adapters) 128. Particularly, a plurality of the MCIs 130 are electrically connected to a single IOA 128 through a local bus (SCSI bus). The reason is that since the number of lines or circuits 131 connectable to the single MCI 130 is limited. An FDDIA (FDDI Adapter) 126, which is of an adapter device of a high-speed LAN, and a CCU (Console Control Unit) 127 are electrically coupled to the input/output bus.

A summary of the input/output operation will be described based on the configuration of the present device shown in FIG. 11. When one of the IOAs-128 receives an input/output command from the CPU 123 through the BA 125, the IOA 128 starts an input/output operation thereof. When data is transmitted, the IOA 128 transfers designated or specified data from the MU 124 to its corresponding MCI 130. When data is received, the data is transferred from the corresponding MCI 130 to a specified area of the MU 124 through the BA 125. Each of the MCIs 130 has a buffer for storing data therein.

As described above, the CPU 123 has the authority to transfer data between each MCI 130 used as the input/output control device and the MU 124. The input/output command issued from the CPU 123 comprises instructions given to the corresponding IOA 128 and instructions given to the corresponding line or circuit 131. When the input/output command is executed by the MCI 130, data communications are made through the corresponding circuit.

FIG. 12 illustrates information stored in the MU 124. The information comprises three large parts. The three parts are programs executed by various software, reference tables thereof and buffer regions.

The various software include OS Kernel for performing memory control, process control, etc., console control for doing input and output between the display 121 and the keyboard 122, file management for updating a log file etc., a control soft group comprised of communication management for performing data communications through circuits and FDDIs, and various application program groups such as an on-line process etc. The reference tables and the buffer regions are respectively provided so as to correspond to these components.

The communication management program is similar to the communication management program 340 described in FIG. 6. Particularly, the driver of the communication management program prepares interface information having a structure shown in FIG. 16 to be described later and issues an input/output start command to the corresponding IOA 128. When the driver and the protocol process of the communication management employed in the present embodiment 2 are described, reference numerals shown in FIG. 6 will be hereafter used.

Figure 13:
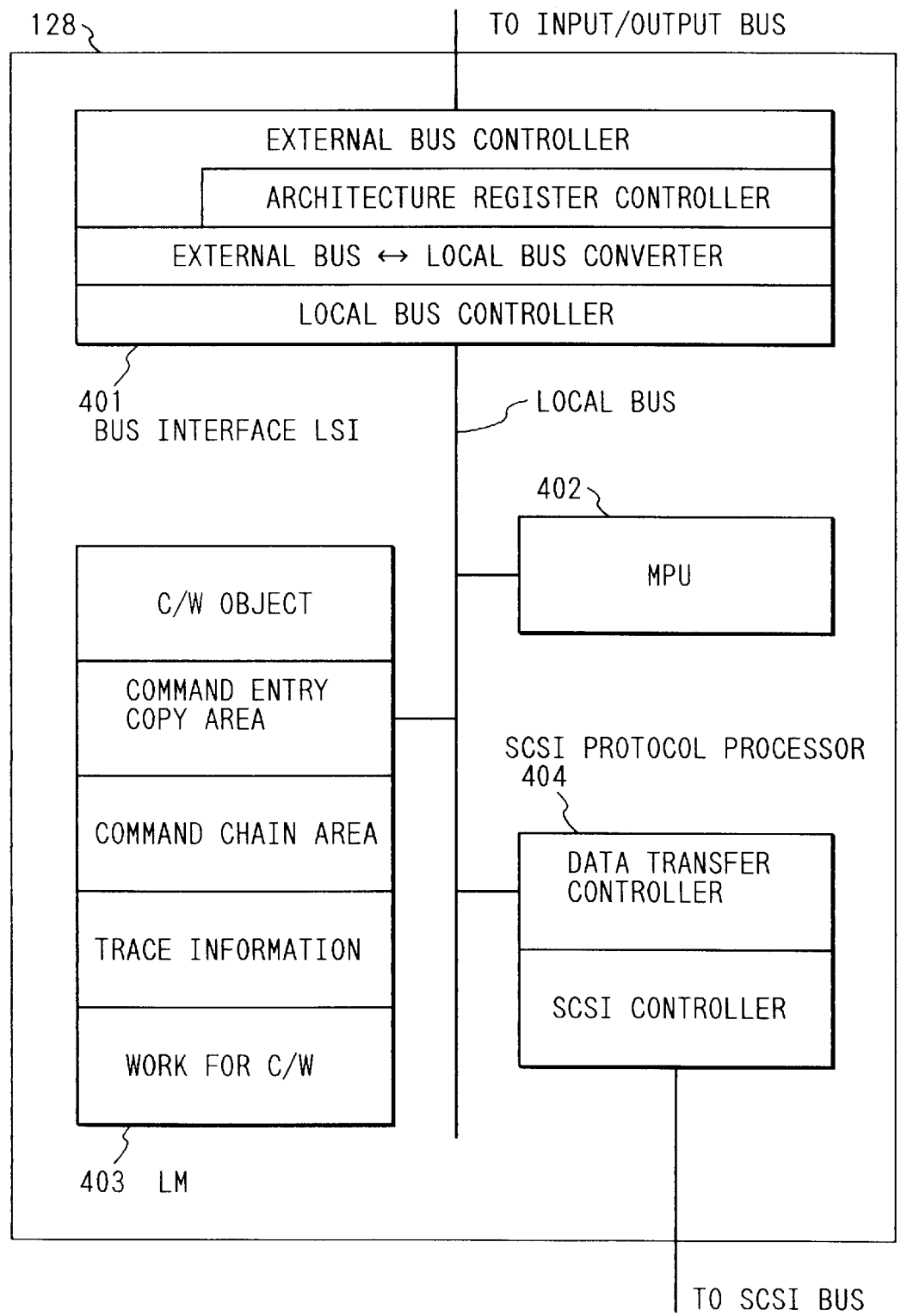
FIG. 13 is a block diagram showing a configuration of an IO adapter employed in the embodiment 2.

FIG. 13 is a block diagram showing an internal structure of each IOA 128. The IOA 128 comprises the following functional blocks. Namely, the IOA 128 comprises a bus interface LSI 401 for controlling the interface between an external bus corresponding to an input/output bus and a local bus corresponding to an internal bus of the IOA 128, an MPU 402 (called "MPU" in the present embodiment to draw a distinction between the MPU 402 and the CPU 123 corresponding to a processing unit of the main body 100), a local memory (LM) 403 and an SCSI protocol processor 404.

The bus interface LSI 401 accepts instructions given to the corresponding IOA 128 from the CPU 123. The bus interface LSI 401 is made up of the following four functional blocks. Namely, an external bus controller is of a block for controlling the opening and closing of a path for a data bus in response to the value of an address signal produced from the CPU 123 and controlling a signal for interrupting the CPU 123. A architecture register controller is of a block for controlling a register group for interface with the CPU 123 and an access (writing of input/output information, an interrupt to the MPU 402 or the like) to the register group. An external bus-local bus converter is of a block for making a mapping between an address signal at the external bus and an address signal at the local bus. A local bus controller is of a block for controlling the opening and closing of the local bus.

IOA control programs (C/W object) and information (command entry, command chain, trace and work) necessary for control are recorded in the local memory (LM) 403. These information will be described later. The SCSI protocol processor 404 partakes both of an SCSI controller having a function of controlling an SCSI bus and a data transfer controller having a DMA transfer function.

Figure 14:
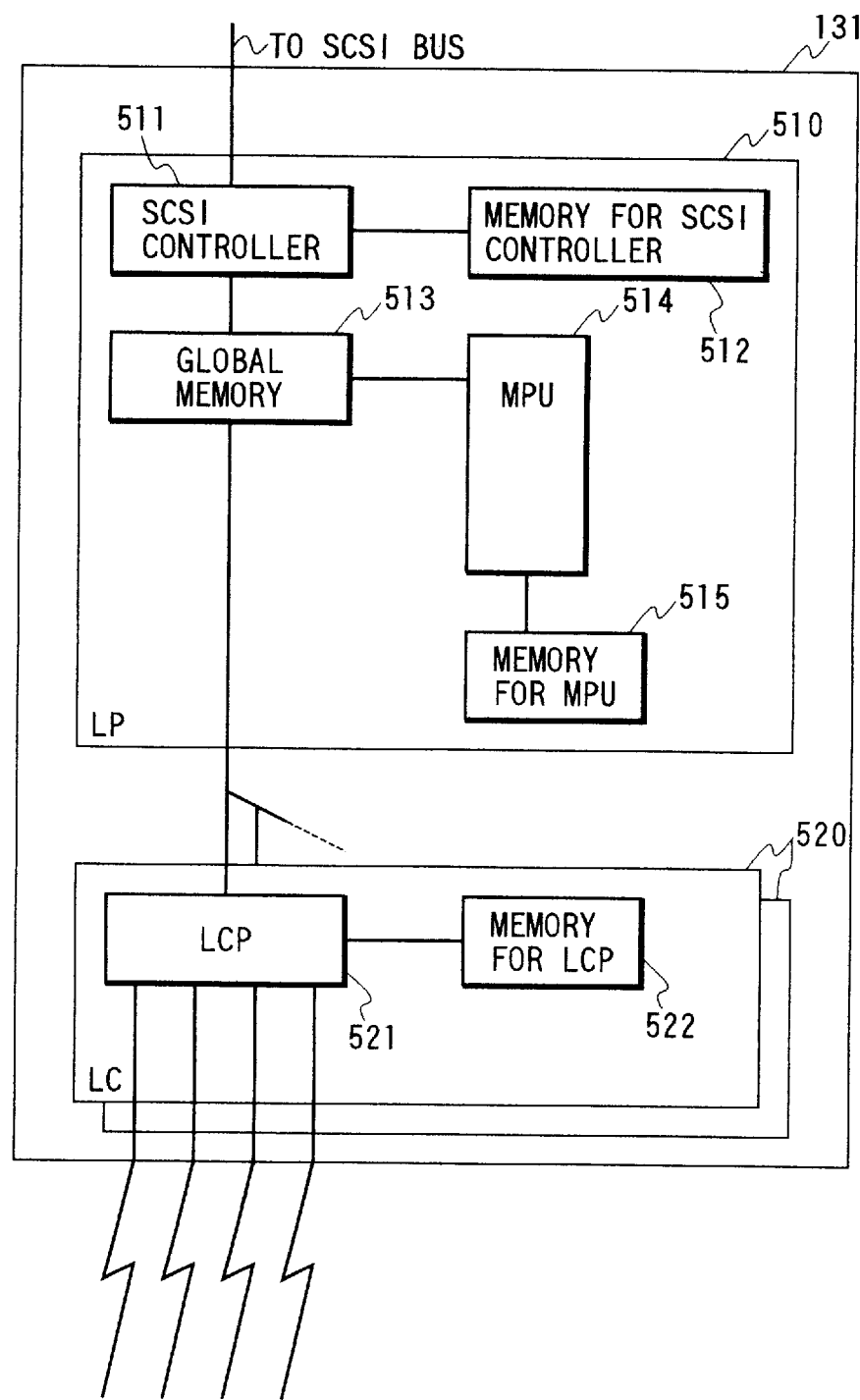
FIG. 14 is a block diagram illustrating a configuration of a multi-circuit control device employed in the embodiment 2.

FIG. 14 shows an internal structure of an MCI 130 which performs a data input/output process for each line or circuit according to a series of commands sent from the IOA 128 through the SCSI bus. The MCI 130 is composed of the following two large components: an LP 510 and an LC 520.

The LP 510 is of a processor module for processing a second-layer communication protocol. On the other hand, the LC 520 is of a processor module which processes an interface with each of physical lines or circuits and which is provided in plural form. The LP 510 corresponds to each of the IOCUs 147 employed in the first embodiment, whereas the LC 520 corresponds to each of the DEVs 148 employed in the first embodiment.

The LP 510 comprises an SCSI controller 511 for controlling the SCSI bus interface, a memory 512 for the SCSI controller 511, a global memory 513 corresponding to a buffer for communication data, an MPU 514 and a memory 515 for the MPU 514. On the other hand, the LC 520 comprises an LCP 521 corresponding to an LC processor and a memory 522 for the LCP 521.

Figure 15:
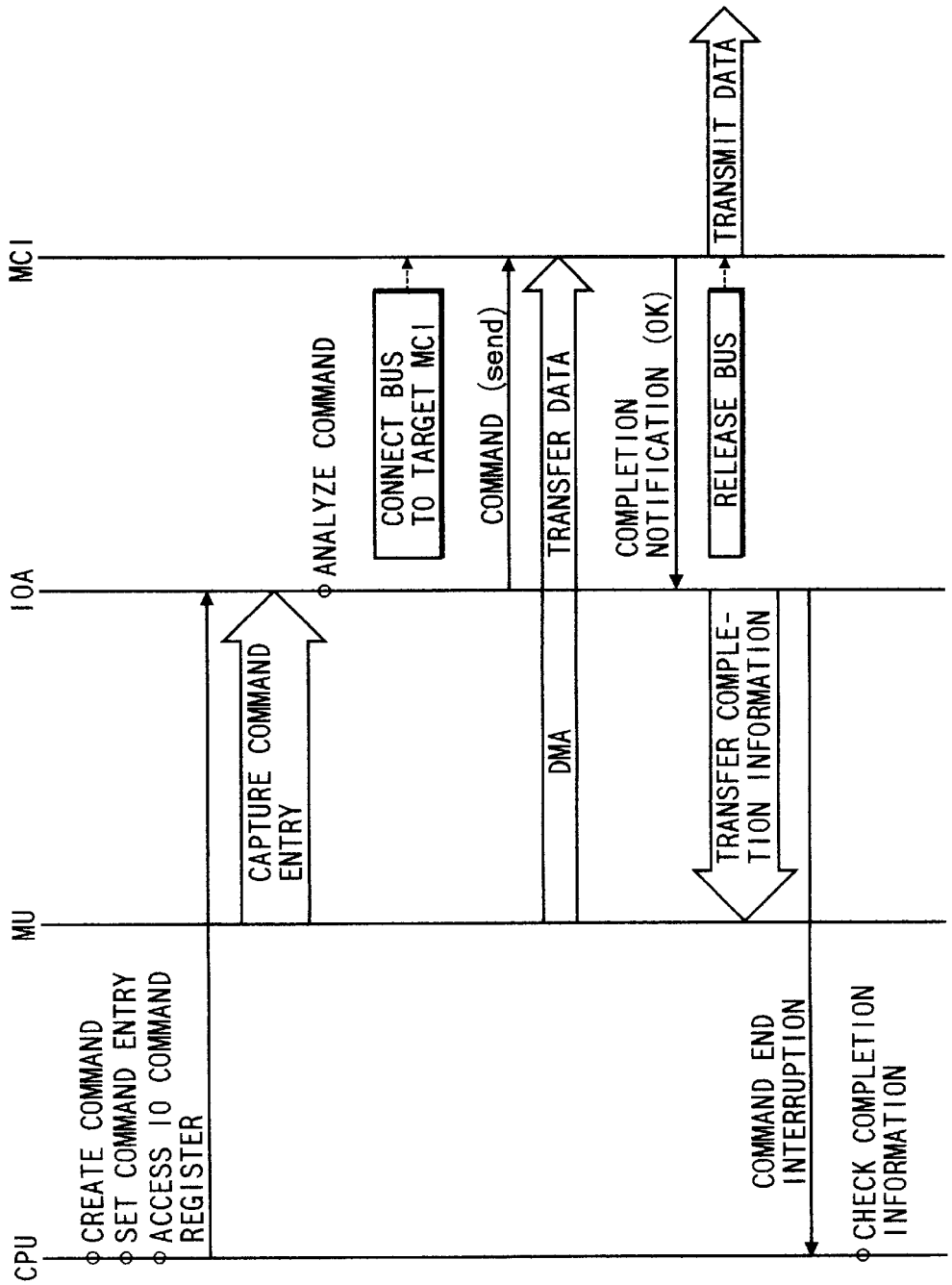
FIG. 15 is a sequential view for describing the operation of the embodiment 2 at the time of transmission of data.

FIG. 15 shows a sequence at the time of transmission of data by the communication server employed in the embodiment 2. The CPU 123 first creates a command 505 (to be described later) and sets it to its corresponding command entry 504 (to be described later). Next, the CPU 123 obtains access to an IO command register 501 (to be described later) so as to start the corresponding IOA 128. Thereafter, the started IOA 128 is activated so as to take the command entry 504 in its corresponding LM 403. The IOA 128 finds a corresponding or intended command from the captured command entry information and analyzes the contents of the command. Further, the IOA 128 couples a target MCI 130 and the local bus to each other. Thereafter, the IOA 128 issues a send command to the MCI 130. Next, the IOA 128 transfers transmit data from the MU 124 to the global memory 513 of the corresponding MCI 130. Thereafter, the IOA 128 that has received a data transfer completion notification from the corresponding MCI 130, opens or releases the SCSI bus and simultaneously writes completion information into the MU 124. Further, when a command end interruption takes place, the IOA 128 notifies the completion of the command to the CPU 123. The CPU 123 started by the command end interruption checks the completion information.

Figure 16:
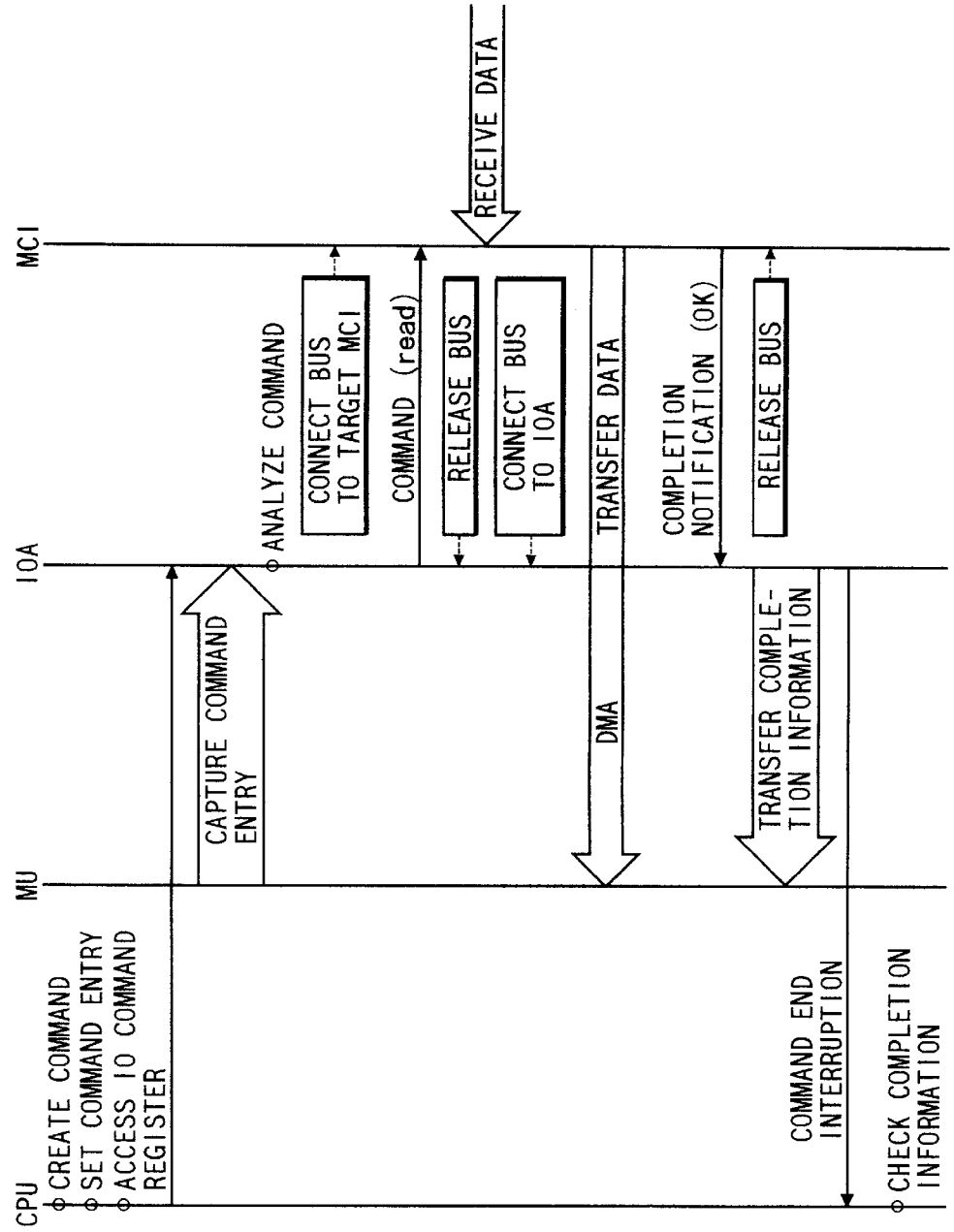
FIG. 16 is a sequential view for describing the operation of the embodiment 2 at the time of reception of data.

FIG. 16 shows another sequence at the time of reception of data by the communication server employed in the embodiment 2. A sequence up to the issuance of a command from the IOA 128 is similar to the sequence at the time of the data transmission shown in FIG. 15. The dissimilarity between the two is that the command to be issued from the IOA 128 is a read command. After the read command has been issued from the IOA 128, the IOA 128 waits for a signal produced from the corresponding MCI 130. If it is judged that receive data is not yet received by the corresponding MCI 130, then the IOA 128 releases the bus in response to a bus release request issued from the MCI 130. After the data has been received by the MCI 130, the MCI 130 issues a reception notification to the IOA 128. The IOA 128 that has accepted the reception notification therein, makes a reconnection between the MCI 130 and the bus so as to transfer the receive data to the MU 124 by DMA transfer. A sequence subsequent to this processing is similar to that at the time of the data transmission described by reference to FIG. 15.

Figure 17:
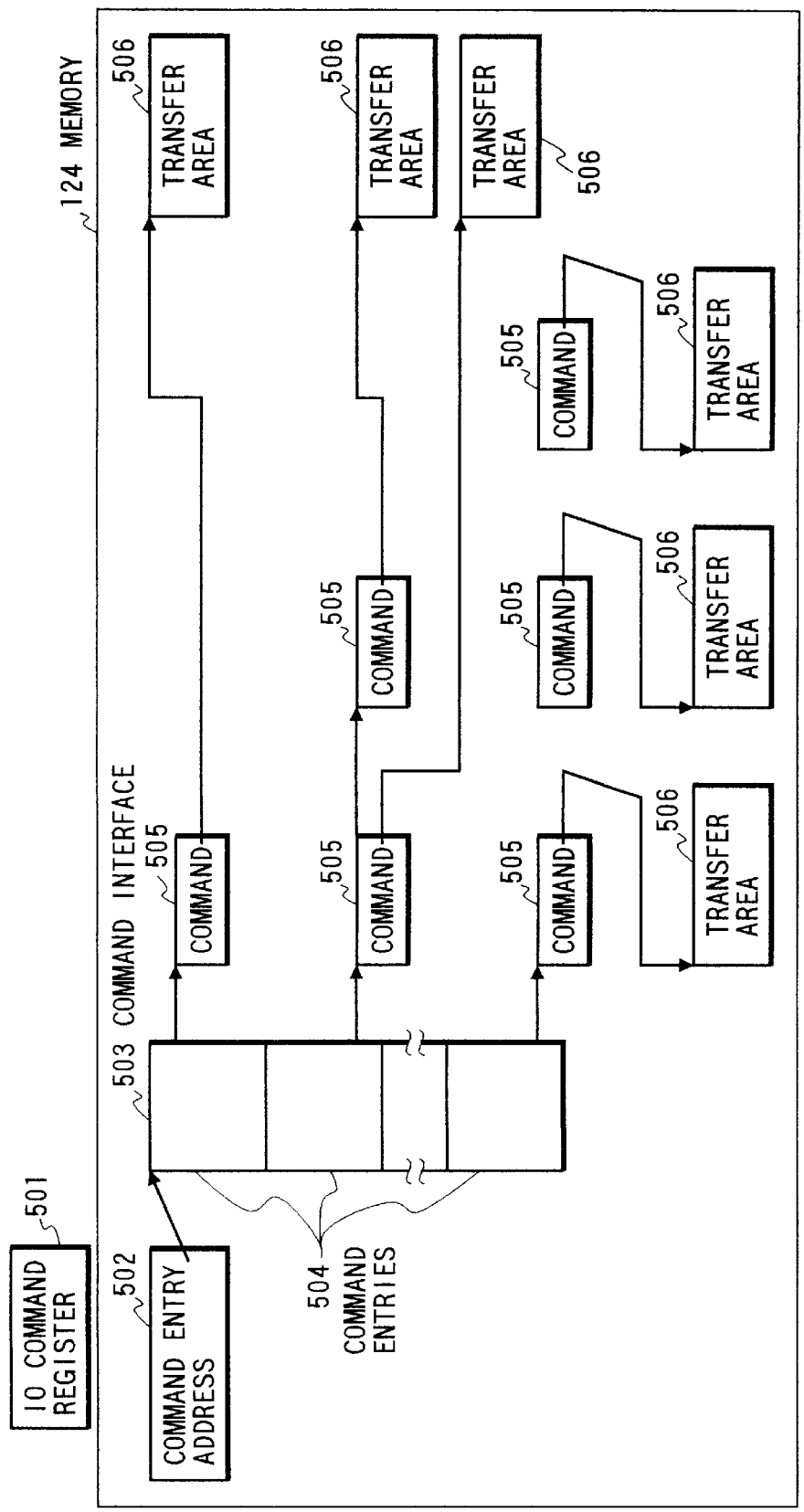
FIG. 17 is a conceptual view showing a configuration of interface information employed in the embodiment 2.

FIG. 17 is a view showing a relationship of interface information between CPU and IOA, which is used as a reference upon input/output operation. Since a RISC type processor is used for the CPU 123 in the present embodiment, a dedicated command cannot be used as an input/output start command. Therefore, a memory-mapped IO system is used as an IO system. This is one of a type wherein a part of memory spaces of the CPU 123 is assigned to the IO command register 501 of the IOA 128. The execution of a load command with respect to an address at the IO command register 501 represents obtaining access to the IO command register 501 and is equivalent to the issuance of the input/output start command.

A command entry address 502 shows information provided at a fixed address in the MU 124 and is equivalent to one set by recording addresses in the head command entry 504 to be read by the IOA 128. It is needless to say that the IOA 128 already knows the addresses in the command entry address 502. A command interface 503 is equivalent to one (array) obtained by continuously arranging 512 command entries 504. The arrangement of command entries corresponding to the second power of 2 can simplify updating of a pointer at the time of a command entry reference process of the IOA 128.

Each of the command entries 504 has a pointer to each command 505. Each command 505 has information to a transfer area 506 and information about a pointer to the next command 505. The commands 505 are successively coupled to one another by pointers to the subsequent commands 505 so as to form a command sequence. A sequence of commands are pointed by one command entry 504. Therefore, a plurality of command sequences are pointed by the command interface 503.

Each transfer area 506 is of an area in which transmit data is stored upon transmission and serves as a buffer for storing receive data therein upon reception. After completion of the command, the transfer area 506 becomes an area in which the receive data has been stored.

Figure 18:
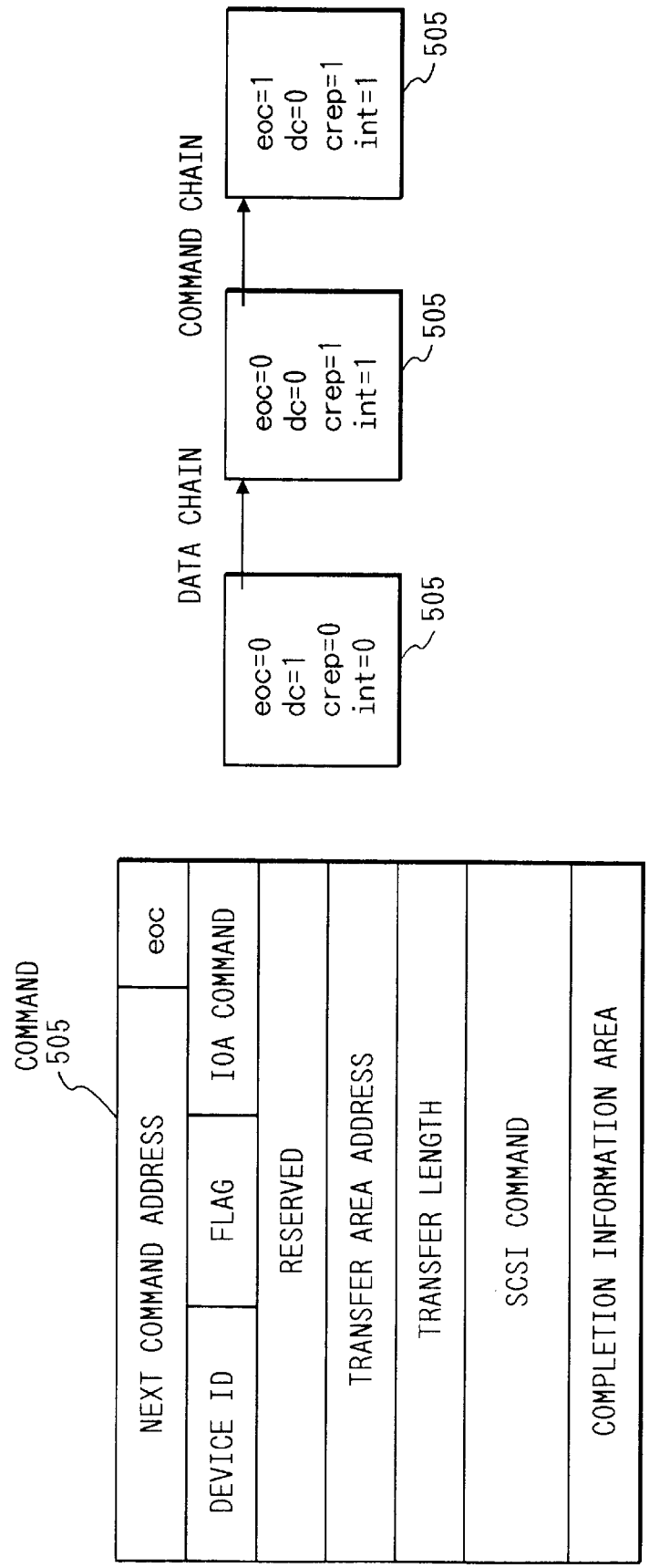
FIG. 18 is a conceptual view illustrating a configuration of a command employed in the embodiment 2.

FIG. 18 is a view for describing the command 505 in detail. A next command address shows pointer information for constructing a command sequence and is of a pointer to the next command 505. A flag eoc represents information indicative of the last of the command sequence. When the flag eoc is 0, the flag eoc shows that the next command exists after the corresponding command. When the flag eoc is 1, the flag eoc shows that the corresponding command is of the final command of the command sequence. A device ID shows information for identifying a line or circuit.

A flag region comprises the following three flags: dc, crep and int flags.

The dc flag is of one for constituting a data chain. The data chain is defined when the corresponding command is identical to the next command. Namely, when the next command is of a command that performs the same input/output operation as that of the corresponding command on another data region, the dc flag of the corresponding command is set to 1. If other than it, then the dc flag is set to 0. A command chain is defined when the corresponding command differs from the next command. The crep flag is of information for specifying the creation of completion information when an operation based on the corresponding command is completed. The int flag is of information for specifying the triggering of an end interrupt when the operation based on the corresponding command is completed. In the present embodiment, the completion information is received when the interruption occurs after completion of each command.

An IOA command is of information that means a DMA start request. A transfer area address shows an address for the aforementioned transfer area 506 and a transfer length shows the length thereof. An SCSI command is of a command (read/send or the like) that is to be executed by the corresponding MCI 130. A completion information area is of an area in which the completion information is recorded by the corresponding IOA 128. Incidentally, each command 505 is composed of 8 words that give easy reference to the IOA 128.

Figure 19:
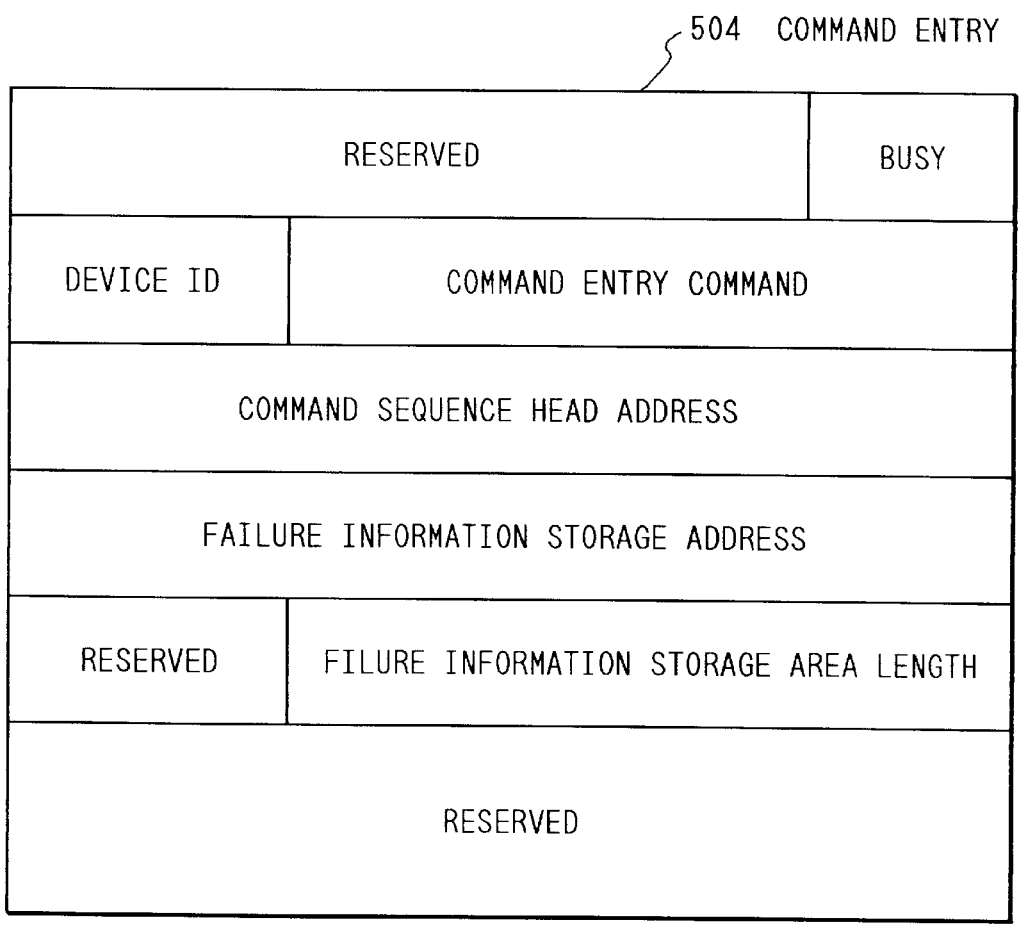
FIG. 19 is a conceptual view depicting a configuration of a command entry employed in the embodiment 2.

FIG. 19 is a view for describing the command entry 504 in detail. A flag busy is of a flag indicative of whether the IOA 128 has captured the corresponding command entry 504 from the MU 124 to the LM 403. Namely, the CPU 123 sets 1 when the command entry 504 is created within the MU 124. When the IOA 128 is started and reads the created command entry 504, the CPU sets 0.

A device ID in the command entry 504 is identical to that in the command 505 and shows identifier information for designating or specifying a device (line or circuit in the present embodiment) for performing input/output processing. Incidentally, one device specified by the device ID of the command entry 504 becomes an object to input and output a series of commands 505 pointed by the corresponding command entry 504. Thus, the column of the device ID in each command 505 shown in FIG. 18 is not necessarily required. However, the device ID is provided to perform an on-failure process etc.

Referring to FIG. 19 again, a value indicative of the DMA transfer is written into a command entry command in each command entry 504. A command sequence head address is of an address for a leading command 505 in a command sequence. A failure information storage address is of an address for an area for storing on-occurrence-of-failure information therein. A failure information storage area length shows the size of the above area. Incidentally, the command entry 504 is composed of 8 words that provides easy reference for the IOA 128.

Figure 20:
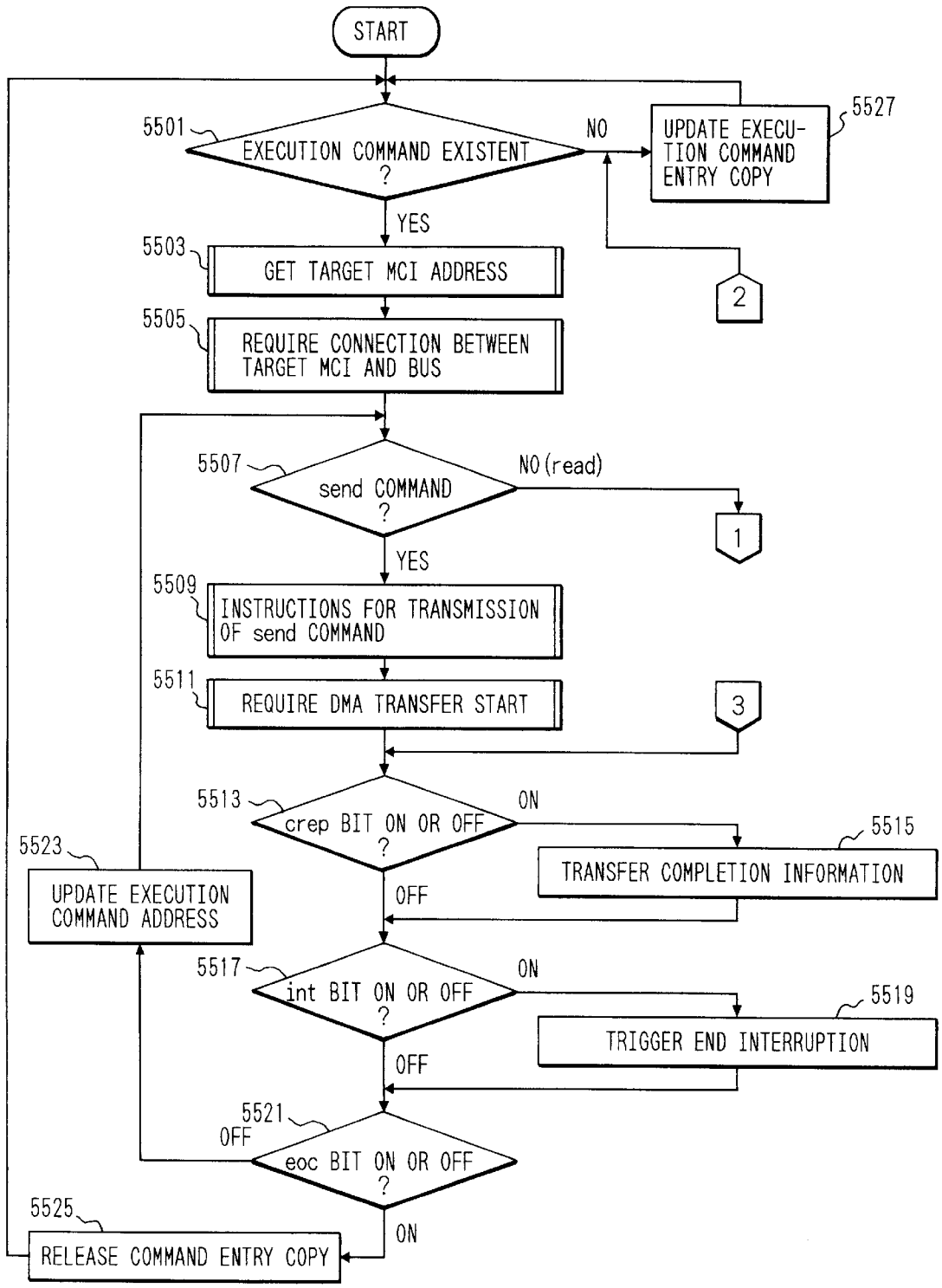
FIGS. 20, 21 and 22 are respectively flow charts for describing processes of the IO adapter employed in the embodiment 2.
Figure 21:
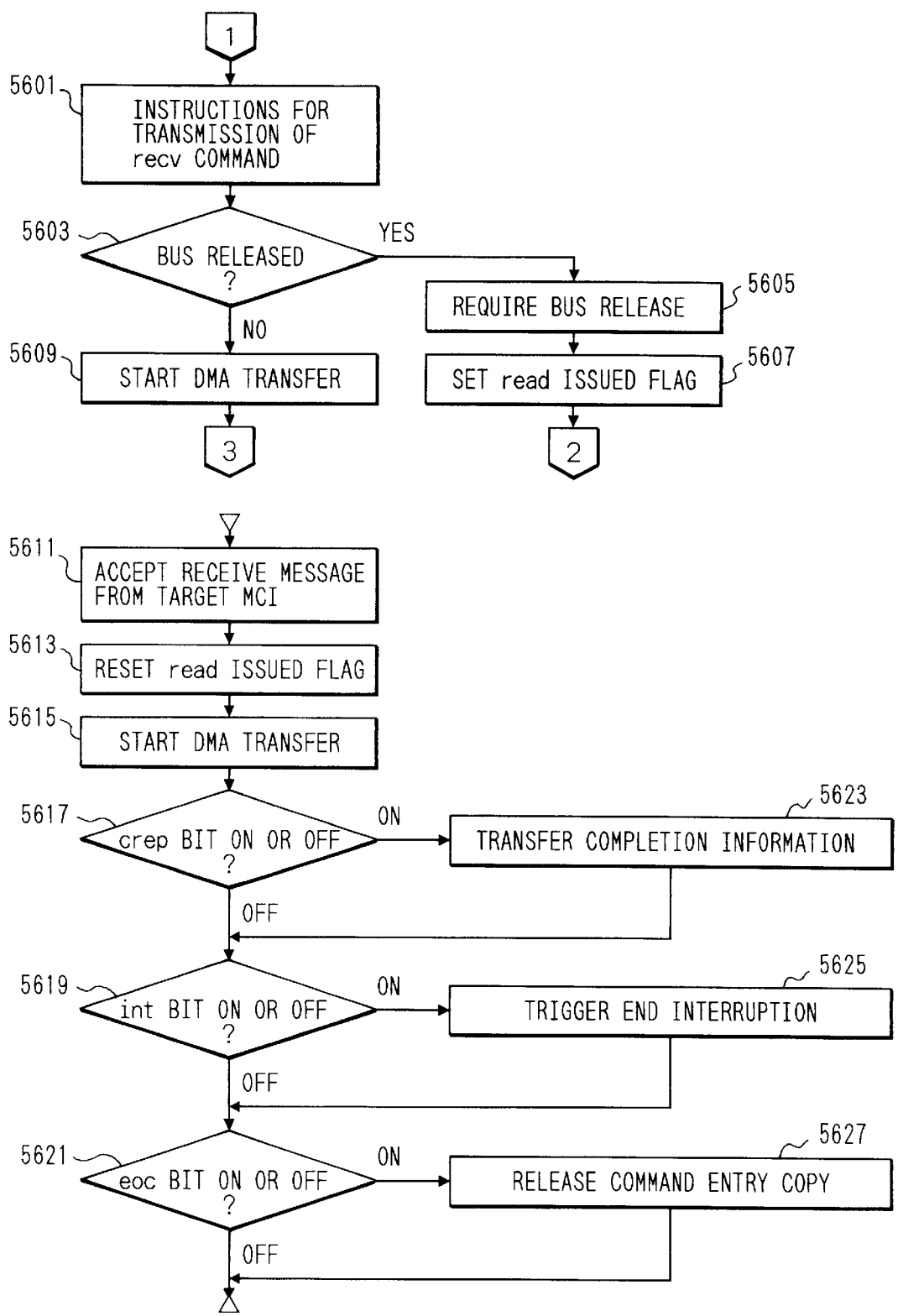
Figures 22, 24:
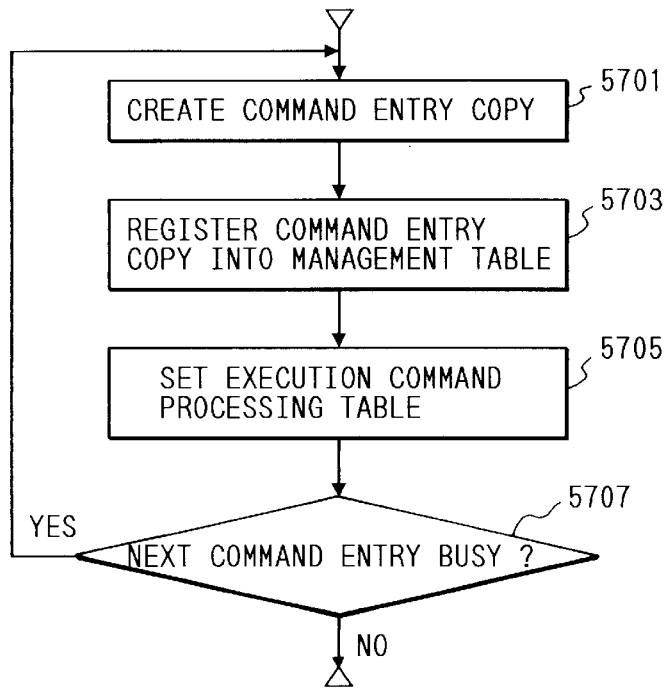
FIG. 24 is a conceptual view illustrating a configuration of a first-out Read command management table employed in an embodiment 3.
Figure 23:
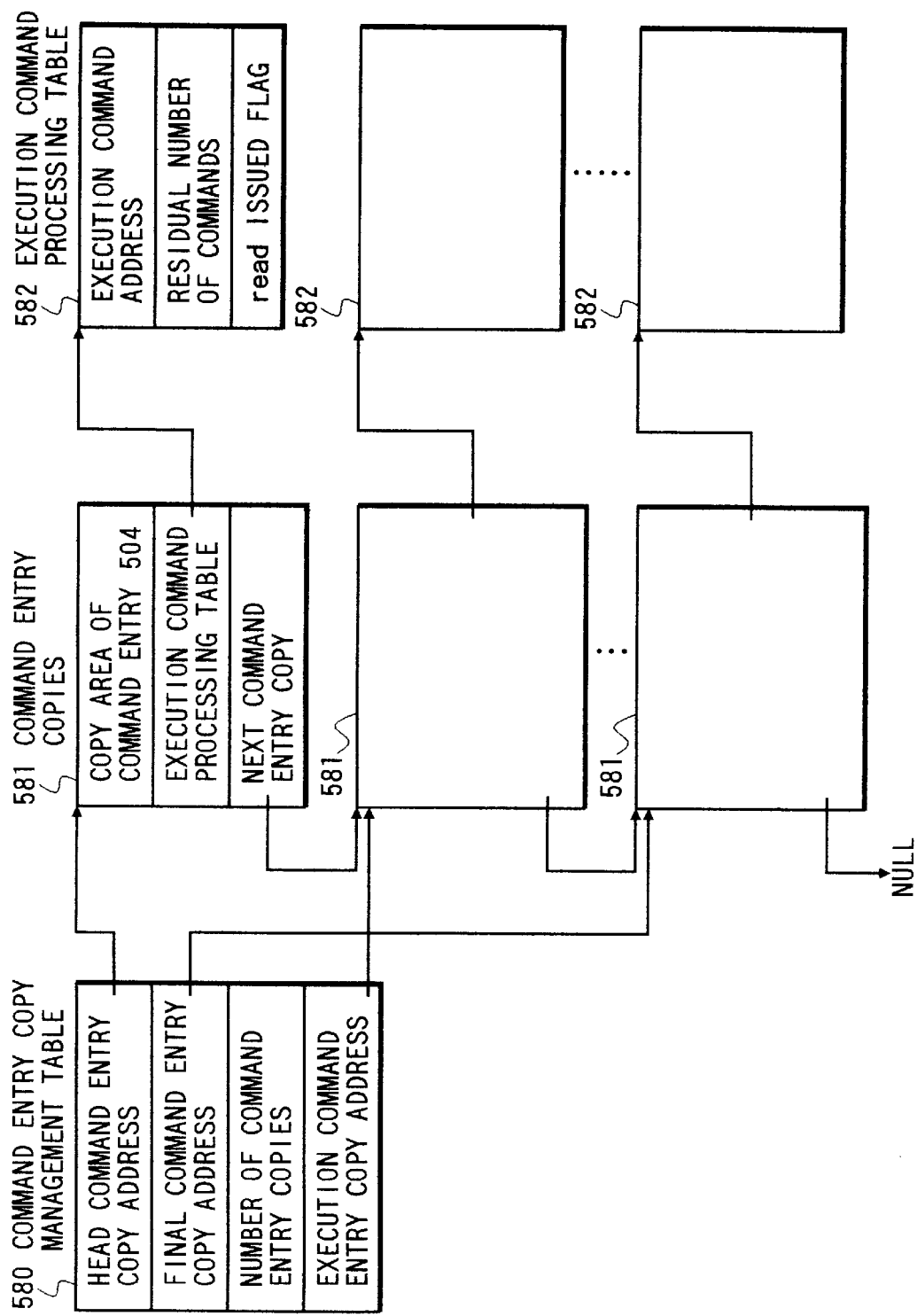
FIG. 23 is a conceptual view showing a relationship between tables of the IO adapter employed in the embodiment 2.

A processing logic of the IOA 128 will now be described. FIGS. 20, 21 and 22 are respectively flow charts for describing a processing logic of the MPU 402 in the IOA 128 shown in FIG. 13. FIG. 23 shows an information structure on the LM 403 which refers to the processing logic.

The information structure on the LM 403 will be described with reference to FIG. 23 before description of the processing logic of the IOA 128. A command entry copy management table 580 is of a table for managing a command entry captured or brought from the MU 124 by the IOA 128. Each of command entry copies 581 is of a table for storing the captured command entry copy or the like therein. Each of execution command processing tables 582 is of a table to which reference is made upon command processing.

The command entry copy management table 580 holds therein an address for a head command entry copy 581 and an address for a final command entry copy 581 to manage a series of command entry copies 581 coupled to one another by chains. The number of command entry copies is equivalent to the number of the command entry copies 581 managed by the table 580. An execution command entry copy address is of an address for a command entry copy 581 while being executed.

The command entry copy 581 is of information created by capturing a command entry and is comprised of an area in which necessary information is copied from the corresponding command entry 504, an address for the execution command processing table 582 and pointer information about the next command entry copy.

The execution command processing table 582 is of a processing table in which information necessary for transfer processing of each command is recorded, and comprises an execution command address indicative of the position of a command while being in execution, the number of remaining commands and a read command issued flag.

The processing logic of the IOA 128 will hereinafter be described in accordance with the processing sequences described by reference to FIGS. 15 and 16.

FIG. 22 is a flow chart for describing a processing logic of a command entry capturing process. As described by reference to FIGS. 15 and 16, the CPU 123 (and the driver 345 of the communication management 340) create the commands 505 each shown in FIG. 18, set the command entries 504 each shown in FIG. 19 within the MU 124 and finally create the interface information having the structure shown in FIG. 17 within the MU 124. Further, the CPU 123 obtains access to the corresponding IO command register 501 to trigger an interruption.

The IOA 128 starts the command entry capturing process shown in FIG. 22 in response to the interruption caused by the CPU 123. Upon the present process, the MPU 402 in the IOA 128 starts processing from the corresponding command entry 504 specified by the value of the command entry address 502.

First of all, the CPU 123 copies information about each command entry 504 set within the MU 124 onto the command entry copy area in the LM 403 (Step 5701). Next, the CPU 123 registers the created command entry copy 581 (see FIG. 23) into the command entry copy management table 580 (Step 5703).

These processes correspond to a mode of adding a new command entry copy 581 to the last of the chains that couple the series of command entry copies 581 to one another. Namely, new each command entry copy 581 is firstly created within the command entry copy area in the LM 403 and information in the command entry 504 is copied onto the created command entry copy 581. Next, an address for the now created command entry copy 581 is set as the value of a column for a command entry copy after the command entry copy 581 coupled to the last of the chains that couple the series of command entry copies 581 to one another. Further, the address for the final command entry copy of the command entry copy management table 580 is brought up to date and the number of command entry copies is updated.

It is needless to say that the address for the head or leading command entry copy and the address for the execution command entry copy are also set upon initial registering (Step 5703). The initial value of the address for the execution command entry copy corresponds to the address for the head command entry copy 581.

A setting process of each execution command processing table 582 is next executed (Step 5705). Described specifically, a new execution command processing table 582 is created and an address for the corresponding execution command processing table 582 is set to the column of an address for the execution command processing table of the command entry copy 581 created at Step 5701. Further, the command sequence head address (see FIG. 19) of the created command entry copy 581 is set to the column of the execution command address in the corresponding execution command processing table 582. Furthermore, the sequence of commands chained to one another from the command sequence head address is checked and the number of command chains constituting the command sequence is recorded in the column for the number of remaining commands in the corresponding execution command processing table 582.

A decision process of the next command entry is next executed (Step 5707). Namely, after a busy flag of the corresponding command entry 504 has been cleared, an address for the next command entry 504 is calculated and the busy flag is checked. If the flag is up, it is then judged that the command entry 504 is not yet brought into its corresponding IOA 128. Therefore, the routine procedure is repeated from Step 5701 to continuously capture each command entry. If the flag is down at Step 5707, then the present interrupting process is finished (Step 5707).

A main logic of the command processes executed by the corresponding IOA 128 will be described with reference to FIGS. 20 and 21. FIG. 20 is a flow chart for describing the on-transmission process described by reference to FIG. 15. FIG. 21 is a flow chart for describing the on-reception process described by reference to FIG. 16.

The on-transmission process will be firstly described with reference to FIG. 20. An address (execution command address of corresponding execution command processing table 582) for storing a command to be executed is acquired along the chains from the execution command entry copy address of the command entry copy management table 580. It is checked whether the value of the acquired address is null or the read command issued flag is up (Step 5501).

If it is judged that the above value is null or the flag is up, then the execution command entry copy address of the command entry copy management table 580 is updated to obtain an execution command for a device different from the present device (it is updated to designate or specify the next command entry copy 581) (Step 5527) and the routine procedure is returned to Step 5501.

If the answer is NO at Step 5501, then a process for obtaining or getting an address for a target MCI indicative of an object for command execution from a device ID for the corresponding command entry copy 581 pointed by the execution command entry copy address of the command entry copy management table 580 is carried out (Step 5503). Next, the address obtained at Step 5503 is specified and a bus connection request is issued to the SCSI protocol processor 404 to thereby open the bus to be coupled to the target MCI (Step 5505).

Next, the command is checked. The distribution of subsequent processes will be carried out depending whether the command is a send command or a read command (Step 5507). The read command, i.e., the on-reception process will be described later. The send command, i.e., the on-transmission process will firstly be described.

The MPU 402 requests the SCSI protocol processor 404 to transmit the send command to the target MCI. Thus, the send command is transferred to the target MCI through the previously-opened bus (Step 5509). Next, the MPU 402 gives an execution command to the SCSI protocol processor 404 to thereby issue a DMA transfer start request in order to transfer transmit data from the MU 124 to a memory on the target MCI. The SCSI protocol processor 404 refers to the execution command so as to transfer the transmit data (coupled to one another by data chains) in a DMA system (Step 5511).

Next, the MPU 402 checks a crep bit of the execution command (Step 5513). If the present bit is judged as ON, then completion information is written into its corresponding completion information area of each command 505 based on a completion report issued from the target MCI (Step 5515). If the crep bit is judged as OFF or after completion of Step 5515, an int bit is checked (Step 5517).

If the int bit is judged as ON, then an interrupt signal line is operated to cause the CPU 123 to trigger an end interruption (Step 5519). If the int bit is judged as OFF or after completion of Step 5517, a process for checking an eoc bit is carried out (Step 5521).

If it is determined that the eoc bit is ON, then a process for freeing up or releasing the corresponding command entry copy 581 is executed (Step 5525). Namely, the number of command entry copies is decremented by 1 and the address for the corresponding execution command entry copy is updated (i.e., it is updated so as to specify the next command entry copy 581). Thereafter, the corresponding command entry copy 581 is deleted. If the eoc bit is judged as OFF, then the execution command address of the corresponding execution command processing table 582 is updated (i.e., it is brought up to date so as to designate or specify the next command) (Step 5523).

After completion of Step 5525, the routine procedure is repeated from Step 5501. After completion of Step 5523, the routine procedure is repeated from Step 5507.

The on-reception process will now be described with reference to FIG. 21. When the command to be executed at Step 5507 referred to above is of the read command, the MPU 402 requests the SCSI protocol processor 404 to send the read command to the target MCI. Thus, the read command is transferred to the target MCI through the previously-opened bus (Step 5601).

The MPU 402 checks a response issued from the target MCI. Further, the MPU 402 checks whether receive data exists in the target MCI, i.e., the bus is released or opened (Step 5603). If it is judged that the receive data does not exist, then the MPU 402 releases or opens the bus and requests the SCSI protocol processor 404 to open the bus (Step 5605). Further, the read command issued flag in the corresponding execution command processing table 582 is set to ON (Step 5607). Thereafter, the routine procedure is executed from Step 5527 and a command for a different device is processed.

If the answer is NO at Step 5603, i.e., the receive data is judged as existent, then a DMA transfer start request is issued to transfer the receive data from the target MCI to MU 124 (Step 5609). Thereafter, the routine procedure is executed from Step 5513.

A process taken where receive data is generated after the bus has been opened at Step 5605, will now be described with reference to the flow chart shown below in FIG. 21. The present process is started by an interruption produced by the reconnection between the IOA 128 and the bus from an MCI that has issued the read command.

A device ID for the MCI that has triggered the interruption is first identified to recognize the target MCI. Further, a corresponding command entry copy 581 and its corresponding execution command processing table 582 are searched to specify the issued command, thereby accepting a receive message from the target MCI (Step 5611). Next, the read issued flag in the corresponding execution command processing table 582 is brought to OFF (Step 5613). Further, the DMA transfer request is issued to transfer the receive data from the target MCI to the MU 124 (Step 5615).

Thereafter, the MPU 402 executes command bit processes in a manner similar to the processes from Step 5513 to Step 5521 (Steps 5617 to 5625). If it is now judged from the result of the eoc bit process at Step 5621 that the eoc bit is ON, then the command entry copy is released (Step 5627).

The description of the main process of the IOA 128 is finished in the above-described manner.

[Embodiment 3]

In the embodiments 1 and 2, the driver has issued the read command to the CH 142 or IOA 128 after the receive request has been made from the AP. In the present embodiment to the contrary, a read command is issued to an IOA 128 (or CH) in advance before acceptance of a receive request from an AP. A processing module for executing the present process will be called "read first-out process". In the present embodiment, a description will be made of a case in which a read first-out processing function is added to the aforementioned embodiment 2 (driver 345 as a principal). However, this function can also be applied to the embodiment 1.

Figure 25:
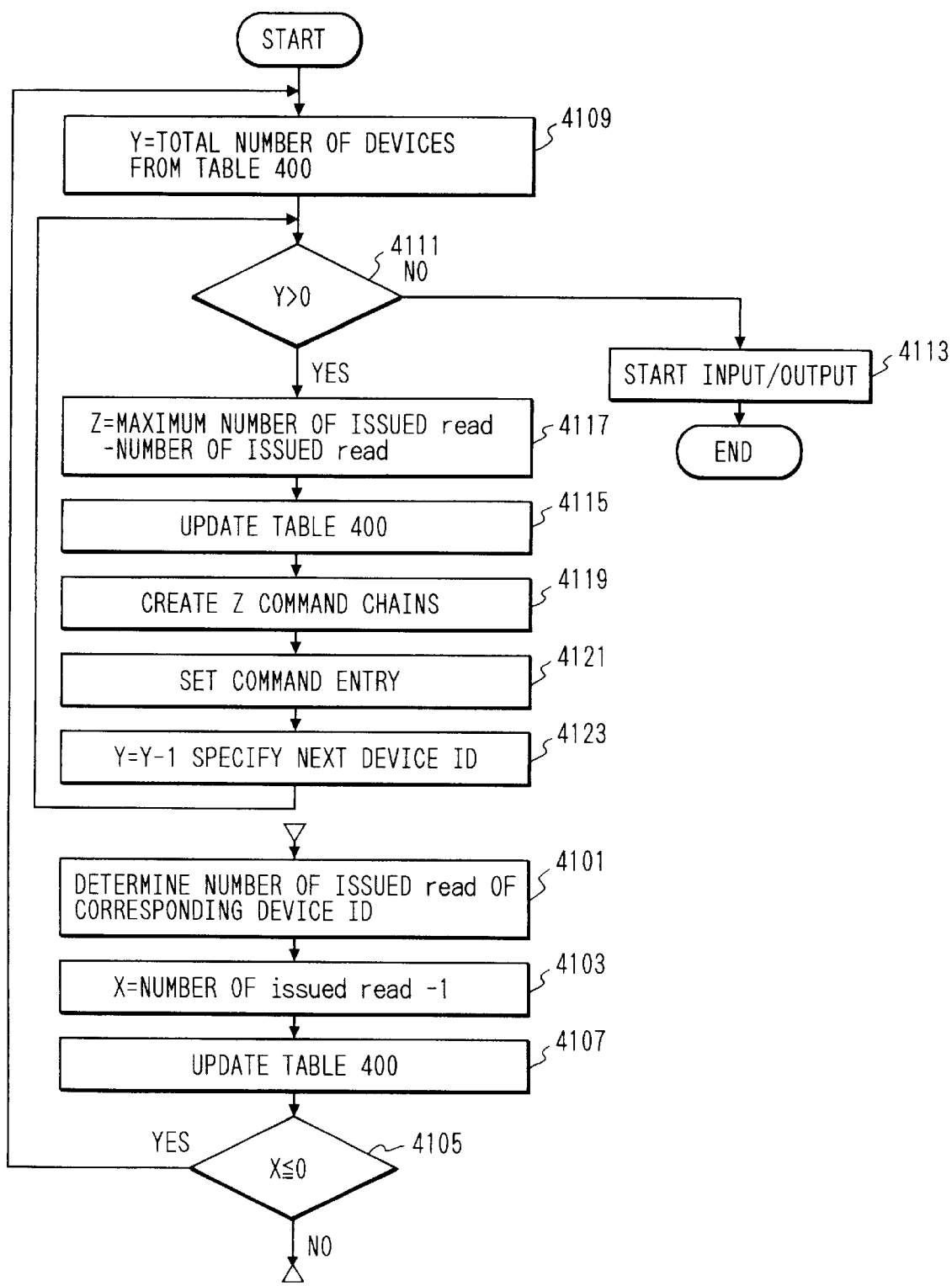
FIG. 25 is a flow chart for describing a Read command issuing process employed in the embodiment 3.

FIG. 24 is a view showing the structure of a first-out read command management table 400 that a read first-out process refers to. FIG. 25 is a flow chart for describing a processing logic of the read first-out process.

The first-out read command management table 400 will be described in detail with reference to FIG. 24. The first-out read command management table 400 holds therein the total number of devices and the maximum number of issued read. The total number of devices represents the total number of devices each capable of performing an input/output process under the control of the driver. The maximum number of issued read shows the maximum number of read commands at the time that the read commands are issued to their corresponding devices on a first-out basis. In other words, the maximum number of issued read corresponds to the upper limit of the number of commands at the time that a plurality of read commands are collectively issued to the individual devices on a first-out basis. Further, the first-out read command management table 400 has pairs of a plurality (corresponding to the total number of devices) of devices IDs and the number of issued read. The device ID shows identifier information for identifying each device. The number of issued read is equivalent to the number of commands indicative of read commands which are issued to devices corresponding to the respective devices IDs and whose command operations are not yet completed. Incidentally, the number of respective issued read is cleared to zero upon initialization.

The processing logic will now be described with reference to FIG. 25. Firstly (i.e., Firstly after a driver has been initialized), the routine procedure is executed from Step 4109. Here, the total number of devices in the first-out read command management table 400 is substituted in a variable Y so as to set a pointer variable (device ID shown in FIG. 24 indicates 0x00 for the first time) indicative of the first device ID (Step 4109). Next, the subsequent processes are divided according to the value of the variable Y. If Y>0, then the routine procedure proceeds to Step 4117. If not so, then the routine procedure proceeds to Step 4113 (Step 4111).

A description will now be made of a case in which Y is greater than 0 (Y>0). The value indicative of the number of issued read corresponding to the device ID pointed by the pointer variable is determined by reference to the first-out read command management table 400. Further, the value indicative of the number of the issued read is subtracted from the maximum number of issued read and the result of subtraction is substituted in a variable Z (Step 4117). Next, the value of the corresponding number of issued read in the first-out read command management table 400 is brought up to the maximum number of issued read (Step 4115).

Next, a command chain composed of z read commands is created (Step 4119). Thereafter, the created command chain is registered in the corresponding command entry 504 (Step 4121). Next, the value of the variable Y is decremented by 1 and the above pointer variable is updated (the next device ID is designated or specified) (Step 4123), after which the routine procedure is returned to Step 4111. Thus, Steps 4111 to 4123 are executed with respect to all the devices and a first-out read corresponding to the maximum number of issued read is issued to each device.

If the answer is NO at Step 4111, then the corresponding IOA 128 is activated to start an input/output process (Step 4113). A series of processes to be executed from the time of the initialization is completed in this way.

A description will now be made of the case where the present processing is started from the extension of an end interruption of each read command.

The corresponding device ID is specified from information about the end interruption and the number of issued read of the corresponding device ID is determined from the first-out read command management table 400 (Step 4101). Since the input/output process of the corresponding device is now finished one time, the number of issued read −1 is substituted in a variable X (Step 4103). Further, the first-out read command management table 400 is updated by setting the value of the variable X to the corresponding number of issued read (Step 4107).

A decision will next be made as to whether the expression $X \leq 0$ (Step 4105). If the result of decision is true, then the present value of the number of issued read is less than or equal to 0 and hence the routine procedure is executed from Step 4109 to issue a first-out read. If the result of decision is not true, then the processing that is started from the interruption is completed. According to the present processing, the read commands can be collectively issued to a plurality of devices with the time when the first-out read at a certain device is brought to nothing as a trigger.

[Embodiment 4]

In the aforementioned embodiments 1 through 3, the processing of the driver 345 (see FIG. 6) has been described. However, the relationship between the protocol process 343 and each input/output command has not been described. The present embodiment 4 describes, as an example, the case where when data is sent to a plurality of packets on a division basis in accordance with a protocol process taking such relation into consideration, a series of command sequences each composed of write commands for transferring packets corresponding to the number of packets transmittable at once are created and issued.

In the present embodiment, a description will be made of an example (corresponding to one wherein a process to be described later is added to an interface portion between the protocol process 343 and the driver 345 shown in FIG. 6 in particular) in which the above function is added to the embodiment 2. However, the above function can be applied to other embodiments in the same manner as described above.

The communication protocol process 343 will be firstly described. In a communication protocol, a certain fixed-length data unit called "packet" will be assumed as a transmit/receive unit. The packet is one created by adding protocol control information called "header" to the head of the original data. Thus, when the original data (corresponding to data sent from the corresponding AP 34) is larger in size than the above packet, the protocol process 343 must divide the data to create a plurality of packets. This processing will be called "packet dividing process".

A method of performing the packet dividing process employed in the present embodiment will be described with reference to FIG. 26. In the drawing, the upper side of the horizontal line indicates the undivided original data and an information block (hereinafter called "SPB") SPB0 for managing the corresponding data. The lower side thereof indicates data subjected to the packet dividing process and its SPB.

Before the packet dividing process, the original data D0 is first stored in a buffer Bf0 and a single SPB0 holds therein an address for the original data D0 and a data length thereof to manage the original data D0. SPB has a field indicative of the next SPB address, and the like. If the original data cannot be stored in a single buffer, then the original data is managed by a plurality of SPBs. At this time, the plurality of SPBs are coupled to one another by the subsequent SPB addresses (which will be called "SPB data chain").

Figure 26:
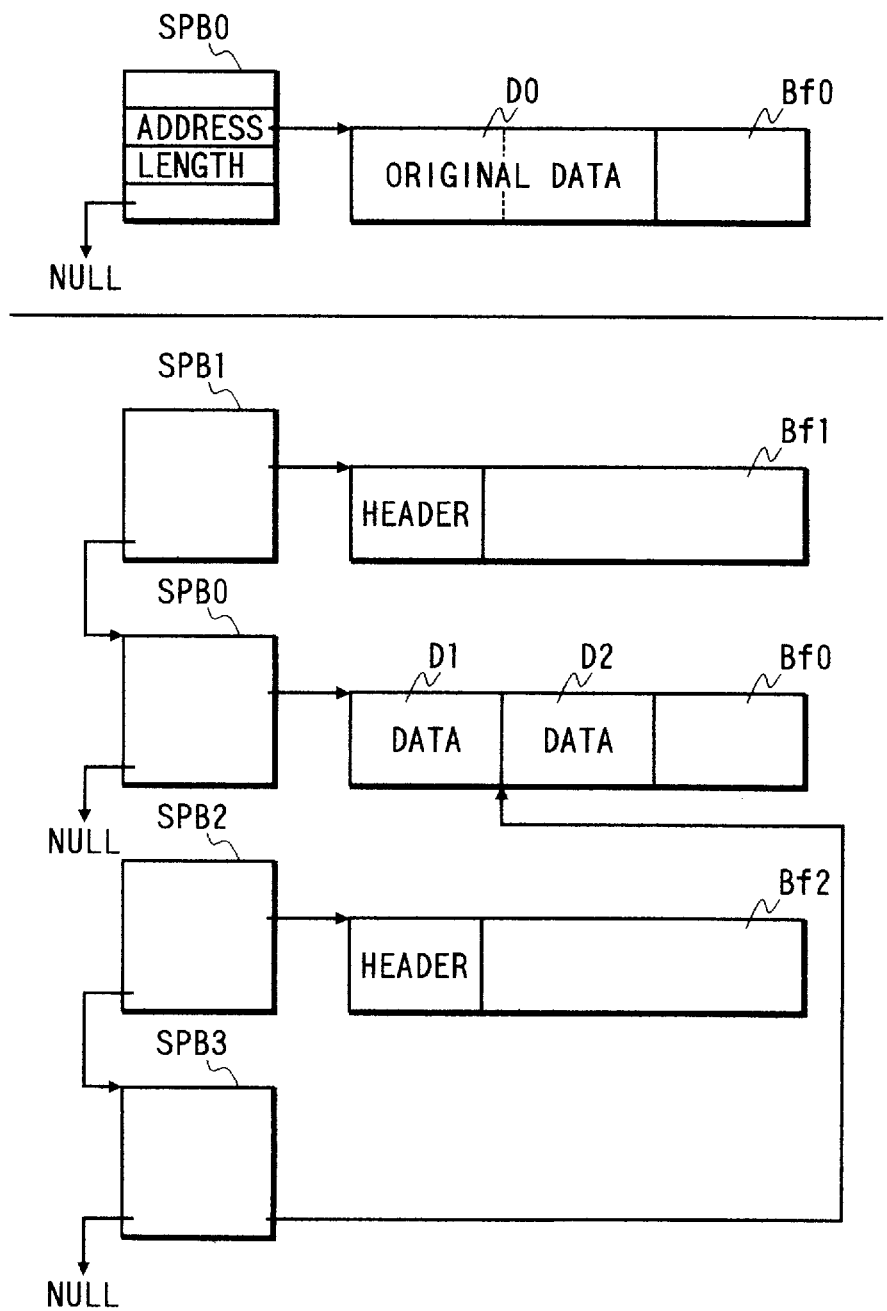
FIG. 26 is a conceptual view showing a packet dividing process employed in an embodiment 4.

Since the original data D0 is stored in the single buffer as shown in FIG. 26, the value of the next SPB address of SPB0 is null. The value null is of a value indicative of the completion of the chain. Accordingly, the null herein indicates the completion of a SPB data chain.

A method of carrying out a packet dividing process for creating two packets from the original data D0 will be described with reference to FIG. 26. The packet dividing process is executed in the protocol process 343.

In the packet dividing process, the length of the original data D0 is checked. It is also checked whether the division of the original data D0 is necessary. Further, divided positions of the data are determined upon its division. Here, the original data D0 is divided into data D1 and D2.

In order to create a first packet, a buffer Bf1 for storing a first header therein is ensured to produce the header. In order to create a SPB for managing the first packet, an address for the first header and a data length thereof are recorded and an SPB1 having an address for a subsequent SPB0 recorded therein is created. Further, the data length of the SPB0 is changed from the length of the data D0 to the length of the data D1. Next, in order to create a second packet, a buffer Bf2 for storing a second header therein is ensured to produce the header. An SPB2 for managing the header and an SPB3 for managing divided data are respectively created to produce SPBs for managing the second packet. A method of creating the SPB2 is identical to that for the SPB1. The SPB3 is produced by recording an address for the data D2 and a data length thereof. In the present embodiment as described above, a packet dividing system is adopted which does not perform a data transfer process.

The relationship between the packet dividing process and a command creating process (corresponding to a process for creating such data as shown in FIG. 17 by the driver 345) will now be described.

A description will be made of window control as protocol control for a network layer. The window control is of a control system for continuously transmitting a plurality of (predetermined number of) data packets without confirming delivery at each data packet and collectively confirming their delivery. A transmitting side can transmit a data packet having a transmit sequence number (Ps) from a receive sequence number (Pr) sent back from the opposite party to Ws+Pr−1 where a window size is considered as Ws, without confirmation of its delivery. Namely, the window size (Ws) shows the maximum number of data packets continuously transmittable from the opposite party without confirmation of the delivery.

When the transmit sequence number for the latest transmitted packet is now assumed as PS, the number of continuous transfers is defined as Ws+Pr−1−PS. The number of continuous transfers shows the number of data packets capable of being continuously transmitted from the opposite party at present without confirmation of their delivery. In the present embodiment, a method or mode of creating input/output commands each having a summary of packets that fall within the number of continuous transfers and thereby collectively transferring these to a line control device is adopted. The present method can improve an input/output efficiency as compared with a method of transferring packets one by one.

The above process is called "packet division batch io process". This processing will now be described. First of all, the number of continuous transfers is recorded as protocol control information. When the number of continuous transfers is not 0 and residence packets exist, the packet dividing process proceeds to the packet division batch io process. The residence packets indicate divided packets created in accordance with the packet dividing process. When the packet dividing process is shifted to the packet division batch io process, the total number of the divided packets created in accordance with the packet dividing process is delivered as the number of the residence packets and an address for each packet is also delivered.

Figure 27:
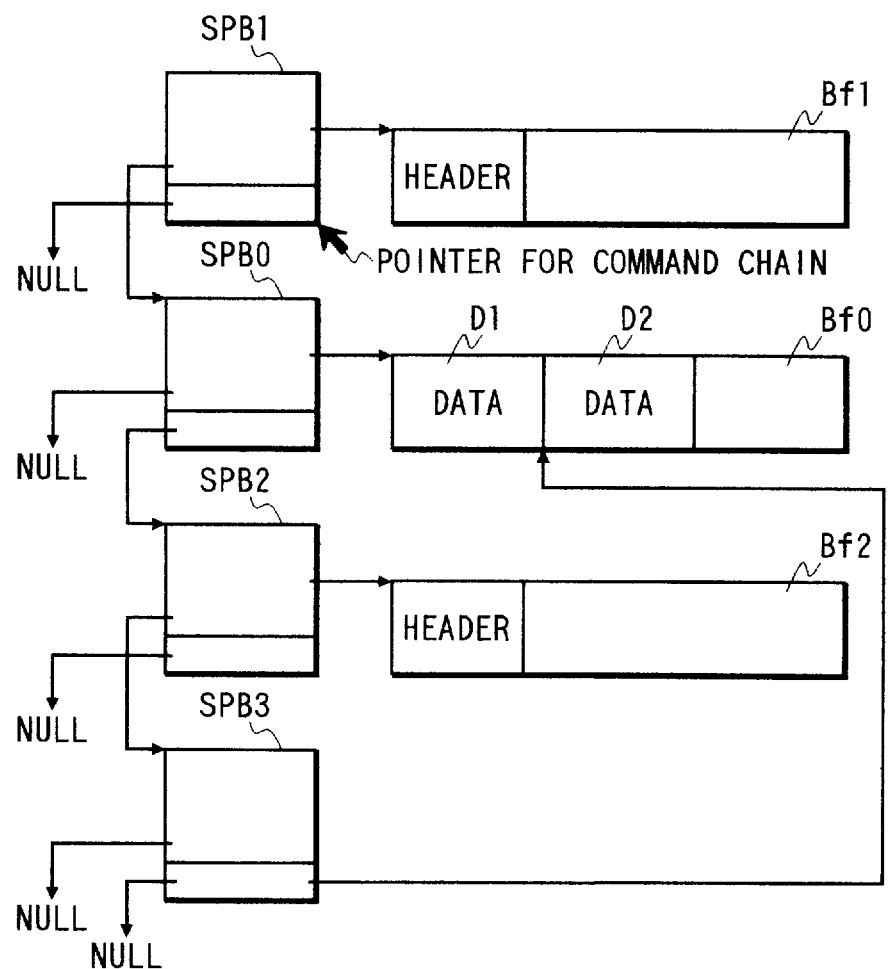
FIG. 27 is a conceptual view illustrating a mutual relationship between a plurality of packets created in accordance with a batch IO method employed in the embodiment 4.
Figure 28:
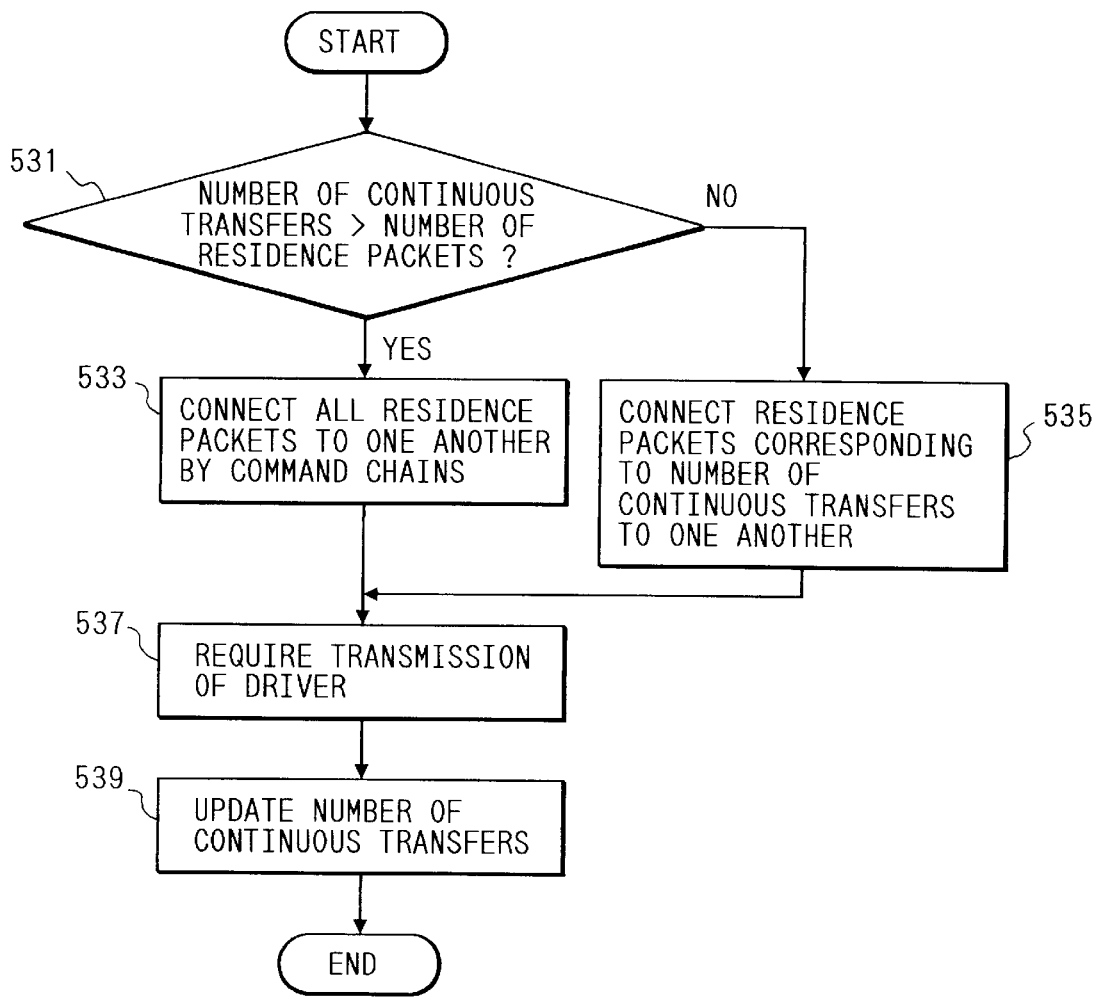
FIG. 28 is a flow chart for describing a process of the batch IO system employed in the embodiment 4.

FIG. 28 is a flow chart for describing a logic of the packet division batch io process. FIG. 27 shows a data structure created in accordance with the packet division batch io process and a data structure of interface to a driver. Particularly, FIG. 27 illustrates the result of processing of the data structure (corresponding to one obtained by dividing data in accordance with the packet dividing process) on the lower side of FIG. 26 through the packet division batch io process.

In the packet division batch io process, the number of continuous transfers (corresponding to the number of packets continuously transmittable without confirming delivery at each packet at the present time) and the number of residence packets (corresponding to the number of packets divided in accordance with the packet dividing process) are compared with each other (Step 531). If the number of residence packets is greater than the number of continuous transfers, then packets corresponding to the number of continuous transfers are coupled to one another by command chains from the head of the residence packets and the remaining packets remain stayed as they are (Step 535). On the other hand, if the number of residence packets is smaller than or equal to the number of continuous transfers, all the residence packets are coupled to one another by command chains (Step 533).

After completion of Steps 533 or 535, a transmit request is made to the driver (Step 537). Next, the number of continuous transfers is updated (Step 539). Described specifically, the number of the packets coupled to one another at Steps 533 or 535 is subtracted from the number of continuous transfers to newly create the number of continuous transfers.

A supplemental description will be made to the processing (Steps 533 and 535) for coupling the packets to one another by the command chains by using the lower stage of FIG. 26 and FIG. 27 as examples. In order to obtain the data structure shown in FIG. 26 from the data structure shown below in FIG. 26, a pointer field (whose initial value is null) for each command chain is provided for each SPB. Next, a process for setting an address for the SPB2 corresponding to the second packet to a command chain pointer of the last SPB (SPB0 in the present embodiment) is executed while tracing the next SPB chain of the SPB1 corresponding to the first packet. Further, if packets to be coupled to one another exist, then the same procedure as described above may be repeated.

Figure 29:
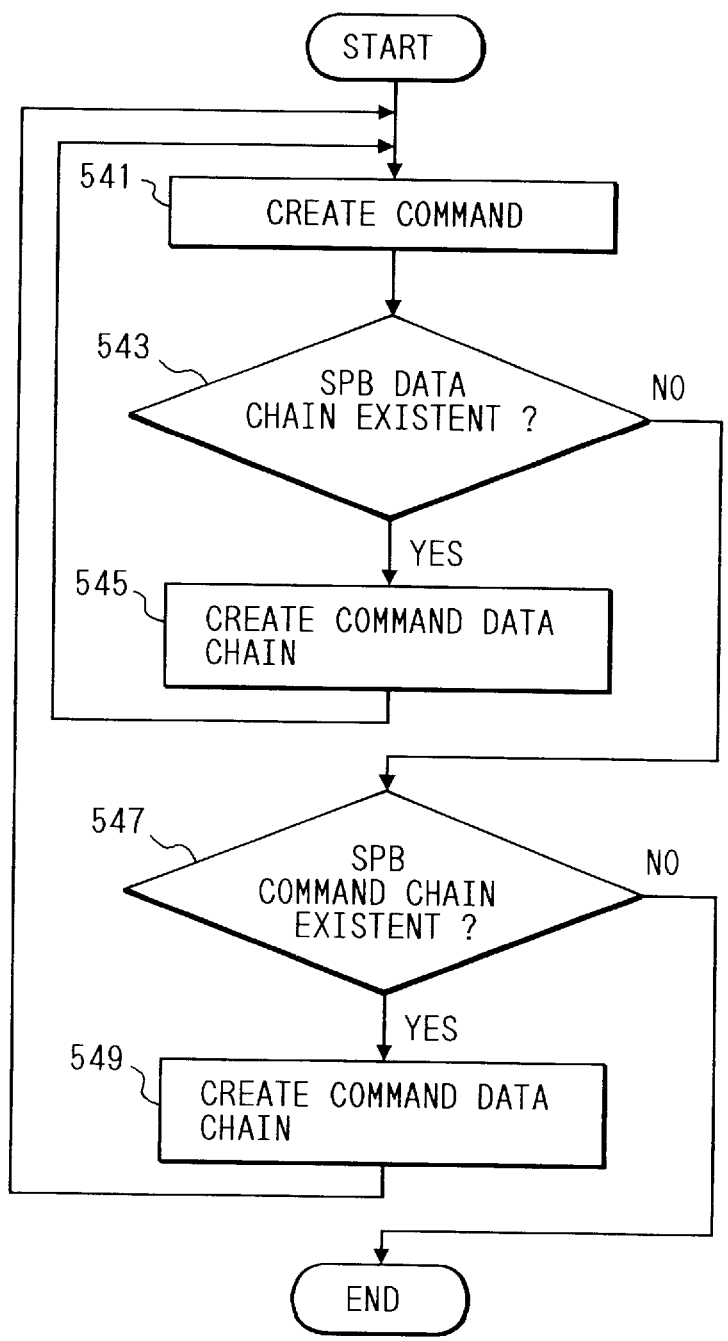
FIG. 29 is a flow chart for describing a command creation logic of a driver employed in the embodiment 4.

FIG. 29 is a flow chart for describing a processing logic of a driver 345 for creating command chains from the data structure shown in FIG. 26, which has been created in accordance with the above packet division batch io process.

First of all, the driver 345 creates a command 505 (see FIGS. 17 and 18) based on a SPB (processing will be started from the leading SPB) (Step 541). It is next judged whether the next SPB address of the corresponding SPB is null (Step 543). If it is judged that the next SPB address of the corresponding SPB is not null, then data exist subsequently and hence the next command 505 is ensured and a chain field for the corresponding command 505 is set to make a data chain bit (dc bit) up (Step 545). Thereafter, the routine procedure is repeated again from the process for creating the command (Step 541).

If the result of decision at Step 543 is null, it is then judged whether the value of the command chain pointer of the corresponding SPB is null (Step 547). If the result of decision is not null, then the next command 505 is ensured. Further, a chain filed for the corresponding command 505 is set and a data chain bit (dc bit) is cleared, after which an interruption bit (int bit) is up (Step 549). Thereafter, the routine procedure is repeated again from the process of creating the io command (Step 541). If the result of decision is null, then an end bit (eoc) of the corresponding command is up and the processing is finished. A sequence of commands coupled to one another by chains for sending a plurality of packets under one io operation is created in accordance with the above processing.

[Embodiment 5]

The present embodiment 5 shows a modification of the aforementioned embodiment 4, for improving the performance of the embodiment 4. The present embodiment 5 is characterized by a repacking process. A repacking processing method will be described with reference to FIG. 30.

Figure 30:
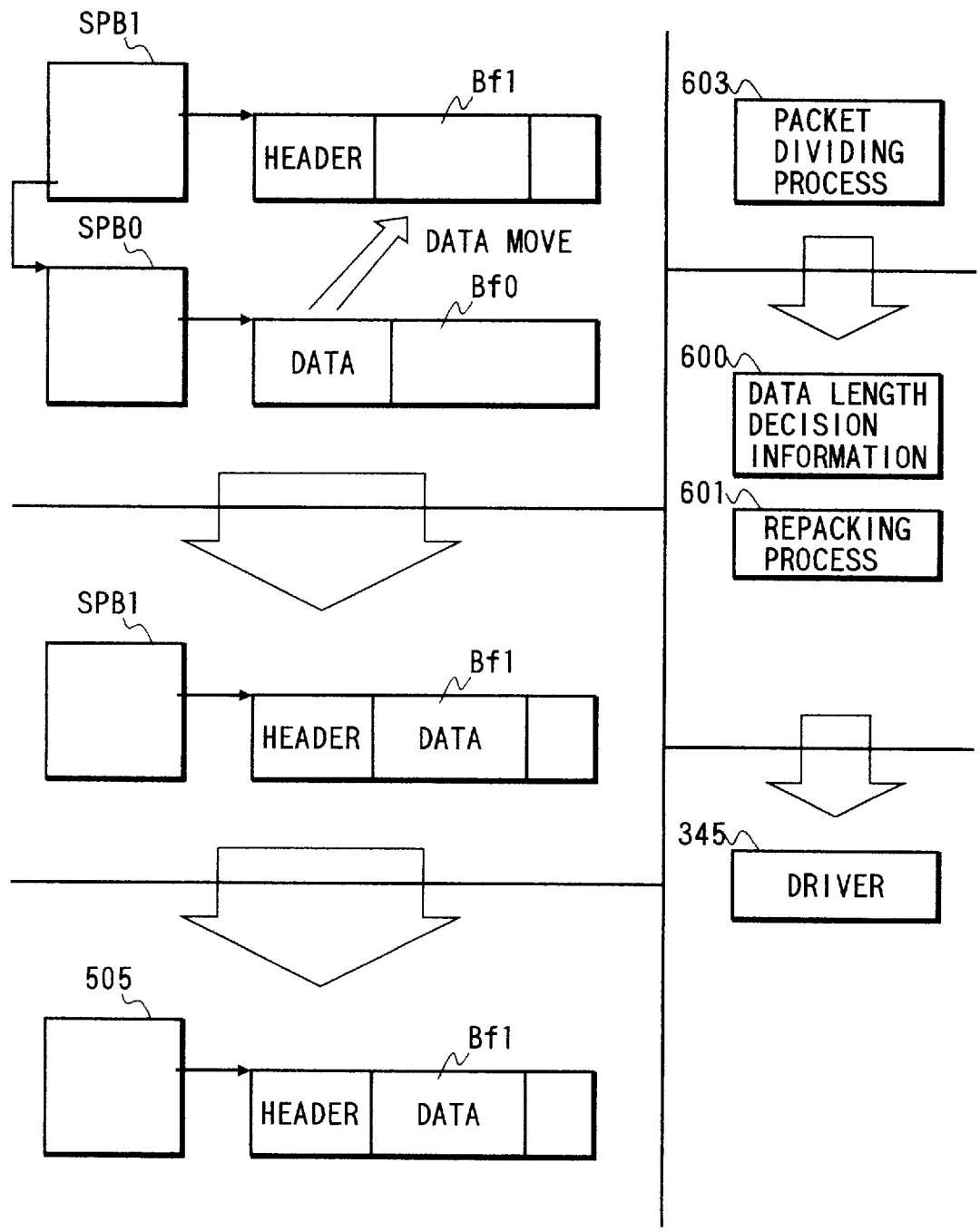
FIG. 30 is a conceptual view showing a repacking process executed in an embodiment 5.

Referring to FIG. 30, a packet dividing process 603 corresponds to the packet dividing process described in the aforementioned embodiment 4. A transmit data structure at the time that no packet division is made in the packet dividing process 603, is shown on the upperstage side of FIG. 30. If no packet division is made, then a structure of transmit data, which is composed of two portions: a SPB1 corresponding to an SPB for a header and an SPB0 corresponding to a data SPB, is created.

Therefore, when the transmit data is delivered to a driver 345 as it is to create a command sequence, the driver 345 creates a single command with respect to the SPB1 at all times, thus resulting in the generation of a command sequence composed of two commands. The execution of the command sequence by the corresponding IOA 128 results in the processing of the two commands. The two commands are coupled to each other by a command chain. Since, however, an overhead for switching a buffer upon DMA processing is large in size, the time required to transfer and process data is made longer, thereby causing a reduction in performance. A process for performing the above process under a single command is executed as a repacking process 601 to improve the performance.

Figure 31:
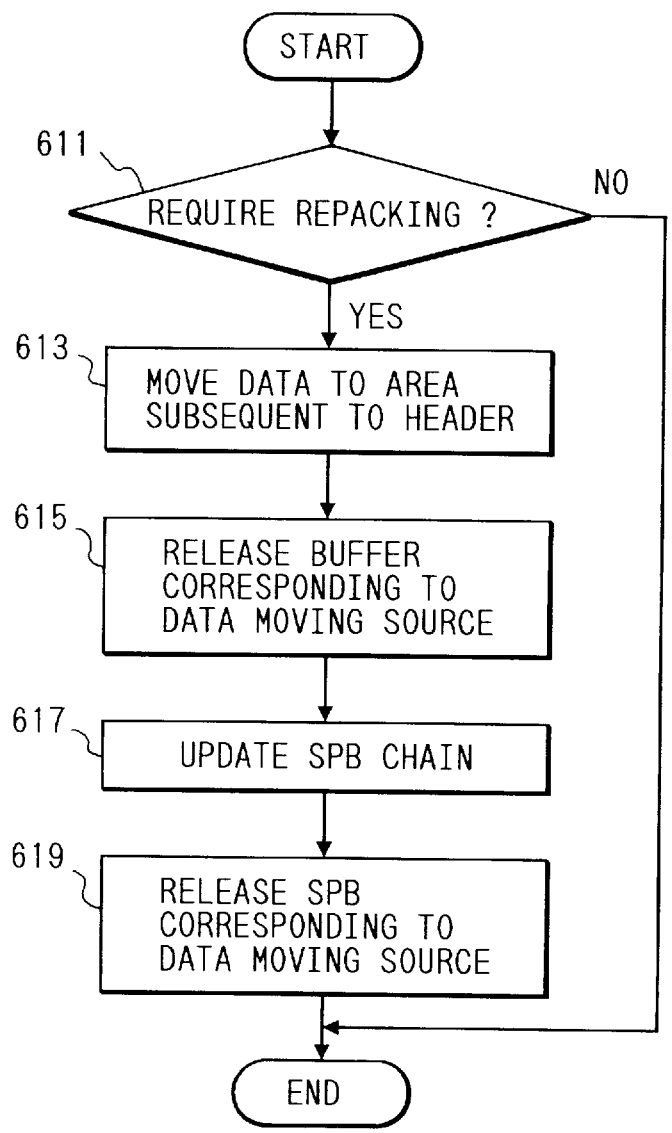
FIG. 31 is a flow chart for describing the repacking process shown in FIG. 30.

An intermediate stage of FIG. 30 shows a packet represented by a single SPB, which is created in accordance with the repacking process 601. FIG. 31 is a flow chart for describing a processing logic of the repacking process 601.

The repacking process 601 first compares a data length indicated by the SPB0 and data length decision information 600 to make a decision as to whether repacking is necessary (Step 611).

The value of the data length decision information 600 will now be described. Now, an overhead for processing a single command by an IOA is defined as O (c). Assuming that the data length (byte) is represented as D1 and an overhead necessary to move 1 byte data is represented as O (m1), an overhead (O(md)) required to move data having a length D1 can be represented as O (m1)×D1. Assuming that a repacking system is made effective only when O(c) is greater than O(md), the data length D1 satisfies a condition that D1<O (c)/O(m1). Therefore, O(c)/O(m1) is calculated in advance and is set as the data length decision information 600 upon start up of a computer.

At Step 611, a comparison is made between the data length represented by the SPB0 and the data length decision information 600. If the data length represented by the SPB0 is smaller than the data length decision information 600, then the repacking is judged as necessary. If the data length is not smaller than the data length decision information 600, then the repacking is judged as unnecessary.

If it is judged at Step 611 that the repacking is need, then data stored in a data buffer Bf0 is moved to an area subsequent to a header of a buffer Bf1 for the header (Step 613). Next, the Bf0 corresponding to a data moving source is released (Step 615). A null is written into the next SPB address of the SPB1 to thereby update a SPB chain (Step 617). Thereafter, the SPB0 indicative of SPB corresponding to the data moving source is released (Step 619) to terminate a series of processes.

[Embodiment 6]

Even in the case of any of the aforementioned embodiments 1 through 5, the plurality of input/output commands issued to the plurality of devices can be executed as one input/output command to improve the input/output efficiency. In the embodiment 6 to be described below, the entire efficiency of transfer processing can be optimized by adjusting the leading position at which transfer data on a Kernel space is stored according to a user data length transferred to a corresponding device or input/output device, thereby making it possible to improve an input/output efficiency. The embodiment 6 will hereinafter be described with reference to FIGS. 32 through 38.

In a conventional transfer processing method, a process for copying data from a user space to a Kernel space and a process for transferring data from the Kernel space to an input/output device are handled as an independent process. Further, these processes are not taken into consideration so as to be optimized as a series of processes. Therefore, when boundary values of data storage leading positions on a memory, of a copy source and a copy destination are made coincident with each other in order to optimize the process for copying the data from the user space to the Kernel space, the boundary values of the data storage leading positions on the memory are made improper in the case of the process for transferring the data from the Kernel space to the input/output device, and the data is transferred in a small unit until at least proper boundary values are achieved, thereby causing a size increase in an overhead particularly when a data length is short. On the other hand, when the boundary values of the data storage leading positions on the memory are set to the optimum values in the case of the process for transferring the data from the Kernel space to the input/output device, the boundary values of the data storage leading positions on the memory, of the copy source and the copy destination are not necessarily made coincident with each other upon copying the data from the user space to the Kernel space, thereby causing a reduction in a copying unit and a size increase in the overhead particularly when the data length is long.

Therefore, in the present embodiment, there is provided a computer system which is activated under an operating system for providing two process execution modes: a user mode and a Kernel mode respectively having operating spaces independent of each other, and which performs the transfer of data between a central processing unit and an input/output device in a direct memory access mode. In the computer system, in order to transfer data existing in an operating space (user space) of a process operated in the user mode to the input/output device, a means is provided for setting a leading position where transfer data on a Kernel space is stored to a value most efficient upon transfer of the data to the input/output device when the length of data to be copied is shorter than a length predetermined by the computer system, in the case of a process for temporarily copying the data into the operating space (Kernel space) in the Kernel mode. On the other hand, a means is also provided for setting the transfer data storage leading position to a value most efficient upon copying the data from the user space to the Kernel space when the data length is not shorter than the predetermined length.

Further, a means is provided for making the leading position at which the transfer data on the user space is stored and the leading position at which the transfer data on the Kernel space is stored, coincident with each other, and for copying the data in a transfer unit corresponding to the maximum data form according to the boundary value, when the length of the data to be copied is longer than the length predetermined by the computer system in the case of a process for copying the data from the user space to the Kernel space.

Furthermore, a means is provided for ensuring an area storing control information therein separately from transfer data, associating it with the data and storing the control information from the position most efficient upon transfer of the same to an input/output device, in the case of a process for adding the control information for controlling the data transfer to data copied onto the Kernel space from the user space and transferring it to the input/output device.

Figure 32:
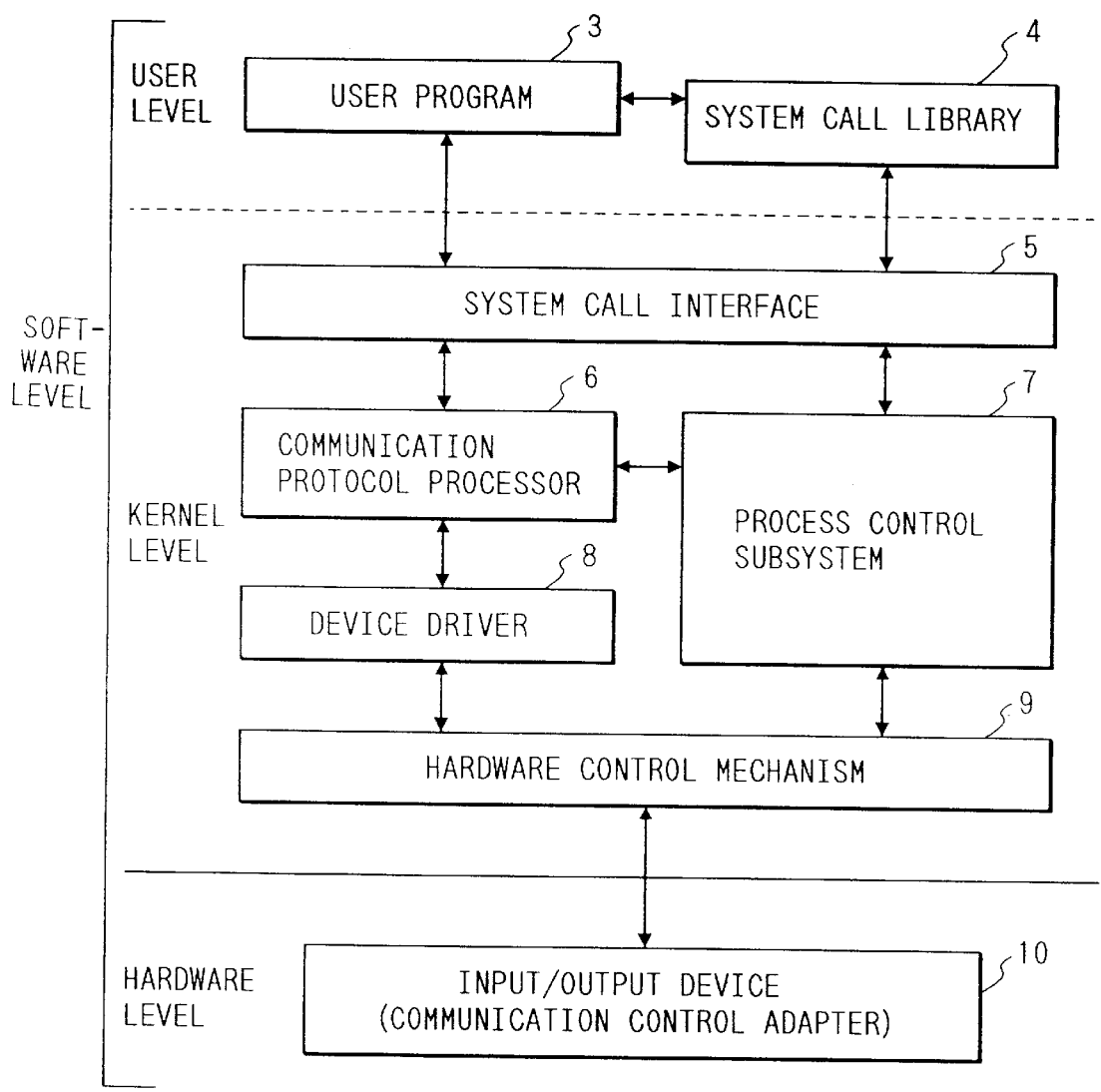
FIG. 32 is a block diagram showing a configuration of a computer system intended for an embodiment 6.

FIG. 32 shows the structure of the computer system according to the present embodiment. The computer system is first divided into a software level and a hardware level. The software level is divided into a user level and a Kernel level.

The user level is equivalent to a level at which a program created by one who makes use of the computer system is executed or run. A user program 3 or a system call library 4 is used as the program. In the case of the user level, the program is run in an executing unit that is called a process having a separate operating space (called "user space").

The Kernel level corresponds to a level at which a program for controlling the operational movements of the entire system such as an operating system or the like is run. The present level has a single separate operating space (called "Kernel space"). Several modules to be next described exist in the Kernel level. A system call interface 5 is of a module for allowing the user program 3 to use a Kernel function. A communication protocol processor 6 manages and identifies the form of a message on a communication line and a program for a device driver 8. The device driver 8 is of a module for controlling the operation of an input/output device 10 such as a communication line or the like. A process control subsystem 7 performs the generation of a process, scheduling, memory management, etc. A hardware control mechanism 9 executes communications with hardware and an interrupting process.

Further, the present embodiment is constructed on the precondition that two modes: a user mode (corresponding to the user level) and a Kernel mode (corresponding to the Kernel level) exist as an operation mode of a process indicative of an executing unit of a program. In the user mode, a user program can obtain access only to data on the user space, which exists in a process unit. Further, the program can be operated or run in parallel with other process under the control of time division. In the Kernel mode, a Kernel program can access to both the Kernel and user spaces. Further, the program is not operated in parallel with processes in other user and Kernel modes and is run until a series of processes is completed.

Figure 33:
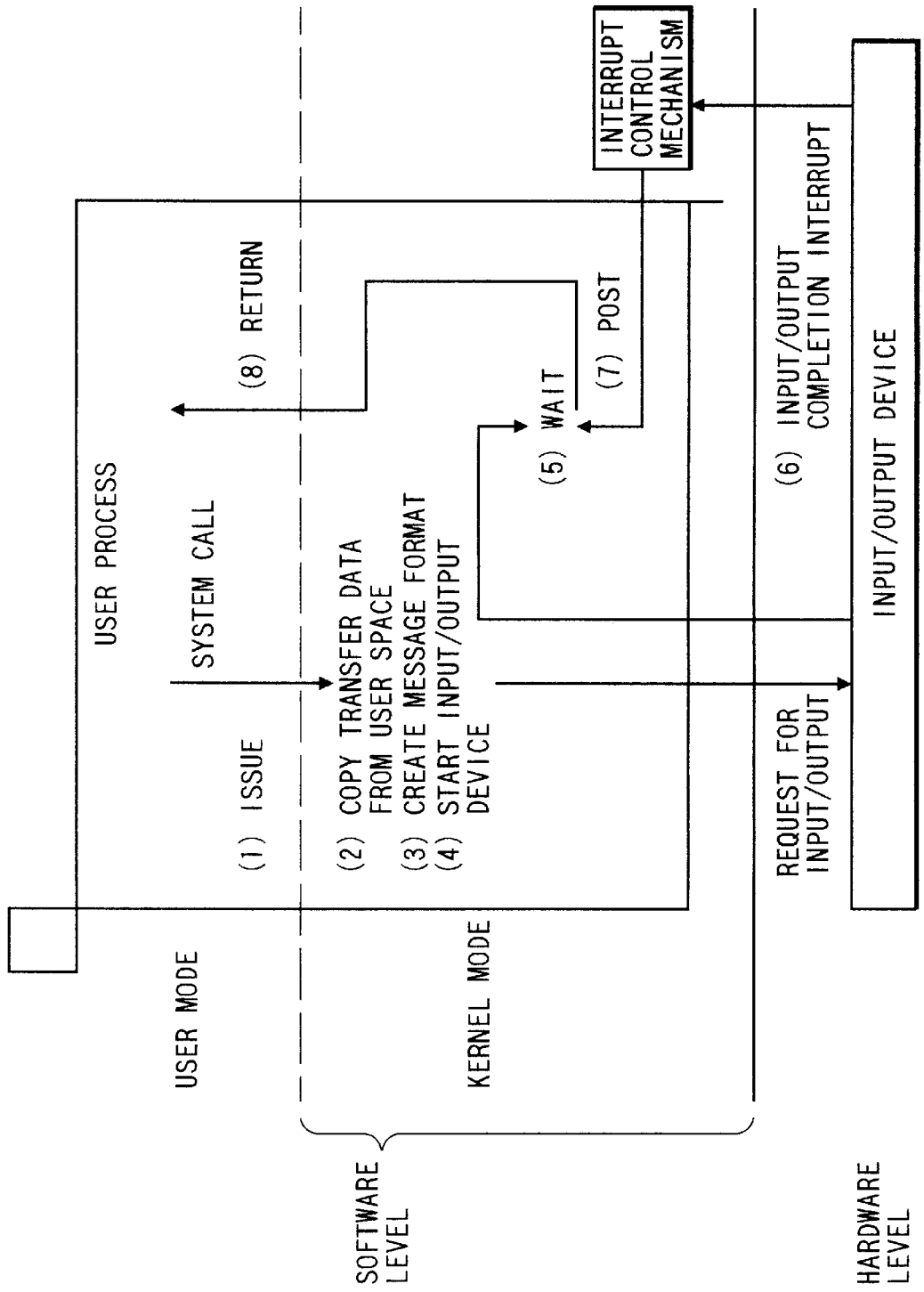
FIG. 33 is a flow chart for describing the flow of an input/output process executed in the embodiment 6.

The flow of a process for transferring data on the user space to a communication line by a user program will now be described with reference to FIG. 33 by way of example.

(1) The user program issues a system call for requiring the transfer of data to a Kernel (①).

(2) The user mode is changed over to the Kernel mode and a processing entry (system call interface) of a corresponding Kernel level is called up. At this time, the processing of the Kernel level is executed as a process of the user program that has issued the system call.

(3) The system call interface copies data to be transferred to the input/output device, from the user space (②). After a process such as creation of a message format for delivering a transfer request has been executed by the communication protocol processor (③), the device driver and the hardware control mechanism start the operation of the input/output device (④). Since the hardware control mechanism thereafter waits for the completion of the transfer operation, the corresponding process is discontinued (wait) (⑤). At this time, the control is shifted to other process.

(4) When the transfer operation is completed, the input/output device issues an interruption to software. When this interruption takes place, the input/output device invokes or calls an interrupt routine from the hardware control mechanism (⑥).

(5) The interrupt routine starts up and resumes a call process (post) (⑦).

(6) The Kernel mode is changed over to the user mode and the control is returned to the user program from the result of transfer (⑧).

Figure 34:
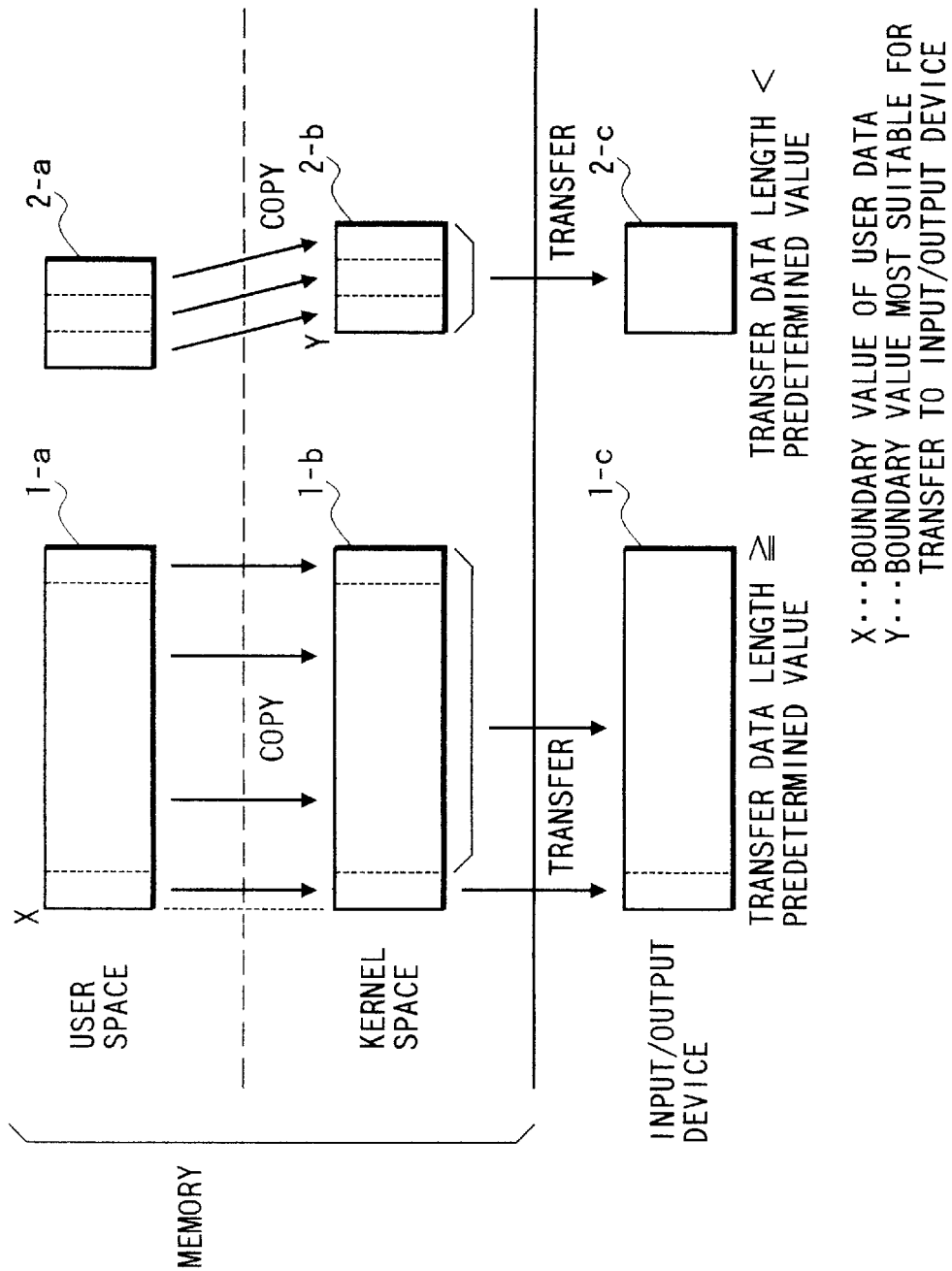
FIG. 34 is a conceptual view showing the input/output process shown in FIG. 33.

One example of a process for copying transfer data (1, 2) from the user space to the Kernel space will next be described with reference to FIG. 34. When the user level is changed to the Kernel level upon issuance of the system call from the user program, the system call interface copies the transfer data from the user space to the Kernel space in accordance with the following procedure.

Figure 35:
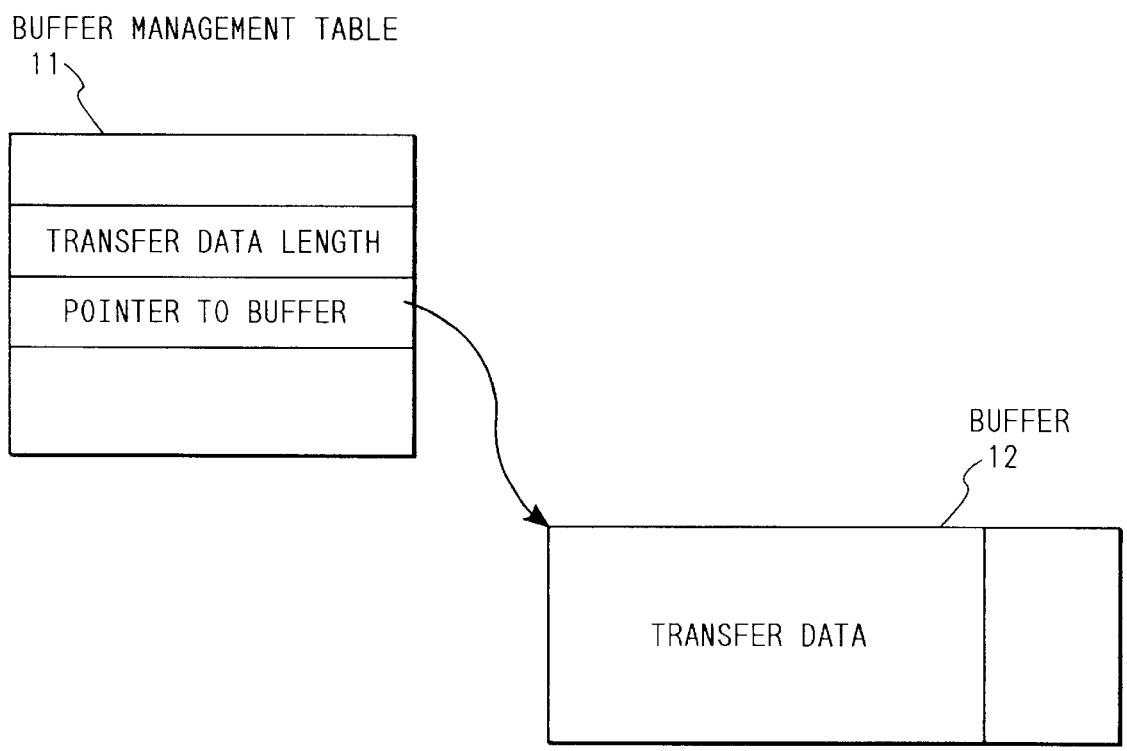
FIG. 35 is a conceptual view illustrating a configuration of a buffer employed in the embodiment 6.
Figure 37:
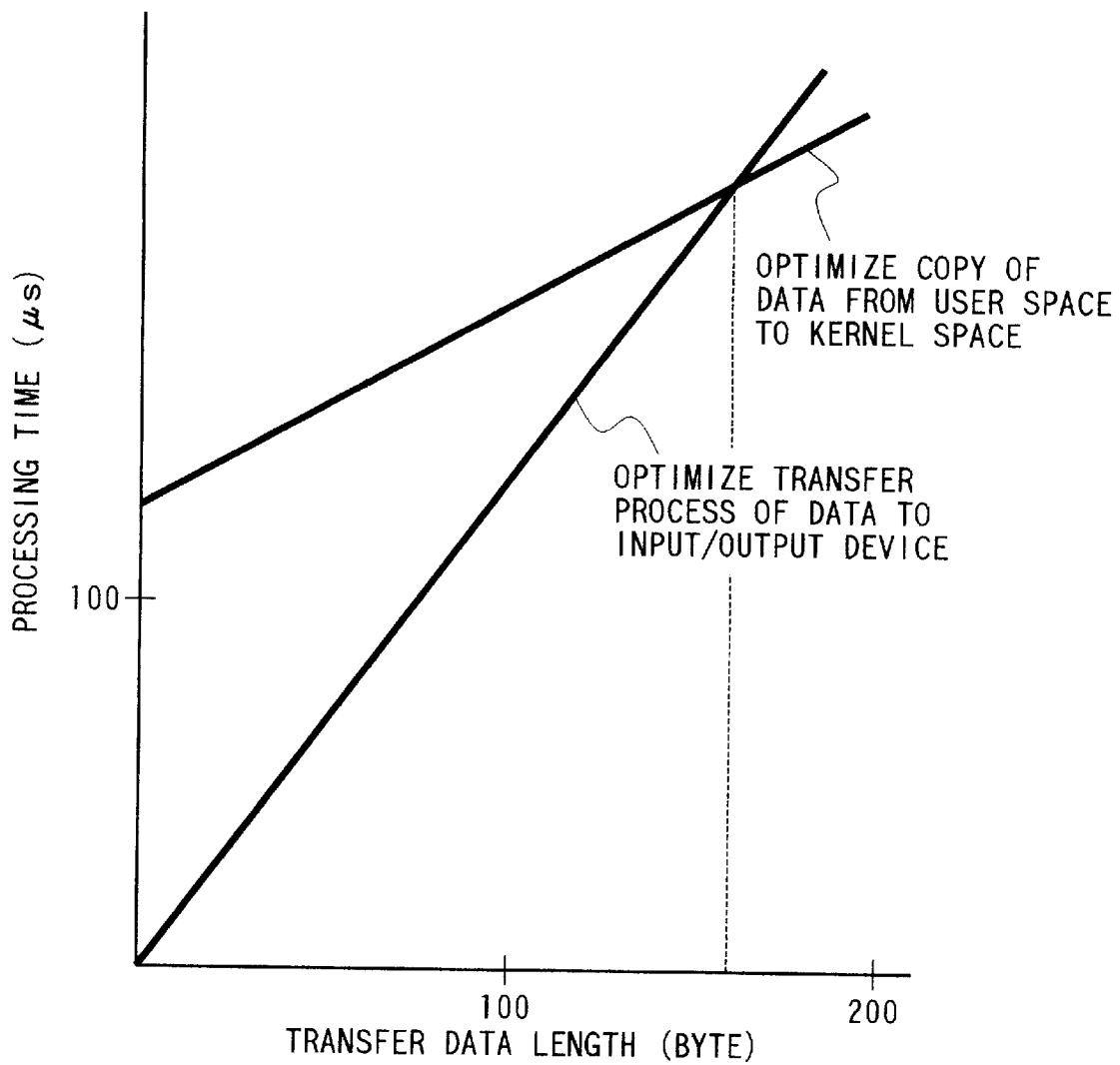
FIG. 37 is a characteristic view for describing one example of an input/output processing time employed in the embodiment 6.

Reference is first made to the length of data to be copied. The data length is registered on a buffer management table 11 for managing material substance of a buffer 12 as shown in FIG. 35. When the data length is shorter than a value predetermined by a computer system, the leading position where transfer data on the Kernel space is stored, is set to a value most efficient upon transferring the data to an input/output device. For example, when the input/output device transfers data on a memory to the inside thereof in accordance with a direct memory access system (hereinafter abbreviated as "DMA"), the transfer of the data in a 32 byte unit provides the most efficiency from the viewpoint of transfer capability of an input/output bus. It is therefore necessary to set the transfer data storage leading position to a 33-byte boundary. In this case, the leading position where the transfer data on the Kernel space is stored, is set so as to become the 32-byte boundary.

On the other hand, when the data length is longer than or equal to the value predetermined by the computer system, the leading position where the transfer data on the Kernel space is stored, is set to a value most efficient upon copying the data from the user space to the Kernel space. Data can be copied onto the memory of the computer system in any of a long word unit (4-byte unit), a word unit (2-byte unit) and a byte (1 byte) unit. When the data is copied in each data unit, it is necessary to set a data storage leading position of a copy source and a data storage leading position of a copy destination to their corresponding boundaries. In this case, the leading position where the transfer data on the Kernel space is stored is set in such a manner that the boundary of the data storage leading position of the copy source coincides with that of the data storage leading position of the copy destination, whereby a most efficient data copying process can be realized. This is because if the data storage leading position of the copy source coincides with the data storage leading position of the copy destination as shown in FIG. 36, then data can be copied in the long word unit in the case of other than a half end up to a long word boundary.

One example of "the value predetermined by the computer system" that is a decision condition for the data copying process, will now be described. A total transfer time at the time that the copying of data from the user space to the Kernel space is optimized, is first determined. The leading position where the transfer data on the user space is stored and a transfer data length are respectively regarded as a 13-byte boundary and an x byte, and units necessary for one data copying and DMA transfer are respectively regarded as 1 $\mu$s/byte and a 10 $\mu$s/byte. The data copying and transfer processes will be executed in the aforementioned mode. At this time, the total transfer time is determined as the following value:

$$\{(x-1)/4+1\}+\{13+(x-16)/32\}\times 10 \qquad (1)$$

Next, the total transfer time at the time that the transfer of data to the input/output device is optimized under the same condition, is determined as the following value:

$$x+\{x/32\times 10\} \qquad (2)$$

Each of the first terms of the above equations shows a time interval required to copy data from a user space to a Kernel space, whereas each second term represents a time interval required to transfer data to an input/output device. These time intervals are graphically illustrated in FIG. 37. It is understood from this example that 168 bytes correspond to a boundary value.

Figure 38:
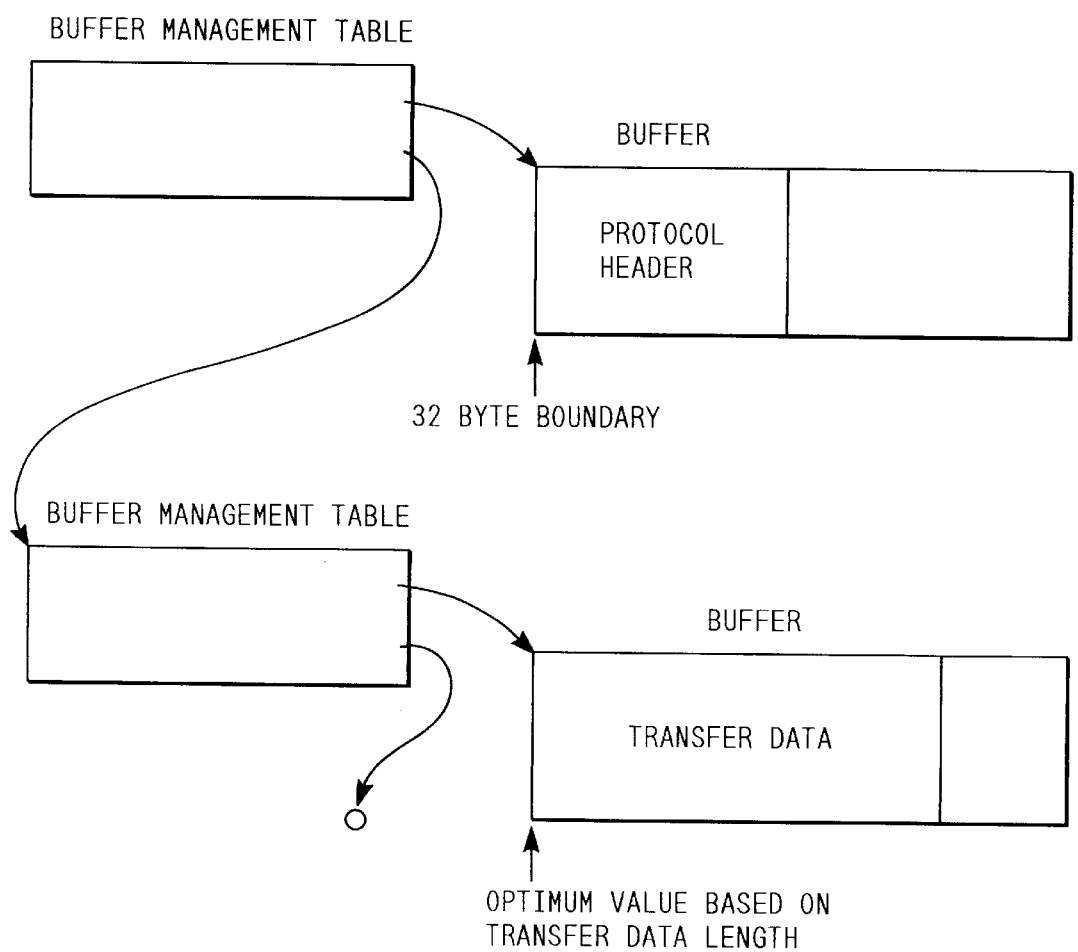
FIG. 38 is a conceptual view showing a method of adding control information, which is employed in the embodiment 6.

There are often cases where control information is generally added to transfer data upon transferring data to an input/output control device. For example, a protocol header is added to transfer data upon transmission of data to a communication line and reception of it therefrom. The control information is added to the transfer data at a Kernel level. FIG. 38 shows one example of a method of adding control information. In the present example, when data is transmitted and received to and from a communication line, a buffer in other region or area is ensured with respect to transfer data and a protocol header is added to the transfer data. A storage leading position of the protocol header will be regarded as a position most efficient from the viewpoint of the transfer of data to an input/output device. In the aforementioned example, the position is of a 32-byte boundary.

The following method is known as one example of a method of inputting data from an input/output control device. In a state in which an input buffer has been prepared on a user space, a user program issues a system call. On the other hand, a program of a Kernel level issues an input request to the input/output control device in a state in which an input buffer has been prepared on a Kernel space.

At this time, a transfer data storage leading position of the input buffer on the Kernel space will be regarded as a position most efficient from the viewpoint of the transfer of the data from the input/output device in a manner similar to the output of data. In the aforementioned example, the position is of a 32-byte boundary. On the other hand, the data inputted from the input/output control device exists in the Kernel space and needs to be transferred to the user space. At this time, a boundary at a transfer data storage position of the buffer prepared by the user program can be made coincident with that (corresponding to a long word boundary in the above example) at a transfer data storage position of the buffer on the Kernel space to execute an efficient copying process.

Having now fully described the invention, it will be apparent to those skilled in the art that many changes and modifications can be made without departing from the spirit or scope of the invention as set forth herein.

What is claimed is:

1. A computer system comprising a plurality of input/output devices; an adapter device coupled to said plurality of input/output devices; and a main processing unit coupled to said adapter device;

said main processing unit including means for transferring a plurality of input/output requests intended for respective ones of said plurality of input/output devices to said adapter device as a single input/output start command;

said adapter device including means for determining to which input/output devices said plurality of input/output requests included in said single input/output start command correspond, and means for supplying said plurality of input/output requests to said determined input/output devices, respectively.

2. A computer system comprising a plurality of input/output devices; an adapter device coupled to said plurality of input/output devices; and a main processing unit coupled to said adapter device;

said main processing unit including:

a wait request management table for storing therein and managing an input/output request intended for transfer to each of said plurality of input/output devices via said adapter device;

means for storing the input/output request in said wait request management table when the input/output request is immediately unprocessible upon transfer of the input/output request; and means for creating a plurality of command sequences each comprised of input/output commands arranged in a row to be supplied to said each input/output device based on the input/output request stored in said wait request management table when the input/output request is processible, and for transferring said plurality of command sequences to said adapter device as a single input/output start command;

said adapter device including:

means for determining to which input/output devices said plurality of command sequences included in said single input/output start command correspond; and means for supplying the input/output commands of each of said plurality of command sequences to said determined input/output devices, respectively.

3. A computer system according to claim 2, wherein said each input/output device includes a means for issuing an end interruption to said main processing unit when a process for a given input/output command is finished; and said main processing unit includes a means for judging whether the input/output request is processible when the end interruption for the input/output command is triggered, creating a plurality of command sequences each comprised of input/output commands arranged in a row to be supplied to said each input/output device, at each input/output device based on the input/output request stored in said wait request management table when it is judged that the input/output request is processible, and transferring the plurality of command sequences to said adapter device as one input/output start command.

4. A computer system according to claim 2, wherein the plurality of command sequences transferred to said adapter device from said main processing unit as the single input/output start command are managed by a table having a structure wherein blocks, each including address information for specifying a leading position of each command sequence and identifier information for determining a single input/output device corresponding to an object for executing each command in the command sequence, are respectively set as basic units, and wherein the plurality of blocks are continuously provided.

5. A computer system according to claim 4, wherein each of the blocks included in said table is provided with flag information indicative of whether said adapter device has captured a command sequence corresponding to a corresponding block, and when said main processing unit transfers the single input/output start command, the flag information is issued as ON, whereas when said adapter device takes in a command sequence included in the single input/output start command, the flag information is brought to OFF.

6. A computer system comprising a plurality of input/output devices; an adapter device coupled to said plurality of input/output devices; and a main processing unit coupled to said adapter device, said main processing unit having an application executing unit for executing an application program and a driver for processing an input/output request issued from the application executing unit;

said driver including means for producing an input/output command based on the input/output request issued from the application executing unit and transferring a plurality of said input/output commands to respective ones of said plurality of input/output devices as a single input/output start command;

said adapter device including means for determining to which input/output devices said plurality of input/output commands included in said single input/output start command correspond; and means for supplying said plurality of input/output commands to said determined input/output devices, respectively.

7. A computer system according to claim 6, wherein said driver further includes means for supplying said plurality of input commands to said adapter device as said single input/output start command on a first out basis before acceptance of a data input request from the application executing unit.

8. A computer system according to claim 7, wherein said means for supplying the input commands to said adapter device on the first out basis includes:

first storing means for storing therein a first prescribed number indicative of the maximum number of input commands respectively issued to said input/output devices, second storing means for storing therein a second prescribed number for prescribing an opportunity for reissuing an input command sequence, and third storing means for recording therein the number of uncompleted input commands issued to said respective input/output devices;

said means for supplying the input commands to said adapter device on the first out basis being constructed such that an input command sequence obtained by linking input commands to each other by the first prescribed number is created at each input/output device so as to be issued to said adapter device after initialization of said driver, the number of the input commands issued to said individual input/output devices is recorded in said third storing means, the number of the uncompleted input commands stored in said third storing means is thereafter decremented by one each time an input command completion report is received from said each input/output device, and when the number of the uncompleted input commands transferred to said individual input/output devices reaches the second prescribed number, a difference between the number of the uncompleted input commands stored in said third storing means and the first prescribed number stored in said first storing means is calculated, and an input command sequence obtained by linking input commands to each other by the number corresponding to the difference is retransferred to said adapter device.

9. A computer system according to claim 6, wherein said each input/output device is a line control device;

said main processing unit includes a protocol processor for dividing data on a data transfer request issued from the application executing unit and for adding communication protocol control information to the heads of the divided individual output data to thereby create a plurality of divided packets; and said driver produces a plurality of said input/output commands based on the plurality of divided packets when the number of the plurality of divided packets is not greater than a continuous transfer number corresponding to the number of packets continuously transferable without confirming a delivery issued from the opposite party at the present time, and transfers the plurality of produced input/output commands as said single input/output start command to thereby transfer the output data about the plurality of divided packets through one input/output operation.

10. A computer system according to claim 6, wherein said each input/output device is a line control device; and said main processing unit includes:

a protocol processor for dividing data about a data transfer request issued from the application executing unit, creating data management information blocks for pointing the divided output data, creating communication protocol control information to be logically added to the heads of the divided output data such that divided packets are logically composed of the communication protocol control information and the output data, and creating data management information blocks for pointing the communication protocol control information; and a repacking processor for allowing said adapter device to compare an overhead necessary to process a command for transferring the communication protocol control information pointed by other data management information block outputted from said protocol processor with an overhead necessary to copy the output data pointed by said other data management information block outputted from said protocol processor onto an area continuously linked to the communication protocol control information, setting the communication protocol control information and the output data to a continuous area and creating a data management information block for pointing the area when the latter overhead is smaller than the former overhead, and delivering the created data management information block to said driver.

11. A computer system comprising a plurality of input/output devices; an adapter device coupled to said plurality of input/output devices; and a main processing unit coupled to said adapter device, said main processing unit having an application executing unit for executing an application program and a driver for processing an input/output request issued from the application executing unit;

said driver including:

a wait request management table for storing therein and managing the input/output request issued from the application executing unit;

means for storing the input/output request in said wait request management table when the input/output request is immediately unprocessible upon issuance of the input/output request from the application executing unit; and means for creating a plurality of command sequences each comprised of input/output commands arranged in a row to be supplied to said each input/output device based on the input/output request stored in said wait request management table when the input/output request is processible, and for transferring said plurality of command sequences to said adapter device as a single input/output start command;

said adapter device including:

means for determining to which input/output devices said plurality of command sequences included in said single input/output start command correspond; and means for supplying the input/output commands of each of said plurality of command sequences to said determined input/output devices, respectively.

12. A computer system according to claim 11, wherein said driver further includes means for supplying said plurality of input commands to said adapter device as said single input/output start command on a first out basis before acceptance of a data input request from the application executing unit.

13. A computer system according to claim 11, wherein said each input/output device is a line control device;

said main processing unit includes a protocol processor for dividing data on a data transfer request issued from the application executing unit and for adding communication protocol control information to the heads of the divided individual output data to thereby create a plurality of divided packets; and said driver produces a plurality of said input/output commands based on the plurality of divided packets when the number of the plurality of divided packets is not greater than a continuous transfer number corresponding to the number of packets continuously transferable without confirming a delivery issued from the opposite party at the present time, and transfers the plurality of produced input/output commands as said single input/output start command to thereby transfer the output data about the plurality of divided packets through one input/output operation.

14. A computer system according to claim 11, wherein said each input/output device is a line control device; and said main processing unit includes:

a protocol processor for dividing data about a data transfer request issued from the application executing unit, creating data management information blocks for pointing the divided output data, creating communication protocol control information to be logically added to the heads of the divided output data such that divided packets are logically composed of the communication protocol control information and the output data, and creating data management information blocks for pointing the communication protocol control information; and a repacking processor for allowing said adapter device to compare an overhead necessary to process a command for transferring the communication protocol control information pointed by other data management information block outputted from said protocol processor with an overhead necessary to copy the output data pointed by said other data management information block outputted from said protocol processor onto an area continuously linked to the communication protocol control information, setting the communication protocol control information and the output data to a continuous area and creating a data management information block for pointing the area when the latter overhead is smaller than the former overhead, and delivering the created data management information block to said driver.

15. A method of transferring a plurality of input/output commands from a computer system including a plurality of input/output devices, an adapter device coupled to said plurality of input/output devices, and a main processing unit coupled to said adapter device, comprising the steps of:

transferring the plurality of input/output requests intended for respective ones of said plurality of input/output devices from said main processing unit to said adapter device as a single input/output start command;

said adapter device determining to which input/output devices said plurality of input/output requests included in said single input/output start command correspond; and said adapter device supplying said plurality of input/output requests to said determined input/output devices, respectively.

16. A method of transferring a plurality of input/output commands from a computer system including a plurality of input/output devices, an adapter device coupled to said plurality of input/output devices, and a main processing unit coupled to said adapter device, comprising the steps of:

said main processing unit storing therein and managing an input/output request intended for transfer to said each input/output device via said adapter device in a wait request management table when the input/output request is immediately unprocessible upon transfer of the input/output request to said each input/output device;

said main processing unit creating a plurality of command sequences each comprised of input/output commands arranged in a row to be supplied to said each input/output device based on the input/output request stored in said wait request management table when the input/output request is processible, and for transferring said plurality of command sequences to said adapter device as a single input/output start command;

said adapter device determining to which input/output devices said plurality of command sequences included in said single input/output start command correspond; and said adapter device supplying the input/output commands of each of said plurality of command sequences to said determined input/output devices, respectively.

17. A method of transferring a plurality of input/output commands according to claim 16, further comprising the steps of:

said each input/output device issuing an end interruption to said main processing unit when a process for a given input/output command is finished; and said main processing unit judging whether the input/output request is processible when the end interruption for the input/output command is triggered, creating a plurality of command sequences each comprised of input/output commands arranged in a row to be supplied to said each input/output device, at each input/output device based on the input/output request stored in said wait request management table when it is judged that the input/output request is processible, and issuing the plurality of command sequences to said adapter device as said single input/output start command.

18. A method of transferring a plurality of input/output commands from a computer system including a plurality of input/output devices, an adapter device coupled to said plurality of input/output devices, and a main processing unit coupled to said adapter device, said main processing unit having an application executing unit for executing an application program and a driver for processing an input/output request issued from the application executing unit, comprising the steps of:

transferring said plurality of input/output commands to respective ones of said plurality of input/output devices from said driver as a single input/output start command;

said adapter device determining to which input/output devices said plurality of input/output commands included in said one input/output start command correspond; and supplying said plurality of input/output commands to said determined input/output devices, respectively.

19. A method of transferring a plurality of input/output commands according to claim 18, further comprising a step, executed by said driver, for supplying said plurality of input commands to said adapter device as said single input/output start command on a first out basis before acceptance of a data input request from the application executing unit.

20. A method of transferring a plurality of input/output commands according to claim 19, wherein said step for supplying the input commands to said adapter device on the first out basis includes:

a step for creating an input command sequence obtained by linking input commands to each other by a predetermined maximum number of transferred input commands at each input/output device after initialization of said driver, and transferring the created input command sequence to said adapter device;

a step for recording the number of the input commands issued to said each input/output device; and a step for decrementing the number of the stored uncompleted input commands by one each time an input command completion report is received from said each input/output device, calculating a difference between the number of the stored uncompleted input commands and the maximum number of transferred input commands if the number of the uncompleted input commands transferred to said each input/output device is not greater than a predetermined number of input commands, and retransferring an input command sequence obtained by linking input commands to each other by the number corresponding to the difference, to said adapter device.

21. A method of transferring a plurality of input/output commands according to claim 18, further comprising the steps of:

a protocol processing step executed by said main processing unit, for dividing data on a data transfer request issued from the application executing unit and adding communication protocol control information to the heads of the divided individual output data to thereby create a plurality of divided packets; and said driver producing a plurality of input/output commands based on the plurality of divided packets when the number of the plurality of divided packets is not greater than a continuous transfer number corresponding to the number of packets continuously transferable without confirming a delivery issued from the opposite party at the present time, and transferring the plurality of produced input/output commands as said single input/output start command to thereby transfer the output data about the plurality of divided packets through one input/output operation.

22. A method of transferring a plurality of input/output commands according to claim 18, further comprising the steps of:

a protocol processing step executed by said main processing unit, for dividing data about the data transfer request issued from the application executing unit, creating data management information blocks for pointing the divided output data, creating communication protocol control information to be logically added to the heads of the divided output data such that divided packets are logically composed of the communication protocol control information and the output data, and creating data management information blocks for pointing the communication protocol control information;

said main processing unit allowing said adapter device to compare an overhead necessary to process a command for transferring the communication protocol control information pointed by other data management information block outputted from said protocol processing step with an overhead necessary to copy the output data pointed by said other data management information block outputted from said protocol processing step onto an area continuously linked to the communication protocol control information, setting the communication protocol control information and the output data to a continuous area and creating a data management information block for pointing the area when the latter overhead is smaller than the former overhead, and delivering the created data management information block to said driver.

23. A method of transferring a plurality of input/output commands from a computer system including a plurality of input/output devices, an adapter device coupled to said plurality of input/output devices, and a main processing unit coupled to said adapter device, said main processing unit having an application executing unit for executing an application program and a driver for processing an input/output request issued from the application executing unit, comprising the steps of:

said driver storing therein and managing an input/output request issued from the application executing unit in a wait request management table when the input/output request is immediately unprocessible upon issuance of the input/output request from the application executing unit;

said driver creating a plurality of command sequences each comprised of input/output commands arranged in a row to be supplied to said each input/output device based on the input/output request stored in said wait request management table when the input/output request is processible, and for transferring said plurality of command sequences to said adapter device as a single input/output start command;

said adapter device determining to which input/output devices said plurality of command sequences included in said single input/output start command correspond; and said adapter device supplying the input/output commands of each of said plurality of command sequences to said determined input/output devices, respectively.

24. A method of transferring a plurality of input/output commands according to claim 23, further comprising a step, executed by said driver, for supplying said plurality of input commands to said adapter device as said single input/output start command on a first out basis before acceptance of a data input request from the application executing unit.

25. A method of transferring a plurality of input/output commands according to claim 23, further comprising the steps of:

a protocol processing step executed by said main processing unit, for dividing data on a data transfer request issued from the application executing unit and adding communication protocol control information to the heads of the divided individual output data to thereby create a plurality of divided packets; and said driver producing a plurality of input/output commands based on the plurality of divided packets when the number of the plurality of divided packets is not greater than a continuous transfer number corresponding to the number of packets continuously transferable without confirming a delivery issued from the opposite party at the present time, and transferring the plurality of produced input/output commands as said single input/output start command to thereby transfer the output data about the plurality of divided packets through one input/output operation.

26. A method of transferring a plurality of input/output commands according to claim 23, further comprising the steps of:

a protocol processing step executed by said main processing unit, for dividing data about the data transfer request issued from the application executing unit, creating data management information blocks for pointing the divided output data, creating communication protocol control information to be logically added to the heads of the divided output data such that divided packets are logically composed of the communication protocol control information and the output data, and creating data management information blocks for pointing the communication protocol control information;

said main processing unit allowing said adapter device to compare an overhead necessary to process a command for transferring the communication protocol control information pointed by other data management information block outputted from said protocol processing step with an overhead necessary to copy the output data pointed by said other data management information block outputted from said protocol processing step onto an area continuously linked to the communication protocol control information, setting the communication protocol control information and the output data to a continuous area and creating a data management information block for pointing the area when the latter overhead is smaller than the former overhead, and delivering the created data management information block to said driver.

* * * * *